US012675737B2

(12) United States Patent
Sone et al.

(10) Patent No.: US 12,675,737 B2
(45) Date of Patent: Jul. 7, 2026

(54) FEATURE WEAVING NETWORK FOR ESTIMATION OF TASK SOLUTIONS ON INPUT GRAPHS

(71) Applicant: OMRON Corporation, Kyoto (JP)

(72) Inventors: Shusaku Sone, Kyoto (JP); Atsushi Hashimoto, Tokyo (JP); Jiaxin Ma, Tokyo (JP)

(73) Assignee: OMRON Corporation, Kyoto (JP)

( * ) Notice: Subject to any disclaimer, the term of this patent is extended or adjusted under 35 U.S.C. 154(b) by 621 days.

(21) Appl. No.: 18/268,310

(22) PCT Filed: Sep. 14, 2021

(86) PCT No.: PCT/JP2021/033723
§ 371 (c)(1),
(2) Date: Jun. 19, 2023

(87) PCT Pub. No.: WO2022/163003
PCT Pub. Date: Aug. 4, 2022

(65) Prior Publication Data
US 2024/0037451 A1      Feb. 1, 2024

(30) Foreign Application Priority Data

Jan. 29, 2021    (JP) ................................ 2021-013294

(51) Int. Cl.
| | |
|---|---|
| *G06N 20/00* | (2019.01) |
| *G06N 3/0442* | (2023.01) |
| *G06N 3/0464* | (2023.01) |
| *G06N 3/0475* | (2023.01) |
| *G06N 3/084* | (2023.01) |

(52) U.S. Cl.
CPC .................................... *G06N 20/00* (2019.01)

(58) Field of Classification Search
CPC ...... G06N 20/00; G06N 3/084; G06N 3/0442; G06N 3/0464; G06N 3/0475
See application file for complete search history.

(56) References Cited

PUBLICATIONS

Rocco et al. "Neighbourhood Consensus Networks", arXiv:1810. 10510v2 [cs.CV] Nov. 29, 2018. (Year: 2018).*

(Continued)

*Primary Examiner* — Jennifer N Welch
*Assistant Examiner* — Jake Timothy Breen
(74) *Attorney, Agent, or Firm* — JCIPRNET

(57)      ABSTRACT

A purpose of the present invention is to improve precision when estimating the solution to a task expressed in a graph. A model generation device according to one embodiment of the present invention performs machine learning of an estimation module provided with a feature-incorporated network and an estimator. The feature-incorporated network is provided with a plurality of feature-incorporated layers. An encoder for each feature-incorporated layer is configured so as to incorporate the feature amount of the outflow edge and inflow edge of each vertex after reflecting the relationship with other vertices. Moreover, the encoder for each feature-incorporated layer is configured so as to derive the relative feature amount for each edge based on the feature amount for all of the edges inputted for a target vertex, without calculating the weighted sum of the features of the edges adjacent to each vertex.

19 Claims, 21 Drawing Sheets

(56) References Cited

PUBLICATIONS

D. Gibbons, C.-C. Lim and P. Shi, "Deep Learning for Bipartite Assignment Problems," 2019 IEEE International Conference on Systems, Man and Cybernetics (SMC), Bari, Italy, 2019, pp. 2318-2325, doi: 10.1109/SMC.2019.8914228. (Year: 2019).*

J. Wu, "Stable Matching Beyond Bipartite Graphs," 2016 IEEE International Parallel and Distributed Processing Symposium Workshops (IPDPSW), Chicago, IL, USA, 2016, pp. 480-488, doi: 10.1109/IPDPSW.2016.207. (Year: 2016).*

D. Gale et al., "College admissions and the stability of marriage," The American Mathematical Monthly, vol. 69, Jan. 1962, pp. 9-15.

Li, Shira et al., "Deep Learning for Two-Sided Matching Markets," PhD thesis, Harvard University, Mar. 2019, pp. 1-71.

Alex Graves et al., "Framewise phoneme classification with bidirectional LSTM and other neural network architectures," Neural Networks, vol. 18, Jul.-Aug. 2005, pp. 602-610.

Lukas Brozovsky et al., "Recommender system for online dating service," In Proceedings of Conference Znalosti, Mar. 2007, pp. 1-12.

Nikolaos Tziavelis et al., "Equitable stable matchings in quadratic time," In Proceedings of Advances in Neural Information Processing Systems, 2019, pp. 1-11.

Keyulu Xu et al., "How powerful are graph neural networks?," In Proceedings of International Conference on Learning Representations, Feb. 2019, pp. 1-17.

Cheng-Chew Lim et al., "Deep learning for bipartite assignment problems," In Proceedings of IEEE International Conference on Systems, Man and Cybernetics, Aug. 2019, pp. 1-80.

Diederik P. Kingma et al., "Adam: A method for stochastic optimization," In Proceedings of International Conference on Learning Representations, 2015, pp. 1-15.

Piotr Dworczak, "Deferred acceptance with compensation chains," In Proceedings of the 2016 ACM Conference on Economics and Computation, Apr. 2020, pp. 1-26.

Hyeoncheol Cho et al., "Three-Dimensionally Embedded Graph Convolutional Network (3DGCN) for Molecule Interpretation," Apr. 2019, pp. 1-39, Available at: https://arxiv.org/abs/1811.09794.

Takahiko Furuya et al., "Convolution on Rotation-Invariant and Multi-Scale Feature Graph for 3D Point Set Segmentation," IEEE Access, vol. 8, Jul. 2020, pp. 140250-140260.

"International Search Report (Form PCT/ISA/210) of PCT/JP2021/033723," mailed on Nov. 30, 2021, with English translation thereof, pp. 1-2.

"Written Opinion of the International Searching Authority (Form PCT/ISA/237)" of PCT/JP2021/033723, mailed on Nov. 30, 2021, with English translation thereof, pp. 1-6.

Dan Gusfield et al., "The Stable Marriage Problem: Structure and Algorithms," The MIT Press, Aug. 1989, pp. 1-148.

* cited by examiner

Start

S101 — Acquire plurality of training graphs

S102 — Perform machine learning of estimation module using plurality of training graphs S103 — Store result of machine learning End Start S201 — Acquire target graph S202 — Estimate solution to task for target graph using trained estimation module S203 — Output information about estimation result End

FEATURE WEAVING NETWORK FOR ESTIMATION OF TASK SOLUTIONS ON INPUT GRAPHS

CROSS-REFERENCE TO RELATED APPLICATION

This application is a 371 application of the International PCT application serial no. PCT/JP2021/033723, filed on Sep. 14, 2021, which claims the priority benefits of Japan Patent Application No. 2021-013294, filed on Jan. 29, 2021. The entirety of each of the above-mentioned patent applications is hereby incorporated by reference herein and made a part of this specification.

TECHNICAL FIELD

The present invention relates to a model generation device, an estimation device, a model generation method, and a model generation program.

BACKGROUND ART

When various inference tasks such as matching and a route search are accomplished, graphs may be used to represent various types of information. A graph basically includes vertices (nodes) and edges. In accordance with a task, for example, graphs having various structures such as directed graphs and bipartite graphs can be used.

As an example, when a stable matching problem is solved, a bipartite graph can be used. The stable matching problem is, for example, an assignment problem of a two-sided market, such as matching between job applicants and employers. A bipartite graph is a graph in which a vertex set is divided into two subsets and there are no edges between the vertices in each subset (i.e., a plurality of vertices constituting the bipartite graph belongs to one of the two subsets and is divided so that there are no edges in either subset).

As an example of a method of representing a stable matching problem, each subset is associated with a party to which a matching target belongs and the vertices in each subset are associated with a matching target (e.g., a job applicant/employer). Each target (vertex) has a desired level (e.g., a desired ranking) for a target belonging to another party. Matching is implemented by an edge set including edges, which represent a combination of vertices belonging to one subset and vertices belonging to the other subset and which are assigned not to share vertices.

When there is a combination of vertices having a higher desired level than the combination of edges belonging to an edge set constituting the matching with respect to the edge set, edges indicating this combination block the matching (i.e., it is indicated that there is other matching more preferable than the matching indicated by the edge set). In the stable matching problem, a combination between vertices is searched for so that such blocking pairs are absent and some measure (e.g., fairness) is satisfied.

In the related art, various algorithms have been developed to accomplish tasks represented in such graphs. A GS algorithm proposed in Non-Patent Literature 1 is known as an example of a classical method for solving the stable matching problem. However, such a method based on a specific algorithm is not versatile because it becomes unusable if the content of the task is changed even slightly, and the cost of generating a solver is high because there are many parts including manual work.

Therefore, in recent years, research on a method using a machine learning model such as a neural network as a general-purpose method for accomplishing tasks represented in graphs has been promoted. For example, in Non-Patent Literature 2, technology for solving a stable matching problem using a five-layer neural network has been proposed. According to the method using the machine learning model, if training data corresponding to the task is provided, a trained model (solver) that has acquired the ability to accomplish the task can be generated. Therefore, the versatility of the generated model can be increased and the generation cost can be reduced.

CITATION LIST

Non-Patent Literature

[Non-Patent Literature 1]
David Gale, Lloyd S Shapley, "College admissions and the stability of marriage," The American Mathematical Monthly, 69(1): 9-15, 1962.
[Non-Patent Literature 2]
Shira Li, "Deep Learning for Two-Sided Matching Markets," PhD thesis, Harvard University, 2019.

SUMMARY OF INVENTION

Technical Problem

The inventors of the present invention have found that there are the following problems in a network model (e.g., graph convolutional networks) for accomplishing an inference task on data having a graph structure proposed in Non-Patent Literature 2 and the like. That is, in order to accomplish complex tasks accurately, it is desirable to deepen the network hierarchy. However, in the conventional method, a convolution operation is executed on a feature of each vertex by calculating a weighted sum of adjacent vertex features for each edge type. According to this process of calculating the weighted sum, excessive smoothing occurs and therefore the more layers are stacked, the more features are lost. Therefore, the network hierarchy cannot be deepened (for example, in the methods proposed in Non-Patent Literature 2 and 5). Due to this, it is difficult to improve the accuracy of estimating a solution for a task.

The present invention has been made in view of such circumstances according to an aspect and an objective thereof is to provide technology for improving the accuracy of estimating a solution for a task represented in a graph.

Solution to Problem

The present invention adopts the following configurations to solve the above-described problems.

That is, according to an aspect of the present invention, a model generation device includes an acquisition part configured to acquire a plurality of training graphs and a learning processing part configured to perform machine learning of an estimation module using the plurality of training graphs that has been acquired. The estimation module includes a feature weaving network and an estimator. The feature weaving network includes a plurality of feature weaving layers and is configured to receive an input of an input graph and output feature information about the input graph. The estimator is configured to estimate a solution for a task for the input graph from the feature information output from the feature weaving network. Each feature weaving layer receives inputs of third-order first and second input tensors. The first input tensor is configured to have a first axis along which first vertices belonging to a first set of the input graph are arranged as elements, a second axis along which second vertices belonging to a second set of the input graph are arranged as elements, and a third axis along which feature quantities related to edges outgoing from the first vertices to the second vertices are arranged as elements. The second input tensor is configured to have a first axis along which the second vertices are arranged as elements, a second axis along which the first vertices are arranged as elements, and a third axis along which feature quantities related to edges outgoing from the second vertices to the first vertices are arranged as elements. Each feature weaving layer includes an encoder. Each feature weaving layer is configured to generate a third-order first concatenated tensor by fixing the third axis of the second input tensor, circulating the axes other than the third axis of the second input tensor one by one, and concatenating feature quantities of elements of the first input tensor and the circulated second input tensor, generate a third-order second concatenated tensor by fixing the third axis of the first input tensor, circulating the axes other than the third axis of the first input tensor one by one, and concatenating feature quantities of elements of the second input tensor and the circulated first input tensor, generate a third-order first output tensor corresponding to the first input tensor by dividing the generated first concatenated tensor for each element of the first axis, inputting the divided first concatenated tensor to the encoder, and executing an arithmetic operation of the encoder, and generate a third-order second output tensor corresponding to the second input tensor by dividing the generated second concatenated tensor for each element of the first axis, inputting the divided first concatenated tensor to the encoder, and executing an arithmetic operation of the encoder. The encoder is configured to derive a relative feature quantity of each element from all input feature quantities of elements. A first feature weaving layer among the plurality of feature weaving layers is configured to receive the first input tensor and the second input tensor from the input graph. The feature information includes the first output tensor and the second output tensor output from a last feature weaving layer among the plurality of feature weaving layers. The machine learning includes training the estimation module so that an estimation result obtained by the estimator is suitable for a correct answer of the task for each training graph by inputting each training graph as the input graph to the feature weaving network.

In this configuration, features of the input graph are extracted by the feature weaving network. In this feature weaving network, data of the input graph is represented by input tensors. The input tensors are configured to indicate feature quantities of edges outgoing from vertices belonging to each set to vertices belonging to the other sets. That is, the feature weaving network is configured to refer to the features of the input graph for each edge rather than for each vertex.

In each feature weaving layer, a concatenated tensor is generated by aligning and concatenating the axes of each input tensor. Each concatenated tensor is configured to indicate the feature quantities of outgoing and incoming edges on the basis of vertices belonging to each set. Also, in each feature weaving layer, each concatenated tensor is divided for each element of the first axis and input to the encoder and an arithmetic operation of the encoder is executed. Thereby, it is possible to reflect a feature quantity of another edge in a feature quantity of each edge on the basis of each vertex. The more the feature weaving layers are stacked, the more the feature quantities of the edges related to the vertices away from each vertex can be reflected in the feature quantities of the edges related to each vertex.

In addition, the encoder is configured to derive a relative feature quantity of each edge from all input feature quantities of edges without calculating a weighted sum of features of adjacent edges at each vertex. According to this configuration of the encoder, excessive smoothing can be prevented from occurring even if the feature weaving layers are stacked. Therefore, the hierarchy of the feature weaving network can be deepened in accordance with the difficulty of the task. As a result, in the feature weaving network, it is possible to expect feature extraction of the input graph appropriate for accomplishing the task. Thereby, the estimator can expect highly accurate estimation on the basis of obtained feature quantities. Therefore, according to this configuration, for complex tasks, the accuracy of estimating the solution for the task represented in the graph can also be improved with respect to the generated trained estimation module by deepening the hierarchy of the feature weaving network.

In the model generation device according to the above-described aspect, the feature weaving network may be configured to have a residual structure. The residual structure is a structure having a shortcut path along which at least one output of the plurality of feature weaving layers is input to another subsequent feature weaving layer (which is two or more layers away from the next feature weaving layer) in addition to the next adjacent feature weaving layer. According to this configuration, the hierarchy of the feature weaving network can be easily deepened by the residual structure. Thereby, the estimation accuracy of the generated trained estimation module can be improved.

In the model generation device according to the above-described aspect, the encoder of each feature weaving layer may include a single encoder commonly used between the elements of the first axes of the first concatenated tensor and the second concatenated tensor. According to this configuration, it is possible to reduce the number of parameters in the estimation module using a common encoder for element-by-element arithmetic operations of each concatenated tensor in each feature weaving layer. Thereby, a calculation amount of the estimation module can be suppressed (i.e., the consumption of computational resources used for the arithmetic operation of the estimation module can be suppressed) and the efficiency of machine learning can be improved.

In the model generation device according to the above-described aspect, each feature weaving layer may further include a normalizer configured to normalize a result of an arithmetic operation of the encoder for each concatenated tensor. When the obtained first and second input tensors belong to different distributions, there may be two types of input domains for the encoder. The bias due to this distribution difference is amplified every time the encoder (feature weaving layer) is stacked and hence there is a possibility that a single encoder will accomplish two different tasks instead of accomplishing a common task. As a result, the accuracy of the encoder deteriorates and this can lead to deterioration in the accuracy of the entire estimation module. For this problem, according to this configuration, the amplification of the bias can be suppressed by the normalizer normalizing an arithmetic operation result of the encoder, thereby preventing deterioration of the accuracy of the estimation module.

In the model generation device according to the above-described aspect, each feature weaving layer may be further configured so that a condition code is assigned to the third axis of each of the first input tensor and the second input tensor before an arithmetic operation of the encoder is executed. In this configuration, the encoder can identify a source of data on the basis of the condition code when encoding the feature quantity. Thus, even if the first input tensor and the second input tensor belong to different distributions, the encoder can be trained to eliminate the bias due to the distribution difference according to a function of the condition code in the process of machine learning. Therefore, according to this configuration, it is possible to prevent deterioration of the accuracy of the estimation module due to the different distributions to which each input tensor belongs.

In the model generation device according to the above-described aspect, each training graph may be a directed bipartite graph and the plurality of vertices constituting the directed bipartite graph may be divided so that each of the plurality of vertices belongs to one of two subsets. The first set of the input graph may correspond to one of the two subsets of the directed bipartite graph. The second set of the input graph may correspond to the other of the two subsets of the directed bipartite graph. According to this configuration, in a situation where the given task is represented in a directed bipartite graph, the accuracy of estimating the solution for the task can be improved with respect to the generated trained estimation module.

In the model generation device according to the above-described aspect, the task may be a matching task between two parties and may determine optimal pairing between targets belonging to each party. The two subsets of the directed bipartite graph may correspond to the two parties in the matching task and the vertices belonging to each subset of the directed bipartite graph may correspond to the targets belonging to each party. Also, a feature quantity related to an edge outgoing from the first vertex to the second vertex may correspond to a desired level from a target belonging to one party of the two parties to a target belonging to the other party and a feature quantity related to an edge outgoing from the second vertex to the first vertex may correspond to a desired level from the target belonging to the other party of the two parties to the target belonging to the one party. According to this configuration, the accuracy of estimating the solution of two-sided matching represented in a directed bipartite graph can be improved with respect to the generated trained estimation module.

In the model generation device according to the above-described aspect, each training graph may be an undirected bipartite graph, the plurality of vertices constituting the undirected bipartite graph may be divided so that each of the plurality of vertices belongs to one of two subsets. The first set of the input graph may correspond to one of the two subsets of the undirected bipartite graph and the second set of the input graph may correspond to the other of the two subsets of the undirected bipartite graph. According to this configuration, when the given task is represented in an undirected bipartite graph, the accuracy of estimating the solution for the task can be improved with respect to the generated trained estimation module.

In the model generation device according to the above-described aspect, the task may be a matching task between two parties and may determine optimal pairing between targets belonging to each party. The two subsets of the undirected bipartite graph may correspond to the two parties in the matching task and the vertices belonging to each subset of the undirected bipartite graph may correspond to the targets belonging to each party. Both a feature quantity related to an edge outgoing from the first vertex to the second vertex and a feature quantity related to an edge outgoing from the second vertex to the first vertex may correspond to costs or rewards of pairing between a target belonging to one party of the two parties and a target belonging to the other party. According to this configuration, the accuracy of estimating the solution of one-sided matching represented in an undirected bipartite graph can be improved with respect to the generated trained estimation module.

In the model generation device according to the above-described aspect, each training graph may be a directed graph. The first vertex belonging to the first set of the input graph may correspond to a start point of a directed edge constituting the directed graph and the second vertex belonging to the second set may correspond to an end point of the directed edge. Also, an edge outgoing from the first vertex to the second vertex may correspond to a directed edge outgoing from the start point to the end point and an edge outgoing from the second vertex to the first vertex may correspond to a directed edge incoming from the start point to the end point. According to this configuration, when the given task is represented in a general directed graph, the accuracy of estimating the solution for the task can be improved with respect to the generated trained estimation module.

In the model generation device according to the above-described aspect, the directed graph may be configured to represent a network and the task may be to estimate an event that occurs on the network. Both a feature quantity related to an edge outgoing from the first vertex to the second vertex and a feature quantity related to an edge outgoing from the second vertex to the first vertex may correspond to an attribute of a connection between vertices constituting the network. According to this configuration, the accuracy of estimating an event occurring on the network represented in a general directed graph can be improved with respect to the generated trained estimation module.

In the model generation device according to the above-described aspect, each training graph may be an undirected graph. Each of the first vertex belonging to the first set of the input graph and the second vertex belonging to the second set may correspond to a vertex constituting the undirected graph. The first input tensor and the second input tensor input to each feature weaving layer may be identical to each other. The first output tensor and the second output tensor generated by each feature weaving layer may be identical to each other and a process of generating the first output tensor and a process of generating the second output tensor may be commonly executed. According to this configuration, when the given task is represented in a general undirected graph, the accuracy of estimating the solution for the task can be improved with respect to the generated trained estimation module.

In the model generation device according to the above-described aspect, each training graph may be a vertex feature graph including a plurality of vertices having attributes. Each of the first vertex belonging to the first set of the input graph and the second vertex belonging to the second set may correspond to a vertex constituting the vertex feature graph. A feature quantity related to an edge outgoing from the first vertex to the second vertex may correspond to an attribute of a vertex of the vertex feature graph corresponding to the first vertex and a feature quantity related to an edge outgoing from the second vertex to the first vertex may correspond to an attribute of a vertex of the vertex feature graph corresponding to the second vertex. According to this configuration, when the given task is represented in a vertex feature graph (e.g., a vertex-weighted graph) having a feature (attribute) at the vertex, the accuracy of estimating the solution for the task can be improved with respect to the generated trained estimation module.

In the model generation device according to the above-described aspect, each element of a third axis of each of the first input tensor and the second input tensor from the input graph may be concatenated with or multiplied by information indicating a relationship between corresponding vertices of the vertex feature graph, and the task may be to estimate an event derived from the vertex feature graph. According to this configuration, the accuracy of estimating events related to the target represented in the vertex feature graph can be improved with respect to the generated trained estimation module.

In the model generation device according to the above-described aspect, the task may be to estimate a relationship between vertices constituting the vertex feature graph. According to this configuration, the accuracy of estimating a relationship between targets represented in each vertex of the vertex feature graph can be improved with respect to the generated trained estimation module.

In the model generation device according to each of the above-described aspects, the edges are configured to represent a combination of two vertices (i.e., to indicate a relationship between two vertices). However, the configuration of the edges may not be limited to this example. As another example, the edges may be configured to represent a combination of three or more vertices. That is, the graph may be a hypergraph. For example, according to an aspect of the present invention, a model generation device includes an acquisition part configured to acquire a plurality of training graphs and a learning processing part configured to perform machine learning of an estimation module using the plurality of training graphs that has been acquired. Each training graph may be a K-partite hypergraph where K is greater than or equal to 3. A plurality of vertices constituting the hypergraph may be divided so that each of the plurality of vertices belongs to any one of K subsets. The estimation module includes a feature weaving network and an estimator. The feature weaving network includes a plurality of feature weaving layers and is configured to receive an input of an input graph and output feature information about the input graph. The estimator is configured to estimate a solution for a task for the input graph from the feature information output from the feature weaving network. Each feature weaving layer receives an input of K $(K+1)^{th}$-order input tensors. An $i^{th}$ input tensor among the K input tensors is configured so that an $i^{th}$ vertex belonging to an $i^{th}$ subset of the input graph is arranged as an element on a first axis, a vertex belonging to a $(j-1)^{th}$ subset is arranged as an element on a $j^{th}$ axis between a second axis and a $K^{th}$ axis by performing a circulation process using the $i^{th}$ subset as a start point, and a feature quantity related to an edge outgoing from the $i^{th}$ vertex belonging to the $i^{th}$ subset to a combination of vertices belonging to each of $(K-1)$ other subsets is arranged as an element on a $(K+1)^{th}$ axis. Each feature weaving layer includes an encoder. Each feature weaving layer is configured to generate K $(K+1)^{th}$ order concatenated tensors by fixing the $(K+1)^{th}$ axis of each of $(K-1)$ input tensors other than the $i^{th}$ input tensor with respect to the $i^{th}$ input tensor between a first input tensor and a $K^{th}$ input tensor, circulating an axis other than the $(K+1)^{th}$ axis of each of the other input tensors in alignment with each axis of the $i^{th}$ input tensor, and concatenating feature quantities of elements of the $i^{th}$ input tensor and elements of each of the other input tensors that have been circulated, and generate K $(K+1)^{th}$-order output tensors respectively corresponding to the K input tensors by dividing the K generated concatenated tensors for each element of the first axis, inputting the divided concatenated tensors to the encoder, and executing an arithmetic operation of the encoder. The encoder may be configured to derive a relative feature quantity of each element from all input feature quantities of elements. A first feature weaving layer among the plurality of feature weaving layers may be configured to receive the K input tensors from the input graph. The feature information may include K output tensors output from a last feature weaving layer among the plurality of feature weaving layers. Also, the machine learning may include training the estimation module so that an estimation result obtained by the estimator is suitable for a correct answer of the task for each training graph by inputting each training graph as the input graph to the feature weaving network. According to this configuration, when the given task is represented in a hypergraph, the accuracy of estimating the solution for the task can be improved with respect to the generated trained estimation module.

Also, the embodiment of the present invention may not be limited to the form of the model generation device. An aspect of the present invention may be an estimation device configured to estimate a solution for a task for a graph using a trained estimation module generated by the model generator according to any one form described above. For example, the estimation device according to the aspect of the present invention includes an acquisition part configured to acquire a target graph, an estimation part configured to estimate a solution for a task for the acquired target graph using an estimation module trained in machine learning, and an output part configured to output information about a result of estimating the solution for the task. The estimation module is configured as described above. Estimating the solution for the task for the target graph using the trained estimation module includes obtaining a result of estimating the solution for the task from the estimator by inputting the target graph as the input graph to the feature weaving network. Also, the estimation device may be read as, for example, a matching device, a prediction device, or the like, in accordance with the type of task in the application situation.

Also, as another aspect of each of the model generation device and the estimation device according to each of the above forms, an aspect of the present invention may be an information processing method that implements all or some of the above configurations, may be a program, or may be a storage medium storing this program capable of being read by a device, a machine, or the like as well as a computer. Here, a storage medium capable of being read by a computer or the like is a medium that stores information such as programs according to an electrical, magnetic, optical, mechanical, or chemical function. Also, an aspect of the present invention may be an estimation system including a model generation device and an estimation device according to any one form described above.

For example, according to an aspect of the present invention, a model generation method includes an information processing method of executing steps of acquiring, by a computer, a plurality of training graphs and executing, by the computer, machine learning of an estimation module using the plurality of training graphs that has been acquired. Also, for example, according to an aspect of the present invention, a model generation program is a program for causing a computer to execute steps of acquiring a plurality of training graphs and executing machine learning of an estimation module using the plurality of training graphs that has been acquired. The estimation module is configured as described above. The machine learning includes training the estimation module so that an estimation result obtained by the estimator is suitable for a correct answer of the task for each training graph by inputting each training graph as the input graph to the feature weaving network.

Advantageous Effects of Invention

According to the present invention, the accuracy of estimating a solution for a task represented in a graph can be improved.

DESCRIPTION OF EMBODIMENTS

Hereinafter, an embodiment according to an aspect of the present invention (hereinafter also referred to as "the present embodiment") will be described with reference to the drawings. However, the present embodiment to be described below is merely an example of the present invention in all aspects. It goes without saying that various improvements or modifications can be made without departing from the scope of the present invention. That is, in implementing the present invention, a specific configuration according to the embodiment may be appropriately adopted. Although data shown in the present embodiment is described in a natural language, the data is more specifically designated by a computer-recognizable pseudo language, command, parameter, machine language, or the like.

§ 1 APPLICATION EXAMPLES

Figure 1:
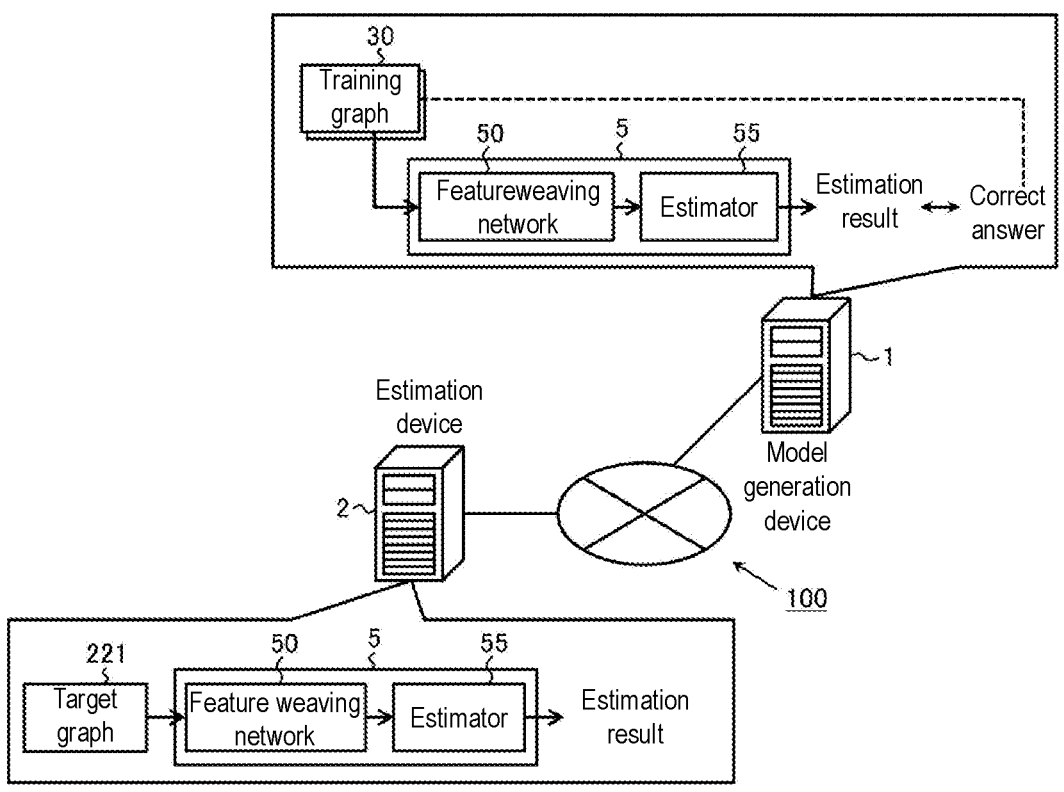
FIG. 1 schematically shows an example of a situation where the present invention is applied.

FIG. 1 schematically shows an example of a situation where the present invention is applied. As shown in FIG. 1, an estimation system 100 according to the present embodiment includes a model generation device 1 and an estimation device 2.

(Model Generation Device)

According to the present embodiment, the model generation device 1 is a computer configured to generate a trained estimation module 5 by performing machine learning. Specifically, the model generation device 1 acquires a plurality of training graphs 30. A type of each training graph 30 may be appropriately selected in accordance with the ability to accomplish the task acquired by the estimation module 5. Examples of each training graph 30 may include a directed bipartite graph, an undirected bipartite graph, a general directed graph, a general undirected graph, a vertex feature graph, a hypergraph, and the like. The model generation device 1 performs the machine learning of the estimation module 5 using the plurality of training graphs 30 that has been acquired. Thereby, the trained estimation module 5 is generated.

(Estimation Device)

On the other hand, the estimation device 2 according to the present embodiment is a computer configured to estimate a solution for a task for a graph using the trained estimation module 5. Specifically, the estimation device 2 acquires a target graph 221. The target graph 221 is a target graph for estimating the solution for the task and a type thereof may be appropriately selected in accordance with the acquired ability of the trained estimation module 5 as in the training graph 30 described above. The estimation device 2 estimates the solution for the task for the acquired target graph 221 using the estimation module 5 trained in machine learning. Also, the estimation device 2 outputs information about a result of estimating the solution for the task.

(Estimation Module)

Figure 2A:
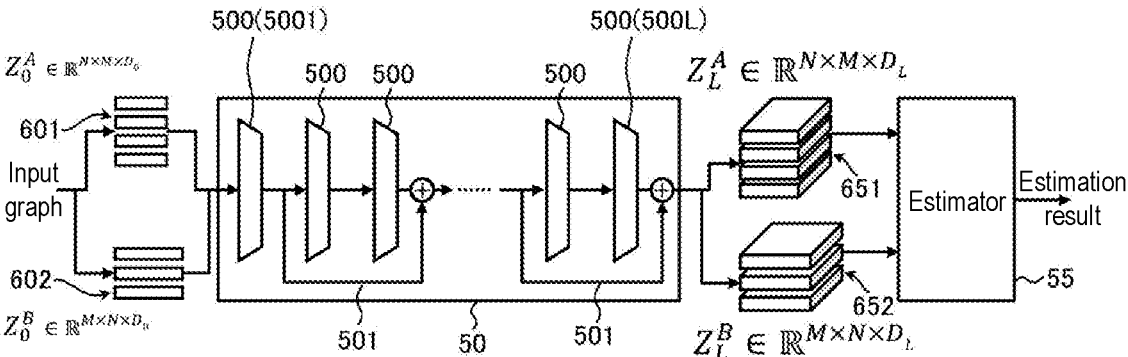
FIG. 2A schematically shows an example of a configuration of an estimation module according to an embodiment.

An example of the configuration of the estimation module 5 will be described with further reference to FIG. 2A. FIG. 2A schematically shows the example of the configuration of the estimation module 5 according to the present embodiment. The estimation module 5 includes a feature weaving network 50 and an estimator 55. The feature weaving network 50 includes a plurality of feature weaving layers 500 arranged in series. Thereby, the feature weaving network 50 is configured to receive an input of the input graph and output feature information about the input graph. The estimator 55 is configured to estimate the solution for the task for the input graph from the feature information output from the feature weaving network.

Figure 2B:
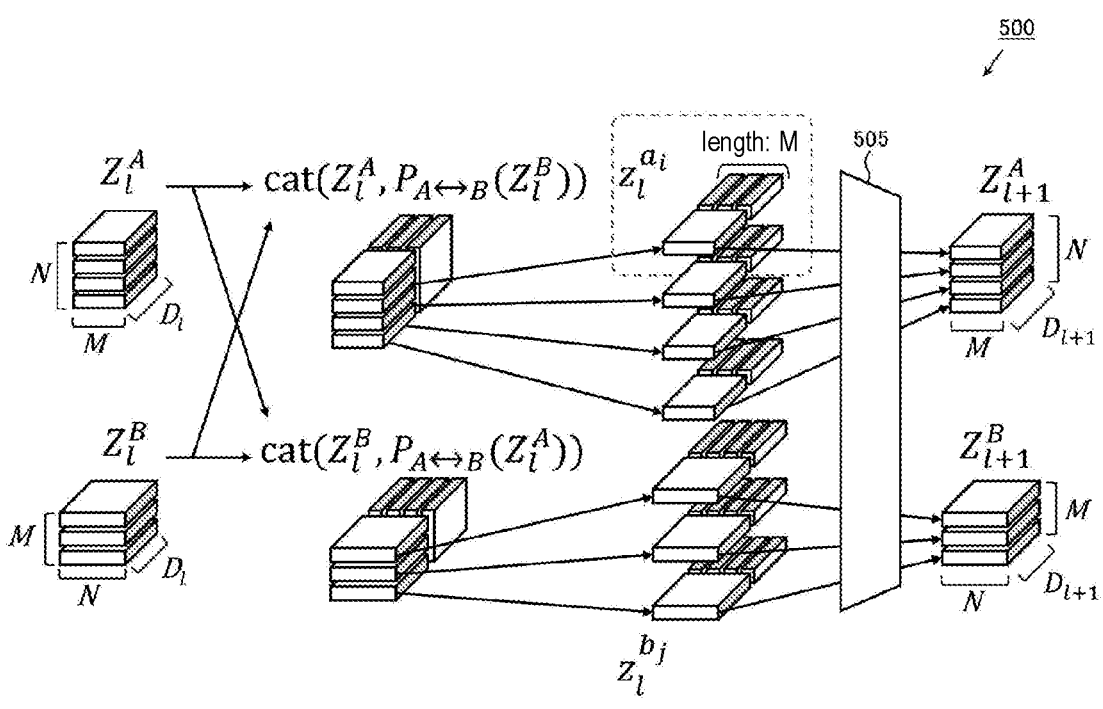
FIG. 2B schematically shows an example of a configuration of a feature weaving layer according to the embodiment.

An example of the configuration of the feature weaving network 50 will be described with further reference to FIG. 2B. FIG. 2B schematically shows an example of a configuration of the feature weaving layer 500 according to the present embodiment. Each feature weaving layer 500 is configured to receive inputs of a first input tensor $$(Z_l^A)$$

and a second input tensor $$(Z_l^B)$$

of the third order. The subscript "l" corresponds to a hierarchy number of the feature weaving layer 500. That is, each input tensor $$(Z_l^A \text{ and } Z_l^B)$$

corresponds to an input for an $(l+1)^{th}$ feature weaving layer 500. The subscript "l" of the input tensor is assigned an integer between 0 and L−1. L indicates the number of feature weaving layers 500. If the value of L is 2 or more, it may be appropriately set in accordance with the embodiment.

The first input tensor $$(Z_l^A)$$

is configured to have a first axis along which first vertices belonging to a first set (A) of the input graph are arranged as elements, a second axis along which second vertices belonging to a second set (B) of the input graph are arranged as elements, and a third axis along which feature quantities ($D_l$ dimensions) related to edges outgoing from the first vertices to the second vertices are arranged as elements. In the present embodiment, for convenience of description, it is assumed that the number of first vertices is N, the number of second vertices is M, and the number of dimensions of the feature quantity is $D_l$. The values of N, M, and $D_l$ may be appropriately set in accordance with the embodiment. Also, for convenience, in the drawings, it is assumed that N is 4 and M is 3. The second input tensor $$(Z_l^B)$$

is configured to have a first axis along which the second vertices belonging to the second set (B) are arranged as elements, a second axis along which the first vertices belonging to the first set (A) are arranged as elements, and a third axis along which feature quantities ($D_l$ dimensions) related to edges outgoing from the second vertices to the first vertices are arranged as elements.

Each feature weaving layer 500 includes an encoder 505 and is configured to execute the following arithmetic operations. That is, each feature weaving layer 500 fixes the third axis of the second input tensor and circulates the axes other than the third axis of the second input tensor one by one $$(P_{A \leftrightarrow B}(Z_l^B)).$$

In the present embodiment, because the number of axes provided in the second input tensor $$(Z_l^B)$$

is three, circulating the axes other than the third axis one by one corresponds to replacing the first axis and the second axis. When viewed from the elements of the first axis, each element arranged on the third axis of the second input tensor $$(P_{A \leftrightarrow B}(Z_l^B)))$$

whose axis is circulated corresponds to a feature quantity related to an edge incoming from the second vertex to the first vertex. In addition, each feature weaving layer 500 concatenates feature quantities of elements of the first input tensor $$(Z_l^A)$$

and the second input tensor $$\left(P_{A\leftrightarrow B}\left(Z_l^B\right)\right)$$

whose axis is circulated (a cat operation). An example of the cat operation is connecting each element of the third axis of the second input tensor $$\left(P_{A\leftrightarrow B}\left(Z_l^B\right)\right)$$

whose axis is circulated to a rearmost end of the third axis of the first input tensor $$\left(Z_l^A\right).$$

According to these arithmetic operations, each feature weaving layer 500 generates the third-order first concatenated tensor $$\left(\text{cat}\left(Z_l^A, P_{A\leftrightarrow B}\left(Z_l^B\right)\right) \in \mathbb{R}^{N\times M\times 2D_l}\right).$$

Also, each feature weaving layer 500 fixes the third axis of the first input tensor and circulates the axes other than the third axis of the first input tensor one by one $$\left(P_{A\leftrightarrow B}\left(Z_l^A\right)\right).$$

As in the above-described arithmetic operation of the second input tensor, circulating the axes other than the third axis of the first input tensor one by one corresponds to replacing the first axis and the second axis of the first input tensor. When viewed from the elements of the first axis, each element arranged on the third axis of the first input tensor $$\left(P_{A\leftrightarrow B}\left(Z_l^A\right)\right)$$

whose axis is circulated corresponds to a feature quantity related to an edge incoming from the first vertex to the second vertex. In addition, each feature weaving layer 500 concatenates feature quantities of elements of the second input tensor $$\left(Z_l^B\right)$$

and the first input tensor $$\left(P_{A\leftrightarrow B}\left(Z_l^A\right)\right)$$

whose axis is circulated (a cat operation). An example of the cat operation is connecting each element of the third axis of the first input tensor $$\left(P_{A\leftrightarrow B}\left(Z_l^A\right)\right)$$

whose axis is circulated to a rearmost end of the third axis of the second input tensor $$\left(Z_l^B\right).$$

According to these arithmetic operations, each feature weaving layer 500 generates the third-order second concatenated tensor $$\left(\text{cat}\left(Z_l^B, P_{A\leftrightarrow B}\left(Z_l^A\right)\right) \in \mathbb{R}^{M\times N\times 2D_l}\right).$$

Subsequently, each feature weaving layer 500 divides the generated first concatenated tensor for each element of the first axis, inputs each obtained element $$\left(z_l^{a_i} \in \mathbb{R}^{1\times M\times 2D_l}\right)$$

to the encoder 505, and executes an arithmetic operation of the encoder 505. Each feature weaving layer 500 obtains the arithmetic operation result of the encoder 505 for each element to generate a third-order first output tensor $$\left(Z_{l+1}^A\right) \in \mathbb{R}^{N\times M\times D_{l+1}}$$

corresponding to the first input tensor $$\left(Z_l^A\right).$$

Also, each feature weaving layer 500 divides the generated second concatenated tensor for each element of the first axis, inputs each obtained element $$\left(z_l^{b_j} \in \mathbb{R}^{1\times N\times 2D_l}\right)$$

to the encoder 505, and executes an arithmetic operation of the encoder 505. Each feature weaving layer 500 obtains the arithmetic operation result of the encoder 505 for each element to generate a third-order second output tensor $$\left(Z_{l+1}^B \in \mathbb{R}^{M\times N\times D_{l+1}}\right)$$

corresponding to the second input tensor $$\left(Z_l^B\right).$$

The number of dimensions ($D_{l+1}$) of the feature quantity that is an element of the third axis of each output tensor may be appropriately decided on in accordance with the embodiment and may be the same as or different from the number of dimensions ($D_l$) before encoding is performed. Each feature weaving layer 500 is configured to execute each of the above arithmetic operations.

The encoder 505 is configured to derive a relative feature quantity of each element from all input feature quantities of elements. That is, each element of the first axis of a targeted concatenated tensor corresponds to each vertex (a first vertex $a_i$ or a second vertex $b_j$) of the target set and the targeted concatenated tensor indicates a state in which the feature quantities of the outgoing edge and the incoming edge for each vertex are concatenated. The encoder 505 is configured to derive a relative feature quantity of a targeted outgoing edge from all feature quantities related to the outgoing edge and the incoming edge with respect to the target vertex. The configuration of the encoder 505 may not be particularly limited if this arithmetic operation is possible and may be appropriately selected in accordance with the embodiment. Specific examples will be described below.

As shown in FIG. 2B, in an example of the present embodiment, the encoder 505 of each feature weaving layer 500 includes a single encoder commonly used between elements $$\left(z_l^{a_i} \text{ and } z_l^{b_j}\right)$$

of the first axes of the first and second concatenated tensors. That is, the feature weaving network 50 may be configured to include a single encoder for each feature weaving layer 500 (L encoders for L feature weaving layers 500). Thereby, the number of parameters provided in the estimation module 5 can be reduced. As a result, a calculation amount of the estimation module 5 can be limited and the efficiency of machine learning can be improved.

However, the number of encoders 505 constituting the feature weaving layer 500 may not be limited to this example. As another example, a common encoder is used between elements $$\left(z_l^{a_i}\right)$$

of the first axis of the first concatenated tensor and another common encoder is used between elements $$\left(z_l^{b_j}\right)$$

of the first axis of the second concatenated tensor. That is, the encoder 505 may include two encoders used separately for each concatenated tensor. Thereby, the feature quantity of the edge viewed from the first vertex and the feature quantity of the edge viewed from the second vertex can be encoded separately and each individual feature can be reflected according to an inference. As a result, an improvement in the accuracy of the estimation module can be expected. When distributions of feature quantities for the first set and the second set are different, the encoder 505 may be provided separately for the first and second concatenated tensors as described above. In yet another example, the encoder 505 may be provided separately for each element $$\left(z_l^{a_i} \text{ or } z_l^{b_j}\right)$$

of the first and second concatenated tensors.

As shown in FIG. 2A, a first feature weaving layer (i.e., a feature weaving layer arranged nearest to the input side) 5001 among the plurality of feature weaving layers 500 is configured to receive the first input tensor 601

$$\left(Z_0^A\right)$$

and the second input tensor 602

$$\left(Z_0^B\right)$$

from the input graph. As an example, the input graph is given in a general graph form and each input tensor (601 or 602) may be directly obtained from the given input graph. As another example, each input tensor (601 or 602) may be obtained from a result of a prescribed arithmetic process executed on the input graph. The prescribed arithmetic process may be executed by, for example, an arithmetic operator having any configuration of as a convolution layer or the like. That is, any arithmetic operator that is executed in a stage previous to the feature weaving network 50 may be provided. In yet another example, the input graph may be obtained directly in the form of each input tensor (601 or 602).

As an example, the feature weaving layers 500 may be arranged continuously in series. In this case, each of feature weaving layers (i.e., second and subsequent feature weaving layers) 500 other than the first feature weaving layer 5001 is configured to receive an output tensor generated by the feature weaving layer 500 arranged in an immediately previous stage as each input tensor. That is, the feature weaving layer 500 arranged as an $(l+1)^{th}$ feature weaving layer 500 is configured to receive each output tensor $$\left(Z_{l+1}^A \text{ or } Z_{l+1}^B\right)$$

generated by an $l^{th}$ feature weaving layer as each input tensor (in this case, l is an integer between 1 and L−1).

However, the arrangement of each feature weaving layer 500 may not be limited to this example. For example, another type of layer (e.g., a convolution layer, a fully-connected layer, or the like) may be inserted between adjacent feature weaving layers 500. In this case, another inserted layer is configured to execute an arithmetic process for each output tensor obtained from the feature weaving layer 500 arranged in an immediately previous stage. The feature weaving layer 500 arranged in a stage subsequent to the other inserted layer is configured to acquire each input tensor from the arithmetic operation result of the other layer. The number of other inserted layers may not be particularly limited and may be appropriately selected in accordance with the embodiment. The configuration of the other inserted layer may be appropriately determined in accordance with the embodiment. When other types of layers are inserted into a plurality of locations, the configuration of each layer may be the same or different in accordance with the insertion location.

Feature information includes the first output tensor 651

$$\left(Z_L^A\right)$$

and the second output tensor 652

$$(Z_L^B)$$

output from the last feature weaving layer (i.e., the feature weaving layer arranged nearest to the output side) 500L among the plurality of feature weaving layers 500. The estimator 55 is appropriately configured to derive a result of estimating the solution for the task from each output tensor (651 or 652). The configuration of the estimator 55 may not be particularly limited as long as such an operation can be executed and may be appropriately determined in accordance with the embodiment (for example, a configuration of each output tensor, a derivation format of an estimation result, or the like).

The estimator 55 may include, for example, a data table, a function equation, a rule, or the like. In an example in which the estimator 55 includes a function equation, the estimator 55 may include, for example, a neural network having any structure such as one convolution layer or one fully-connected layer. In this case, the estimator 55 may include a plurality of nodes (neurons), and a weight of a connection between nodes and a threshold value of each node are examples of parameters of the estimator 55. The threshold value of each node may include any activation function. Also, the output format of the estimator 55 may not be particularly limited and may be appropriately selected in accordance with the embodiment. As an example, the output of the estimator 55 may be configured to directly indicate an estimation result. As another example, the output of the estimator 55 may be configured to indirectly indicate the estimation result. In this case, an estimation result may be derived from the output of the estimator 55 by executing a prescribed arithmetic process such as threshold value determination for the output of the estimator 55.

Also, as shown in FIG. 2A, the feature weaving network 50 may be configured to have a residual structure. The residual structure is a structure having a shortcut path along which at least one output of the plurality of feature weaving layers is input to another subsequent feature weaving layer (which is two or more layers away from the next feature weaving layer) in addition to the next adjacent feature weaving layer.

In the example of FIG. 2A, the feature weaving network 50 has a shortcut path 501 in which the two feature weaving layers 500 are omitted. Thereby, an output of the feature weaving layer 500 immediately previous to the shortcut path 501 is input to the feature weaving layer 500 three layers ahead. In the example of FIG. 2A, for example, the shortcut path 501 is provided on the output side of the first feature weaving layer 5001. Thus, a fourth feature weaving layer 500 is configured to acquire an input tensor from an output tensor of a third feature weaving layer 500 and an output tensor of the first feature weaving layer 5001.

However, the number of feature weaving layers 500 omitted from the shortcut path 501 may not be limited to this example. The number of feature weaving layers 500 omitted from the shortcut path 501 may be one or three or more. Also, an interval for setting the shortcut path 501 may not be particularly limited and may be appropriately determined in accordance with the embodiment. The shortcut path 501 may be set at prescribed intervals, such as, for example, every three layers.

By providing this residual structure, the hierarchy of the feature weaving network 50 can be easily deepened (i.e., the number of feature weaving layers 500 can be easily increased). By deepening the hierarchy of the feature weaving network 50, the accuracy of feature extraction by the feature weaving network 50 can be enhanced. As a result, the accuracy of estimation of the estimation module 5 can be improved. Also, the structure of the feature weaving network 50 may not be limited to this example. The residual structure may be omitted.

As shown in FIGS. 1 and 2A, in the model generation device 1, the machine learning includes training the estimation module 5 so that an estimation result obtained by the estimator 55 is suitable for a correct answer (true value) of the task for each training graph 30 by inputting each training graph 30 as the input graph to the feature weaving network 50. On the other hand, in the estimation device 2, estimating the solution for the task for the target graph 221 using the trained estimation module 5 includes obtaining a result of estimating the solution for the task from the estimator 55 by inputting the target graph 221 as the input graph to the feature weaving network 50.

Features

As described above, the feature weaving network 50 of the estimation module 5 according to the present embodiment is configured to refer to the features of the input graph for each edge rather than for each vertex. In each feature weaving layer 500, the encoder 505 reflects a feature quantity of another edge in a feature quantity of each edge on the basis of each vertex. The more the feature weaving layers 500 are stacked, the more the feature quantities of the edges related to the vertices away from each vertex can be reflected in the feature quantities of the edges related to each vertex. In addition, the encoder 505 is configured to derive a relative feature quantity of each edge from all feature quantities of edges input with respect to a target vertex without calculating a weighted sum of features of adjacent edges at each vertex. According to the configuration of the encoder 505, excessive smoothing can be prevented from occurring even if the feature weaving layers 500 are stacked. Thus, the hierarchy of the feature weaving network 50 can be deepened in accordance with the difficulty of the task. As a result, in the feature weaving network 50, it is possible to extract a feature of the input graph appropriate for accomplishing the task. That is, the accuracy of feature extraction by the feature weaving network 50 can be expected to be improved. Thereby, in the estimator 55, highly accurate estimation can be expected on the basis of the obtained feature quantities. Therefore, according to the present embodiment, for complex tasks, it is also possible to deepen the hierarchy of the feature weaving network 50. In accordance with this, the accuracy of estimating the solution for the task represented in the graph can also be improved with respect to the estimation module 5. In the model generation device 1, it is possible to expect the generation of the trained estimation module 5 that can estimate the solution for the task for the input graph with high accuracy. In the estimation device 2, it is possible to expect highly accurate estimation of the solution for the task for the target graph 221 using this trained estimation module 5.

Also, in the example of FIG. 1, the model generation device 1 and the estimation device 2 are concatenated with each other via a network. For example, the type of network may be appropriately selected from the Internet, a wireless communication network, a mobile communication network, a telephone network, a dedicated network, and the like. However, a method of exchanging data between the model generation device 1 and the estimation device 2 may not be limited to this example and may be appropriately selected in accordance with the embodiment. For example, data may be exchanged between the model generation device 1 and the estimation device 2 using a storage medium.

Also, in the example of FIG. 1, the model generation device 1 and the estimation device 2 include separate computers. However, the configuration of the estimation system 100 according to the present embodiment may not be limited to this example and may be appropriately determined in accordance with the embodiment. For example, the model generation device 1 and the estimation device 2 may be an integrated computer. Also, for example, at least one of the model generation device 1 and the estimation device 2 may include a plurality of computers.

§ 2 CONFIGURATION EXAMPLES

[Hardware Configuration]
<Model Generation Device>

Figure 3:
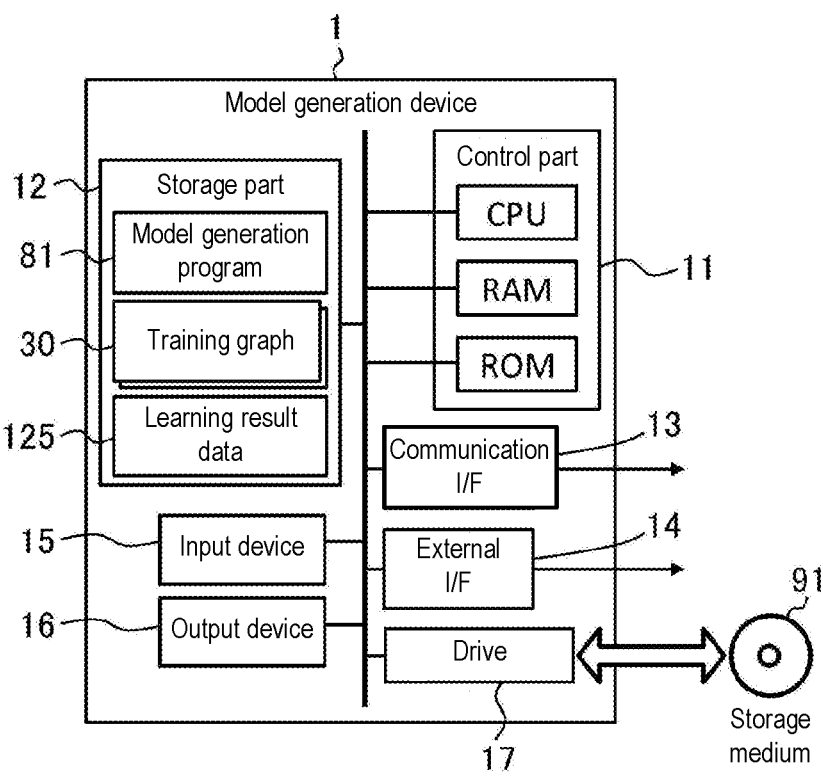
FIG. 3 schematically shows an example of a hardware configuration of a model generation device according to the embodiment.

FIG. 3 schematically shows an example of a hardware configuration of the model generation device 1 according to the present embodiment. As shown in FIG. 3, the model generation device 1 according to the present embodiment is a computer in which the control part 11, the storage part 12, the communication interface 13, the external interface 14, the input device 15, the output device 16, and the drive 17 are electrically connected. Also, in FIG. 3, the communication interface and the external interface are described as a "communication I/F" and an "external I/F."

The control part 11 includes a central processing unit (CPU), which is a hardware processor, a random-access memory (RAM), a read-only memory (ROM), and the like, and is configured to execute information processing on the basis of programs and various types of data. The storage part 12 is an example of a memory, and includes, for example, a hard disk drive, a solid-state drive, and the like. In the present embodiment, the storage part 12 stores various types of information such as a model generation program 81, a plurality of training graphs 30, and learning result data 125.

The model generation program 81 is a program for causing the model generation device 1 to execute machine learning information processing (FIG. 8) for generating the trained estimation module 5 to be described below. The model generation program 81 includes a series of instructions for the information processing. The plurality of training graphs 30 are used for the machine learning of the estimation module 5. The learning result data 125 indicates information about the trained estimation module 5 generated by the implementation of machine learning. In the present embodiment, the learning result data 125 is generated as a result of executing the model generation program 81. Details will be described below.

The communication interface 13 is, for example, a wired local area network (LAN) module, a wireless LAN module, or the like, and is an interface for performing wired or wireless communication via a network. The model generation device 1 can execute data communication via a network with other information processing devices using the communication interface 13. The external interface 14 is, for example, a universal serial bus (USB) port, a dedicated port, or the like, and is an interface for connecting to an external device. The types and number of external interfaces 14 may be arbitrarily selected. The training graph 30 may be obtained by, for example, a sensor such as a camera. Alternatively, the training graph 30 may be generated by another computer. In this case, the model generation device

1 may be connected to the sensor or another computer via at least one of the communication interface 13 and the external interface 14.

The input device 15 is a device for performing an input process such as a mouse or keyboard. Also, the output device 16 is, for example, a device for performing an output process such as a display or a speaker. An operator such as a user can operate the model generation device 1 using the input device 15 and the output device 16. The training graph 30 may be obtained in an input process via the input device 15.

The drive 17 is, for example, a CD drive, a DVD drive, or the like, and is a drive device for reading various types of information such as programs stored in the storage medium 91. The storage medium 91 is a medium that stores information such as a program according to an electrical, magnetic, optical, mechanical or chemical function so that various types of information such as stored programs can be read by another device, a machine, or the like in addition to the computer. At least one of the model generation program 81 and the plurality of training graphs 30 may be stored in the storage medium 91. The model generation device 1 may acquire at least one of the model generation program 81 and the plurality of training graphs 30 described above from the storage medium 91. Also, in FIG. 3, a disk-type storage medium such as a CD or DVD is exemplified as an example of the storage medium 91. However, the type of the storage medium 91 may not be limited to a disk type or may be a type other than a disk type. Examples of the storage medium other than the disk type can include a semiconductor memory such as a flash memory. A type of the drive 17 may be arbitrarily selected in accordance with a type of the storage medium 91.

Also, in relation to a specific hardware configuration of the model generation device 1, components can be omitted, replaced, and added as appropriate in accordance with the embodiment. For example, the control part 11 may include a plurality of hardware processors. The hardware processor may include a microprocessor, a field-programmable gate array (FPGA), a digital signal processor (DSP), or the like. The storage part 12 may include a RAM and a ROM included in the control part 11. At least one of the communication interface 13, the external interface 14, the input device 15, the output device 16, and the drive 17 may be omitted. The model generation device 1 may be configured in a plurality of computers. In this case, the hardware configuration of each computer may or may not match. Also, the model generation device 1 may be a general-purpose server device, a personal computer (PC), or the like in addition to an information processing device designed exclusively for a provided service.

<Estimation Device>

Figure 4:
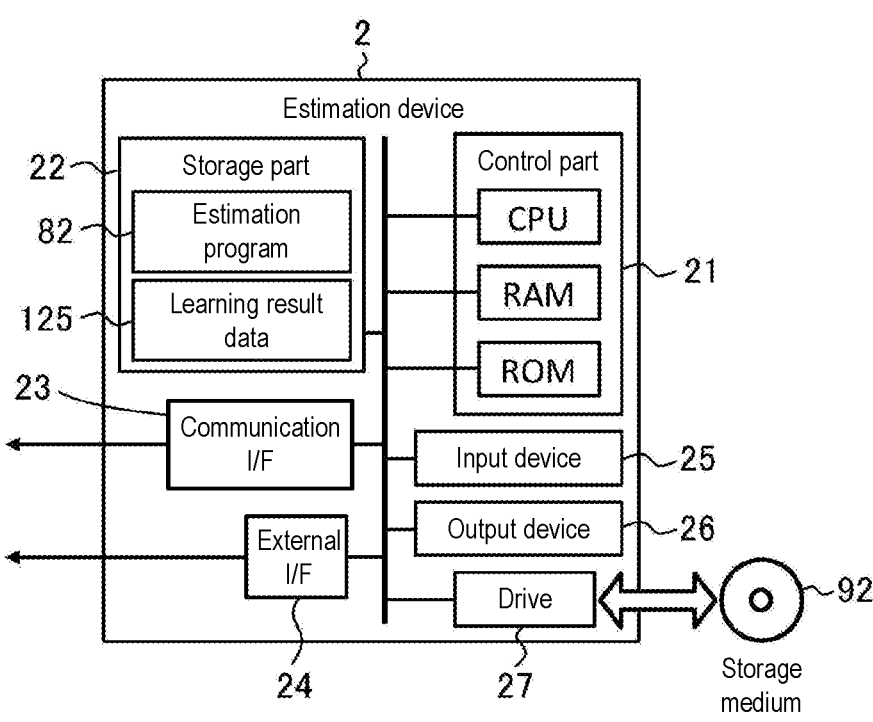
FIG. 4 schematically shows an example of a hardware configuration of an estimation device according to the embodiment.

FIG. 4 schematically shows an example of a hardware configuration of the estimation device 2 according to the present embodiment. As shown in FIG. 4, the estimation device 2 according to the present embodiment is a computer in which a control part 21, a storage part 22, a communication interface 23, an external interface 24, an input device 25, an output device 26, and a drive 27 are electrically connected.

The parts from the control part 21 to the drive 27 and the storage medium 92 of the estimation device 2 may be configured like the parts from the control part 11 to the drive 17 and the storage medium 91 of the model generation device 1. The control part 21 includes a CPU, which is a hardware processor, a RAM, a ROM, and the like, and is configured to execute various types of information processing on the basis of programs and data. The storage part 22 includes, for example, a hard disk drive, a solid-state drive, or the like. In the present embodiment, the storage part 22 stores various types of information such as an estimation program 82 and the learning result data 125.

The estimation program 82 is a program for causing the estimation device 2 to execute information processing (FIG. 9) for performing the estimation task using the trained estimation module 5 to be described below. The estimation program 82 includes a series of instructions for the information processing. At least one of the estimation program 82 and the learning result data 125 may be stored in the storage medium 92. Also, the estimation device 2 may acquire at least one of the estimation program 82 and the learning result data 125 from the storage medium 92.

Like the training graph 30, the target graph 221 may be obtained by, for example, a sensor such as a camera. Alternatively, the target graph 221 may be generated by another computer. In this case, the estimation device 2 may be connected to the sensor or another computer via at least one of the communication interface 23 and the external interface 24. Alternatively, the target graph 221 may be obtained in an input process via the input device 25.

Also, in relation to a specific hardware configuration of the estimation device 2, components can be omitted, replaced, and added as appropriate in accordance with the embodiment. For example, the control part 21 may include a plurality of hardware processors. The hardware processor may include a microprocessor, an FPGA, a DSP, or the like. The storage part 22 may include a RAM and a ROM included in the control part 21. At least one of the communication interface 23, the external interface 24, the input device 25, the output device 26, and the drive 27 may be omitted. The estimation device 2 may include a plurality of computers. In this case, hardware configurations of the computers may be the same as or different from each other. Also, the estimation device 2 may be a general-purpose server device, a general-purpose PC, a tablet PC, a terminal device, or the like in addition to an information processing device designed exclusively for a provided service.

[Software Configuration]
<Model Generation Device>

Figure 5:
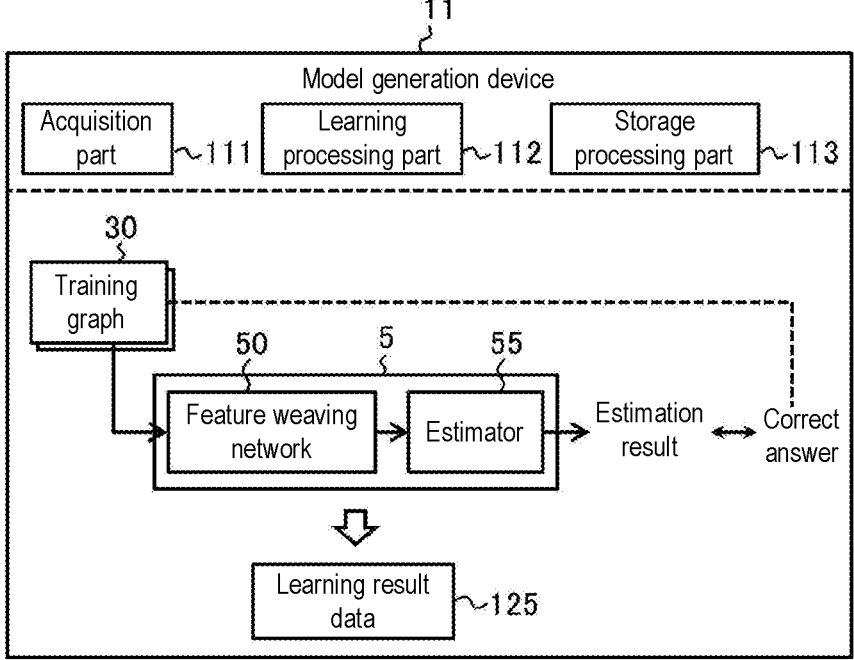
FIG. 5 schematically shows an example of a software configuration of a model generation device according to the embodiment.

FIG. 5 schematically shows an example of a software configuration of the model generation device 1 according to the present embodiment. The control part 11 of the model generation device 1 loads the model generation program 81 stored in the storage part 12 into the RAM. Also, the control part 11 interprets and executes instructions included in the model generation program 81 loaded into the RAM by the CPU and controls each component. Thereby, as shown in FIG. 5, the model generation device 1 according to the present embodiment operates as a computer including an acquisition part 111, a learning processing part 112, and a storage processing part 113 as software modules. That is, in the present embodiment, each software module of the model generation device 1 is implemented by the control part 11 (the CPU).

The acquisition part 111 is configured to acquire a plurality of training graphs 30. The learning processing part 112 is configured to perform the machine learning of the estimation module 5 using the plurality of training graphs 30 that has been acquired. The estimation module 5 includes the feature weaving network 50 and the estimator 55. The machine learning includes training the estimation module 5 so that an estimation result obtained by the estimator 55 is suitable for a correct answer (true value) of the task for each training graph 30 by inputting each training graph 30 as the input graph to the feature weaving network 50. The correct answer (true value) may be given according to a prescribed rule such as the satisfaction of a prescribed measure with, for example, the absence of a blocking pair in the case of a stable matching problem. Alternatively, each acquired training graph 30 may be associated with a correct answer label (a training signal). Each correct answer label may be configured to indicate the correct answer (true value) of the corresponding training graph 30.

The storage processing part 113 is configured to generate information about the trained estimation module 5 generated in machine learning as the learning result data 125 and store the generated learning result data 125 in a prescribed storage area. The learning result data 125 may be appropriately configured to include information for reproducing the trained estimation module 5.

(Encoder)

As shown in FIGS. 2A and 2B, the feature weaving network 50 includes a plurality of feature weaving layers 500 and each feature weaving layer 500 includes an encoder 505. If relative feature quantities of elements can be derived from the feature quantities of all input elements, the configuration of the encoder 505 may be appropriately selected in accordance with the embodiment. In order to cope with the variable number of elements of the concatenated tensor due to a difference in the number of vertices of the input graph, the presence or absence of edges, or the like, the encoder 505 is preferably configured to receive variable-length inputs. In the present embodiment, one of the following two configuration examples may be adopted as the configuration of the encoder 505.

(1) First Configuration Example

Figure 6A:
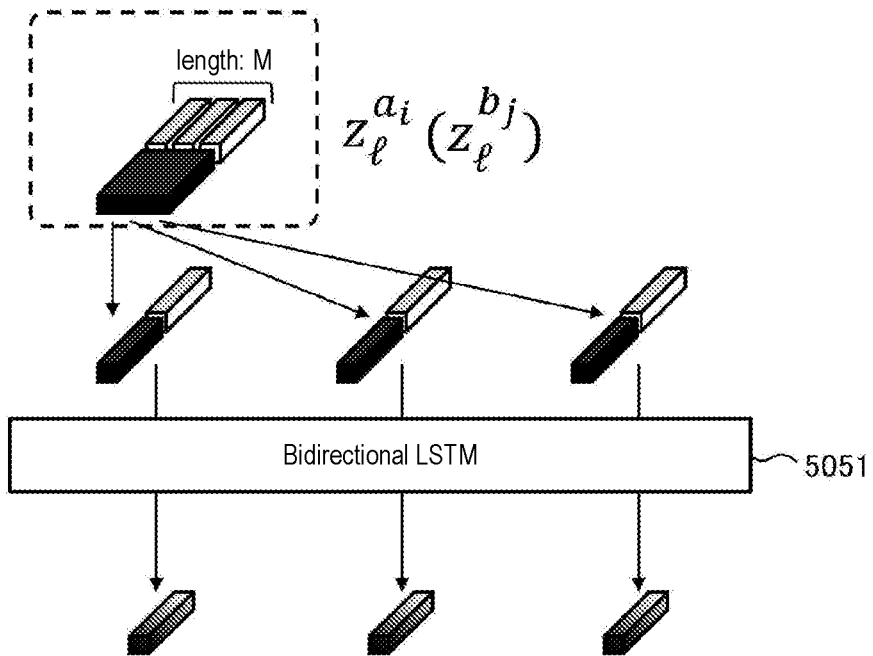
FIG. 6A schematically shows an example of an encoder configuration arranged in the feature weaving layer according to the embodiment.

FIG. 6A schematically shows an example of a configuration of an encoder 5051 according to the present embodiment. The encoder 5051 is an example of the encoder 505. In the first configuration example, the encoder 5051 includes a bidirectional long short-term memory (LSTM).

The bidirectional LSTM includes a plurality of nodes (neurons). A weight of a connection between nodes and a threshold value of each node are examples of parameters of the encoder 5051. The threshold value of each node may include any activation function. Examples of a specific configuration of the bidirectional LSTM are proposed in, for example, Alex Graves and Jurgen Schmidhuber, "Frame-wise phoneme classification with bidirectional LSTM and other neural network architectures," Neural Networks, 2005 and the like.

Thereby, the encoder 5051 is configured to receive feature quantities arranged on the third axis for each element of the second axis in a variable-length sequence and derive feature quantities arranged on a third axis of an output tensor for each element of the second axis by depending on previously input feature quantities and subsequently input feature quantities bidirectionally. This encoder 5051 can receive the input of a variable-length concatenated tensor derived from a graph having any configuration and appropriately derive a relative feature quantity of a targeted outgoing edge from all feature quantities related to an outgoing edge and an incoming edge for a target vertex.

(2) Second Configuration Example

Figures 6B, 7:
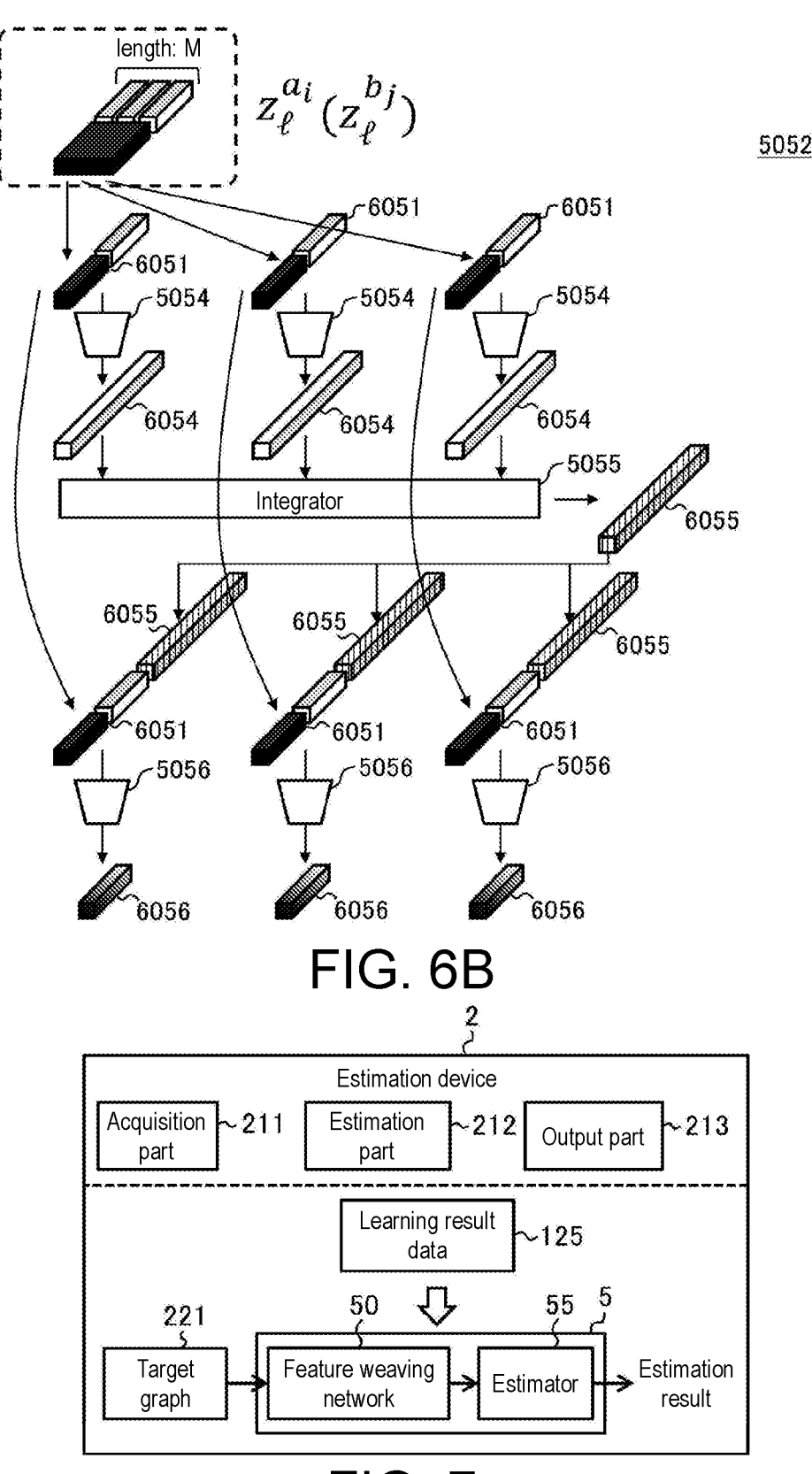
FIG. 6B schematically shows an example of an encoder configuration arranged in the feature weaving layer according to the embodiment.
FIG. 7 schematically shows an example of a software configuration of an estimation device according to the embodiment.

FIG. 6B schematically shows an example of a configuration of the encoder 5052 according to the present embodiment. The encoder 5052 is an example of the encoder 505.

In the second configuration example, the encoder 5052 includes a first combiner 5054, an integrator 5055, and a second combiner 5056.

The first combiner 5054 is configured to combine feature quantities 6051 arranged on the third axis for each element of the second axis of the concatenated tensor (i.e., combine data from input tensors). The integrator 5055 is configured to integrate combination results 6054 of the first combiner 5054 for elements of the second axis. As an example, the integrator 5055 may be configured to calculate statistical information such as, for example, a maximum value, a minimum value, and an average value, for each element of the third axis (feature quantity). The second combiner 5056 is configured to derive feature quantities 6051 arranged on the third axis for each element of the second axis and feature quantities 6056 arranged on the third axis of the output tensor from an integration result 6055 of the integrator 5055 for each element of the second axis. As an example, each combiner (5054 or 5056) may be provided separately for each element of the second axis. As another example, each single combiner (5054 or 5056) may be commonly used between the elements of the second axis.

As long as the above-described arithmetic operation can be executed, the configuration of the first combiner 5054, the integrator 5055, and the second combiner 5056 may not be particularly limited and may be appropriately selected in accordance with the embodiment. Each combiner (5054 or 5056) may include, for example, any function expression or the like. As an example, the parameters constituting the function expression correspond to the parameters of each combiner (5054 or 5056). The parameters of the first combiner 5054 and the second combiner 5056 are examples of the parameters of the encoder 5052.

According to the encoder 5052, it is possible to appropriately derive a relative feature quantity of a targeted outgoing edge from all feature quantities related to the outgoing edge and the incoming edge with respect to the target vertex by combining the integration result 6055 obtained by the integrator 5055 with the feature quantity 6051 for each element of the second axis by the second combiner 5056. Also, each combiner (5054 or 5056) is configured to execute an arithmetic operation independently for each element and configured to apply an arithmetic operation of the integrator 5055 to a variable-length element sequence, such that the encoder 5052 can be configured to receive a variable-length input.

(Machine Learning)

As shown in FIG. 5, an estimation result for each training graph 30 can be obtained by inputting each training graph 30 as an input graph to the estimation module 5 and executing a forward arithmetic process of the feature weaving network 50 and the estimator 55. The learning processing part 112 is configured to adjust parameters of the estimation module 5 (e.g., parameters of the encoder 505 of each feature weaving layer 500 and the estimator 55) so that an error between an estimation result obtained for each training graph 30 and the correct answer is reduced in machine learning.

The storage processing part 113 is configured to generate learning result data 125 for reproducing the trained estimation module 5 generated in the above-described machine learning. As long as the trained estimation module 5 can be reproduced, the configuration of the learning result data 125 may not be particularly limited and may be appropriately determined in accordance with the embodiment. As an example, the learning result data 125 may include information indicating a value of each parameter obtained in the adjustment of the machine learning described above. In some cases, the learning result data 125 may include information indicating a structure of the estimation module 5. The structure may be identified, for example, by the number of layers, the type of each layer, the number of nodes included in each layer, a combination relationship between nodes of adjacent layers, and the like.

<Estimation Device>

FIG. 7 schematically shows an example of a software configuration of the estimation device 2 according to the present embodiment. The control part 21 of the estimation device 2 loads the estimation program 82 stored in the storage part 22 into the RAM. The control part 21 interprets and executes instructions included in the estimation program 82 loaded into the RAM by the CPU and controls each component. Thereby, as shown in FIG. 7, the estimation device 2 according to the present embodiment operates as a computer including an acquisition part 211, an estimation part 212, and an output part 213 as a software module. That is, in the present embodiment, each software module of the estimation device 2 is also implemented by the control part 21 (CPU) like the model generation device 1.

The acquisition part 211 is configured to acquire the target graph 221. The estimation part 212 includes a trained estimation module 5 by holding the learning result data 125. The estimation part 212 is configured to estimate the solution for the task for the acquired target graph 221 using the trained estimation module 5. Estimating the solution for the task for the target graph 221 using the trained estimation module 5 includes obtaining a result of estimating the solution for the task from the estimator 55 by inputting the target graph 221 as the input graph to the feature weaving network 50. The output part 213 is configured to output information about the result of estimating the solution for the task.

Others

Software modules of the model generation device 1 and the estimation device 2 will be described in detail in operation examples to be described below. Also, in the present embodiment, an example in which the software modules of the model generation device 1 and the estimation device 2 are all implemented by a general-purpose CPU is described. However, some or all of the above-described software modules may be implemented by one or more dedicated processors (e.g., graphics processing units). Each module may be implemented as a hardware module. Also, in relation to the software configuration of each of the model generation device 1 and the estimation device 2, software modules may be omitted, replaced, and added as appropriate in accordance with the embodiment.

§ 3 OPERATION EXAMPLES

[Model Generation Device]

Figures 8, 9:
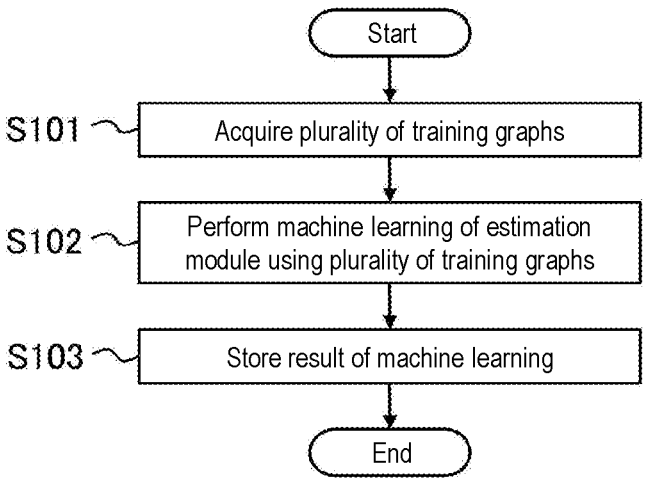
FIG. 8 is a flowchart showing an example of a processing procedure of a model generation device according to the embodiment.
FIG. 9 is a flowchart showing an example of a processing procedure of an estimation device according to the embodiment.

FIG. 8 is a flowchart showing an example of a processing procedure of the model generation device 1 related to machine learning according to the present embodiment. The processing procedure of the model generation device 1 to be described below is an example of the model generation method. However, the processing procedure of the model generation device 1 to be described below is merely an example and each step may be changed to a maximum extent. Also, for the following processing procedure, steps may be omitted, replaced, and added as appropriate in accordance with the embodiment.

(Step S101)

In step S101, the control part 11 operates as the acquisition part 111 and acquires a plurality of training graphs 30.

Each training graph 30 may be appropriately generated in accordance with the task ability acquired by the estimation module 5. A target condition for accomplishing the task may be appropriately given and each training graph 30 may be generated from the given condition. Also, each training graph 30 may be obtained from existing data indicating an existing transportation network, an existing communication network, or the like. In addition, each training graph 30 may be obtained from image data. The image data may be obtained by a camera or may be appropriately generated by a computer.

A data format of each training graph 30 may not be particularly limited and may be appropriately selected in accordance with the embodiment. As an example, each training graph 30 may include an adjacency list or an adjacency matrix. As another example, each training graph 30 may include other data formats (e.g., image data and the like) other than an adjacency list and an adjacency matrix. As an example of the other data formats, each training graph 30 may include image data. In this case, each pixel may correspond to a vertex and a relationship between the pixels may correspond to an edge.

The correct answer (true value) for each training graph 30 may be appropriately given. As an example, the correct answer (true value) may be given according to a prescribed rule. As another example, the correct answer (true value) may be indicated by a correct answer label (training signal). In this case, the correct answer label corresponding to each training graph 30 may be appropriately generated and the generated correct answer label may be associated with each training graph 30. Thereby, each training graph 30 may be generated in the form of a dataset associated with a correct answer label.

Each training graph 30 may be automatically generated by an operation of a computer or may be manually generated by at least partially including an operation of an operator. Also, the generation of each training graph 30 may be performed by the model generation device 1 or by another computer other than the model generation device 1. That is, the control part 11 may generate each training graph 30 automatically or manually by the operation of the operator via the input device 15. Alternatively, the control part 11 may acquire each training graph 30 generated by another computer, for example, via a network, the storage medium 91, or the like. Some of the plurality of training graphs 30 may be generated by the model generation device 1 and others may be generated by one or more other computers. At least one of the plurality of training graphs 30 may be generated, for example, by a generative model including a machine learning model (e.g., a generative model included in a generative adversarial network).

The number of training graphs 30 to be acquired may not be particularly limited and may be appropriately determined in accordance with the embodiment so that machine learning can be performed. When the plurality of training graphs 30 is acquired, the control part 11 proceeds to the next step S102.

(Step S102)

In step S102, the control part 11 operates as the learning processing part 112 and performs the machine learning of the estimation module 5 using the plurality of training graphs 30 that has been acquired.

As an example of machine learning processing, first, the control part 11 performs the initial setting of the estimation module 5 serving as a processing target of machine learning. The initial values of the structure and parameters of the estimation module 5 may be given by a template or determined by an input of the operator. Also, when additional learning or relearning is performed, the control part 11 may perform the initial setting of the estimation module 5 on the basis of the learning result data obtained in previous machine learning.

Next, the control part 11 trains the estimation module 5 (i.e., adjusts the value of the parameter of the estimation module 5) so that the result of estimating the solution for the task for each training graph 30 is suitable for the correct answer (true value) in machine learning. For this training process, a stochastic gradient descent method, a mini-batch gradient descent method, or the like may be used.

As an example of a training process, first, the control part 11 inputs each training graph 30 to the estimation module 5 and executes a forward arithmetic process. As an example, the control part 11 acquires an input tensor (601 or 602) from each training graph 30 and inputs each obtained input tensor (601 or 602) to the first feature weaving layer 5001 arranged nearest to the input side of the feature weaving network 50. Subsequently, the control part 11 executes the arithmetic process of each feature weaving layer 500 in the forward direction. In the arithmetic process of each feature weaving layer 500, the control part 11 generates a concatenated tensor from each input tensor. Subsequently, the control part 11 generates an output tensor from each concatenated tensor using the encoder 505. In the present embodiment, one of the above-described two encoders (5051 and 5052) may be adopted as the encoder 505. As a result of executing the arithmetic process of each feature weaving layer 500 in the forward direction, the control part 11 acquires each output tensor (651 or 652) from the last feature weaving layer 500L. Also, the control part 11 inputs each obtained output tensor (651 or 652) to the estimator 55 and executes the arithmetic process of the estimator 55. In this series of forward arithmetic processes, the control part 11 acquires a result of estimating the solution for the task for each training graph 30 from the estimator 55.

Next, the control part 11 calculates an error between the obtained estimation result and the corresponding correct answer. As described above, the correct answer may be given according to a prescribed rule or may be given according to the corresponding correct answer label. A loss function may be used to calculate the error. The loss function may be appropriately set in accordance with, for example, the task, the format of the correct answer, and the like. Subsequently, the control part 11 calculates a gradient of the calculated error. The control part 11 sequentially calculates errors of values of parameters of the estimation module 5 including parameters of the estimator 55 and the encoder 505 of each feature weaving layer 500 from the output side using the calculated error gradient in an error backpropagation method. The control part 11 updates a value of a parameter of the estimation module 5 on the basis of each calculated error. A degree to which the value of each parameter is updated may be adjusted according to a learning rate. The learning rate may be given in a designation process of the operator or as a set value within the program.

The control part 11 adjusts the value of each parameter so that a sum of the calculated errors becomes small for each training graph 30 in the above-described series of update processes. For example, the control part 11 may iterate the adjustment of the value of each parameter in the above-described series of update processes until a prescribed condition such as a condition that a process is executed a specified number of times or a condition that a sum of calculated errors is less than or equal to a threshold value is satisfied. As a result of this machine learning process, the control part 11 can generate the trained estimation module 5 by acquiring the ability to perform a desired estimation task according to the training graph 30 that has been used (i.e., estimate the solution for the task for a given graph). When the machine learning process is completed, the control part 11 moves the process to the next step S103.

(Step S103)

In step S103, the control part 11 operates as a storage processing part 113 and generates information about the trained estimation module 5 generated in machine learning as learning result data 125. Also, the control part 11 stores the generated learning result data 125 in a prescribed storage area.

The prescribed storage area may be, for example, the RAM in the control part 11, the storage part 12, an external storage device, a storage medium, or a combination thereof. The storage medium may be, for example, a CD, a DVD, or the like, and the control part 11 may store the learning result data 125 in the storage medium via the drive 17. The external storage device may be, for example, a data server such as a network attached storage (NAS). In this case, the control part 11 may store the learning result data 125 in the data server via the network using the communication interface 13. Also, the external storage device may be, for example, an external storage device connected to the model generation device 1 via the external interface 14.

When the storage of the learning result data 125 is completed, the control part 11 ends the processing procedure of the model generation device 1 according to the present operation example.

Also, the generated learning result data 125 may be provided to the estimation device 2 at any timing. For example, the control part 11 may transmit the learning result data 125 to the estimation device 2 as the processing of step S103 or separately from the processing of step S103. The estimation device 2 may acquire the learning result data 125 by receiving this transmission. Also, for example, the estimation device 2 may acquire the learning result data 125 by accessing the model generation device 1 or the data server via a network using the communication interface 23. Also, for example, the estimation device 2 may acquire the learning result data 125 via the storage medium 92. Also, for example, the learning result data 125 may be incorporated into the estimation device 2 in advance.

Furthermore, the control part 11 may update or newly generate the learning result data 125 by periodically or irregularly iterating the processing of steps S101 to S103. During this iteration, at least a part of the training graph 30 for use in machine learning may be changed, modified, added, deleted, or the like as appropriate. Also, the control part 11 may update the learning result data 125 held by the estimation device 2 by providing the updated or newly generated learning result data 125 to the estimation device 2 in any method.

[Estimation Device]

FIG. 9 is a flowchart showing an example of a processing procedure related to the execution of an estimation task by the estimation device 2 according to the present embodiment. The processing procedure of the estimation device 2 to be described below is an example of the estimation method. However, the processing procedure of the estimation device 2 to be described below is merely an example and each step may be changed to a maximum extent. Also, for the following processing procedure, steps may be omitted, replaced, and added as appropriate in accordance with the embodiment.

(Step S201)

In step S201, the control part 21 operates as the acquisition part 211 and acquires the target graph 221 subject to the estimation task. The configuration of the target graph 221 is similar to that of the training graph 30. The data format of the target graph 221 may be appropriately selected in accordance with the embodiment. The target graph 221 may be generated from, for example, conditions input via the input device 25 or the like. Alternatively, the target graph 221 may be obtained from existing data. In addition, the target graph 221 may be obtained from image data. The control part 21 may directly acquire the target graph 221. Alternatively, the control part 21 may indirectly acquire the target graph 221 via, for example, a network, a sensor, another computer, a storage medium 92, or the like. When the target graph 221 is acquired, the control part 21 moves the process to the next step S202.

(Step S202)

In step S202, the control part 21 operates as an estimation part 212 and sets the trained estimation module 5 with reference to the learning result data 125. Also, the control part 21 uses the trained estimation module 5 to estimate a solution for the task for the acquired target graph 221. This estimation-specific arithmetic process may be similar to the forward arithmetic process in a training process of the above-described machine learning. The control part 21 inputs the target graph 221 to the trained estimation module 5 and executes the forward arithmetic process of the trained estimation module 5. As a result of executing this arithmetic process, the control part 21 can acquire a result of estimating the solution for the task for the target graph 221 from the estimator 55. If the estimation result is acquired, the control part 21 moves the process to the next step S203.

(Step S203)

In step S203, the control part 21 operates as the output part 213 and outputs information about the estimation result.

The output destination and the content of the output information may be appropriately determined in accordance with the embodiment. For example, the control part 21 may output the estimation result obtained by step S202 to the output device 26 or an output device of another computer as it is. Also, the control part 21 may execute some information processing on the basis of the obtained estimation result. Also, the control part 21 may output a result of executing the information processing as information about the estimation result. The output of the result of executing this information processing may include controlling an operation of a control target device in accordance with the estimation result and the like. An output destination may be, for example, the output device 26, the output device of the other computer, the control target device, or the like.

When the output of the information about the estimation result is completed, the control part 21 ends the processing procedure of the estimation device 2 according to the present operation example. Also, the control part 21 may continuously and iteratively execute a series of information processing of steps S201 to S203. An iteration timing may be appropriately determined in accordance with the embodiment. Thereby, the estimation device 2 may be configured to continuously and iteratively perform the above-described estimation task.

Features

As described above, the feature weaving network 50 of the estimation module 5 according to the present embodiment is configured to refer to the features of the input graph for each edge rather than for each vertex. In each feature weaving layer 500 of the feature weaving network 50, the encoder 505 reflects a feature quantity related to another edge in a feature quantity related to each edge on the basis of each vertex.

Figure 10:
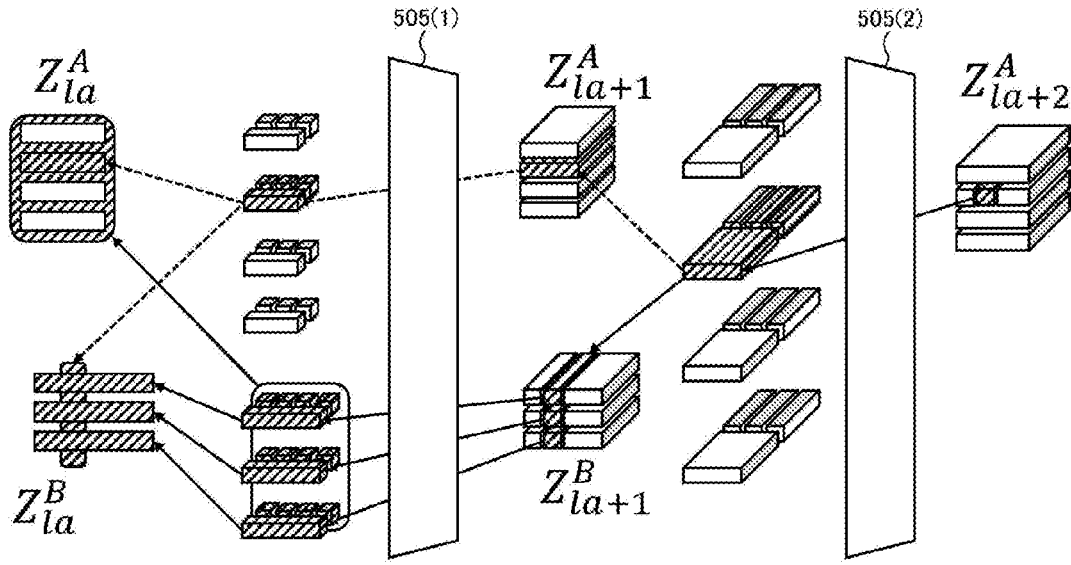
FIG. 10 schematically shows an example of a state in which it goes through two feature weaving layers according to the embodiment.

FIG. 10 schematically shows an example of a state in which a feature quantity related to another edge is reflected through the two feature weaving layers 500 according to the present embodiment. Before being input to the feature weaving layer 500, a first input tensor $$(Z_{ia}^{A})$$

indicates a feature quantity related to an edge outgoing from the first vertex to the second vertex on the basis of the first vertex. A second input tensor $$(Z_{ia}^{B})$$

indicates a feature quantity related to an edge outgoing from the second vertex to the first vertex on the basis of the second vertex. The first concatenated tensor indicates a state in which feature quantities related to the edge outgoing to the second vertex and the edge incoming from the second vertex are combined on the basis of the first vertex.

When the first concatenated tensor is encoded in an encoder 505(1) of the first feature weaving layer 500, the feature quantities of the edge outgoing to the targeted second vertex and the edge incoming from the targeted second vertex are incorporated and a relationship associated with another second vertex (i.e., an edge outgoing to another second vertex and an edge incoming from the other second vertex) are reflected in the incorporation of the feature quantities. Consequently, each element of a first output tensor $$(Z_{ia+1}^{A})$$

obtained via the encoder 505(1) indicates a feature quantity derived by incorporating the feature quantities of the edge outgoing to the targeted second vertex and the edge incoming from the targeted second vertex after reflecting the relationship associated with the other second vertex in relation to the targeted first vertex. Likewise, each element of a second output tensor $$(Z_{ia+1}^{B})$$

indicates a feature quantity derived by incorporating the feature quantities of the edge outgoing to the targeted first vertex and the edge incoming from the targeted first vertex after reflecting the relationship associated with the other first vertex in relation to the targeted second vertex.

Before passing through the second feature weaving layer 500, input tensors are derived from the output tensors $$(Z_{ia+1}^{A} \text{ and } Z_{ia+1}^{B})$$

and the input tensors are concatenated after the axis is circulated. Thereby, each concatenated tensor is generated. In this step, the first concatenated tensor indicates a state in which the feature quantities related to the edge outgoing to the second vertex and the edge incoming from the second vertex are combined on the basis of the first vertex and a relationship associated with another second vertex based on the first vertex and a relationship associated with another first vertex based on the second vertex are reflected in the feature quantities. Consequently, each element of a first output tensor $$(Z_{ia+2}^{A})$$

obtained via an encoder 505(2) of the second feature weaving layer 500 indicates a feature quantity derived by further incorporating the feature quantities of the edge outgoing to the targeted second vertex and the edge incoming from the targeted second vertex after reflecting a relationship associated with another second vertex and a relationship associated with another first vertex based on each second vertex in relation to the targeted first vertex.

That is, a feature quantity related to an edge in a range of size 2 from the targeted first vertex (i.e., an edge between the targeted first vertex and another second vertex and an edge between each second vertex and another first vertex) is reflected in a feature quantity related to an edge between the targeted first vertex and the targeted second vertex as a feature quantity indicated by each element of the first output tensor $$(Z_{ia+2}^{A}).$$

As shown in FIG. 10, the same is true for the backpropagation process of the machine learning described above. In the backpropagation process, a target element (a diagonal line element) of the first output tensor obtained through the two feature weaving layers 500 extends in a range of size 1 every time it goes back through one feature weaving layer 500 (encoder 505), as indicated by a diagonal line portion in FIG. 10.

Therefore, as the feature weaving layer 500 is stacked, a feature quantity of an edge related to a vertex away from each vertex can be reflected in a feature quantity of an edge related to each vertex. Also, as described above, a range of other edges to be referred to extends in accordance with the number of feature weaving layers 500. Thus, the number of feature weaving layers 500 is preferably greater than or equal to a size of the input graph. The size of the input graph can be calculated by selecting any two vertices and calculating a maximum value of an edge that passes by the shortest path from one of the two selected vertices to the other. The number of feature weaving layers 500 is greater than or equal to the size of the input graph, such that feature quantities related to all other edges (in particular, feature quantities related to edges located far from a target edge in the graph) can be reflected in a feature quantity related to each edge. Thereby, a feature of each edge can be extracted from the entire graph. As an example, when the input graph corresponds to an image, the feature of each region can be extracted after a relationship between distant regions is reflected.

In addition, the encoder 505 is configured to derive a relative feature quantity of each edge from feature quantities of all edges input for a target vertex instead of calculating a weighted sum of features of adjacent edges for each vertex. According to the configuration of the encoder 505, excessive smoothing can be prevented from occurring even if the feature weaving layers 500 are stacked. Thus, the hierarchy of the feature weaving network 50 can be deepened in accordance with the difficulty of the task, such that it is possible to extract a feature of the input graph appropriate for accomplishing the task in the feature weaving network 50. That is, the accuracy of feature extraction by the feature weaving network 50 can be expected to be improved. Thereby, in the estimator 55, highly accurate estimation can be expected on the basis of the obtained feature quantity.

Therefore, according to the present embodiment, the hierarchy of the feature weaving network 50 can also be deepened for complex tasks. In accordance with this, the accuracy of estimating the solution for the task represented in the graph can be improved with respect to the estimation module 5. In the model generation device 1, the trained estimation module 5 capable of accurately estimating the solution for the task for the input graph can be expected to be generated in the processing of steps S101 and S102. In the estimation device 2, it is possible to expect highly accurate estimation of the solution for the task for the target graph 221 using such a trained estimation module 5 in the processing of steps S201 to S203.

§ 4 MODIFIED EXAMPLES

Although embodiments of the present invention have been described above in detail, the above description is merely an example of the present invention in all respects. It goes without saying that various improvements or modifications can be performed without departing from the scope of the present invention. For example, the following changes are possible. Hereinafter, the same reference signs are used for components similar to those of the above-described embodiment and a description of content similar to that of the above-described embodiment is omitted as appropriate. The following modified examples can be combined as appropriate.

<4.1>

The estimation system 100 according to the above-described embodiment may be applied to a situation where various tasks that can be represented graphically are accomplished. The type of graph (the training graph 30 and the target graph 221) may be appropriately selected in accordance with the task. The graph may be, for example, a directed bipartite graph, an undirected bipartite graph, a general directed graph, a general undirected graph, a vertex feature graph, a hypergraph, or the like. Tasks include, for example, two-sided matching, one-sided matching, event estimation (including prediction), graph feature estimation, search in the graph, vertex categorization (graph division), estimation of relationships between vertices, and the like. Specific examples of limited application situations are shown below.

(A) Situation where Directed Bipartite Graph is Adopted

Figure 11:
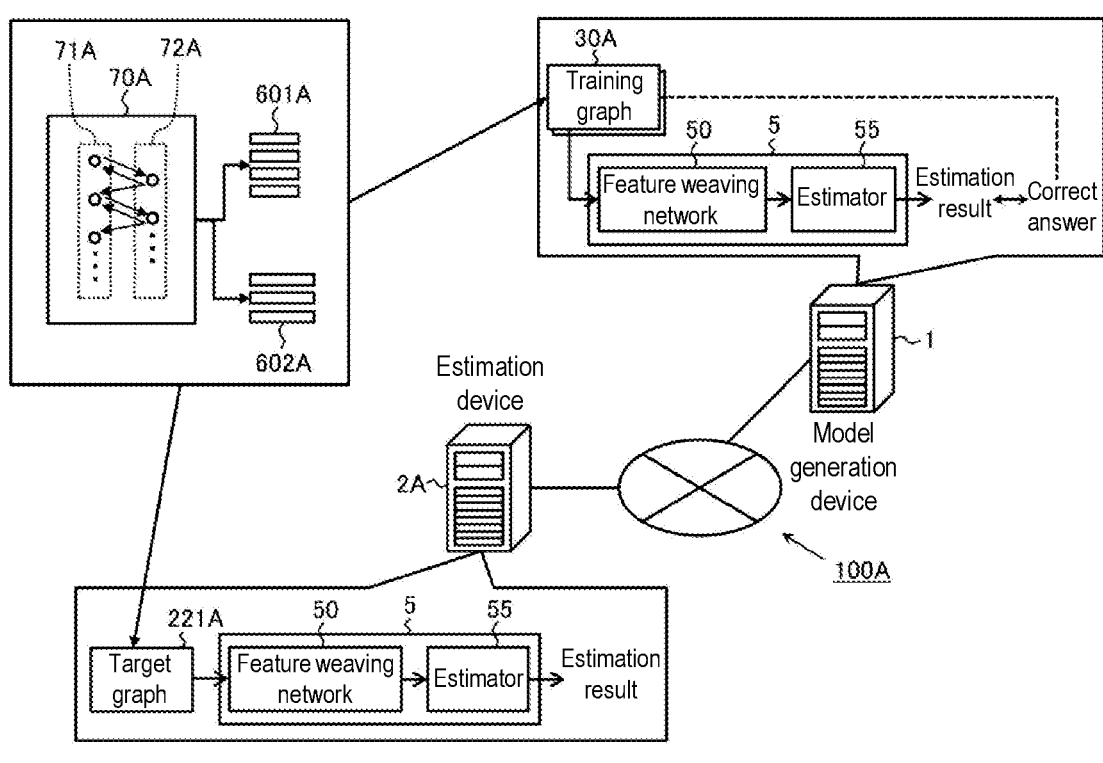
FIG. 11 schematically shows an example of another situation where the present invention is applied (a situation where a task is represented in a directed bipartite graph).

FIG. 11 schematically shows an example of a situation where an estimation system 100A according to the first specific example is applied. The first specific example is an example in which the above-described embodiment is applied to a situation where a directed bipartite graph is adopted as a graph representing a given condition (a target for accomplishing a task). The estimation system 100A according to the first specific example includes a model generation device 1 and an estimation device 2A. The estimation device 2A is an example of the estimation device 2.

In the first specific example, each training graph 30A and a target graph 221A (input graph) are directed bipartite graphs 70A. A plurality of vertices constituting the directed bipartite graph 70A is divided so that there are no edges between the vertices in each subset (71A or 72A) and each vertex belongs to one of two subsets (71A and 72A). The first set of the input graph corresponds to one of the two subsets (71A and 72A) of the directed bipartite graph 70A and the second set of the input graph corresponds to the other of the two subsets (71A and 72A) of the directed bipartite graph 70A. Each training graph 30A and the target graph 221A are examples of each training graph 30 and the target graph 221 in the above-described embodiment. Also, the number of vertices in the directed bipartite graph 70A and the presence or absence of directed edges between the vertices may be appropriately determined so that the target for accomplishing the task is appropriately represented.

As long as the task can be represented by a directed bipartite graph, its content may not be particularly limited and may be appropriately selected in accordance with the embodiment. As an example, the task may be two-sided matching. Specifically, the task may be a matching task between two parties and determine optimal pairing between targets belonging to each party.

In this case, the two subsets (71A and 72A) of the directed bipartite graph 70A correspond to two parties in the matching task. Vertices belonging to each subset (71A or 72A) of the directed bipartite graph 70A correspond to targets belonging to each party. The edge outgoing from the first vertex to the second vertex corresponds to a directed edge having a start point that is the first vertex and an end point that is the second vertex. The edge outgoing from the second vertex to the first vertex corresponds to a directed edge having a start point that is the second vertex and an end point that is the first vertex.

A feature quantity related to the edge outgoing from the first vertex to the second vertex corresponds to a desired level from a target (first vertex) belonging to one party of the two parties to a target (second vertex) belonging to the other party. A feature quantity related to the edge outgoing from the second vertex to the first vertex corresponds to a desired level from the target (second vertex) belonging to the other party of the two parties to the target (first vertex) belonging to the one party.

As long as pairing (matching) can be indicated at a desired level, a format of the desired level may not be particularly limited and may be appropriately selected in accordance with the embodiment. The desired level may be represented, for example, by a desired ranking, a score, or the like. The score is a numerical value indicating paring at the desired level. The score may be given as appropriate. As an example, after a list of desired rankings is given from each target, a score may be obtained by numerically converting the desired ranking indicated in each target list in a prescribed arithmetic operation and the obtained score may be used as the desired level.

A matching target may be appropriately selected in accordance with the embodiment. The matching target (hereinafter the matching target is also referred to as an "agent") may be, for example, a man/woman, a roommate, a job applicant/employer, an employee/assignment destination, a patient/doctor, an energy supplier/recipient, or the like. Also, in correspondence with the task being matching, the estimation device 2A may be read as a matching device.

The estimator 55 may be appropriately configured to estimate the matching result from the feature information. As an example, the estimator 55 may include one convolution layer. Thereby, the estimator 55 may be configured to convert a first output tensor $$\left(Z_L^A\right)$$

into a matching estimation result ($q^A \in \mathbb{R}^{N \times M}$) based on a target (first vertex) belonging to one party by inputting the first output tensor $$\left(Z_L^A\right)$$

to the convolution layer and executing an arithmetic process of the convolution layer. Also, the estimator 55 may be configured to convert a second output tensor $$\left(Z_L^B\right)$$

into a matching estimation result ($q^B \in \mathbb{R}^{M \times N}$) based on a target (second vertex) belonging to the other party by inputting the second output tensor $$\left(Z_L^B\right)$$

to the convolution layer and executing an arithmetic process of the convolution layer. Furthermore, the estimator 55 may be configured to calculate a matching estimation result (q) by averaging the estimation results ($q^A$ and $q^B$) obtained for the parties (agents) (the following Eq. 1).

[Math. 1]

$$q = \frac{q^A + q^{B^T}}{2} \tag{Eq. 1}$$

T denotes the transpose. The estimation result (q) can be represented in an (N×M) matrix. In the estimator 55, a single convolution layer may be used in common for the output tensors $$\left(Z_L^A \text{ and } Z_L^B\right)$$

or separate convolution layers may be provided for the output tensors $$\left(Z_L^A \text{ and } Z_L^B\right).$$

A correct answer in machine learning may be appropriately given so that a matching result satisfying a desired criterion can be obtained. As an example, a loss function defined below may be used in the machine learning of the estimation module 5. That is, first, the estimation result (q) may be preprocessed according to the following Eqs. 2 to 4 using a softmax function (softmax) for each party.

[Math. 2]

$$q^{eA} = \text{softmax}(q) \tag{Eq. 2}$$

[Math. 3]

$$q^{eB} = \text{softmax}\left(q^T\right) \tag{Eq. 3}$$

[Math. 4]

$$q_{ij}^e = \min\left(q_{ij}^{eA}, q_{ji}^{eB}\right) \tag{Eq. 4}$$

$q^e$ denotes an estimation result after preprocessing. The subscripts (i and j) of $$q_{ij}^e$$

denote elements of row i and column j. The same is true for the subscripts of $q^{eA}$ and $q^{eB}$. A denotes one party (first set) and B denotes the other party (second set). A min function is used to select a minimum value of the given arguments. Using the estimation result ($q^e$) after the preprocessing, a loss function $\lambda_s$ for training not to have a blocking pair may be defined by Eqs. 5 to 7.

[Math. 2]

$$q^{eA} = \text{softmax}(q) \tag{Eq. 2}$$

[Math. 3]

$$q^{eB} = \text{softmax}\left(q^T\right) \tag{Eq. 3}$$

[Math. 4]

$$q_{ij}^e = \min\left(q_{ij}^{eA}, q_{ij}^{eB}\right) \tag{Eq. 4}$$

$v^A$ denotes a desired level from a target belonging to one party to a target belonging to the other party. $v^B$ denotes a desired level from the target belonging to the other party to the target belonging to the one party. As an example, the desired level may have a larger value when the desired ranking is higher and may be obtained by numerically converting the desired ranking so that a value greater than 0 and less than or equal to 1 is given according to the desired ranking. $a_i$ denotes an ($i^{th}$) target belonging to one party, and $b_j$ denotes a ($j^{th}$) target belonging to the other party.

$$v_{ij}^A$$

denotes a desired level from the $i^{th}$ target belonging to the one party to the $j^{th}$ target belonging to the other party.

$$v_{ij}^B$$

denotes a desired level from the $j^{th}$ target belonging to the other party to the $i^{th}$ target belonging to the one party. A max function is used to select a maximum value among the given arguments.

$g(a_i; b_j, q^e)$ outputs a value larger than 0 when $b_j$ is preferred over $b_c$ for $a_i$ (i.e., a desired level for $b_j$ is higher than a desired level for $b_c$) with respect to any target $b_c$ ($c \neq j$) belonging to the other party. Likewise, $g(b_j; a_i, q^e)$ outputs a value larger than 0 when $a_i$ is preferred over $a_c$ for $b_j$ (i.e., a desired level for $a_i$ is higher than a desired level for $a_c$) with respect to any target $a_c$ ($c \neq i$) belonging to the one party. When both $g(a_i; b_j, q^e)$ and $g(b_j; a_i, q^e)$ output values greater than 0, $\{a_i, b_j\}$ becomes a blocking pair. According to the loss function $\lambda_s$, the matching in which such a blocking pair occurs can be suppressed.

Also, each element of the estimation result (q) may be configured to indicate a probability of matching between corresponding targets. In this case, the estimation result (q) is preferably a symmetric double probability matrix. The loss function $\lambda_c$ for converging to such an estimation result may be defined by the following Eqs. 8 and 9.

[Math. 8]

$$\lambda_c(q^{eA}, q^{eB}) = 1 - \frac{C(q^{eA}, q^{eB}) + C(q^{eB}, q^{eA})}{2} \qquad \text{(Eq. 8)}$$

[Math. 9]

$$C(q^{eA}, q^{eB}) = \frac{1}{N}\sum_{i=1}^{N} \frac{q_{i*}^{eA} \cdot q_{*i}^{eB}}{\|q_{i*}^{eA}\|_2 \|q_{*i}^{eB}\|_2} \qquad \text{(Eq. 9)}$$

* denotes any element. For example, $$q_{i*}^{eA}$$

denotes a vector in which all elements of row i of the matrix $q^{eA}$ are arranged and $$q_{*i}^{eB}$$

denotes a vector in which all elements of column i of the matrix $q^{eB}$ are arranged. In a C function, the correlations of estimation results (assignment vectors) for each party are averaged. By using the loss based on correlation, it is possible to calculate the loss for matrix symmetry only, without being affected by a difference between the norms of $q^{eA}$ and $q^{eB}$.

Furthermore, in order to obtain stable matching for prescribed criteria such as satisfaction and fairness, a loss function for causing the estimation result to converge so that a prescribed criterion is satisfied may be added. As an example, at least one of the three loss functions ($\lambda_f$, $\lambda_e$, and $\lambda_b$) defined by the following Eqs. 10 to 15 may be added.

[Math. 10]

$$\lambda_f = (q^e, v^A, v^B) = \frac{1}{N}|S(q^e; A) - S(q^e; B)| \qquad \text{(Eq. 10)}$$

[Math. 11]

$$\lambda_e = (q^e, v^A, v^B) = -\frac{1}{N}(S(q^e; A) + S(q^e; B)) \qquad \text{(Eq. 11)}$$

-continued

[Math. 12]

$$\lambda_b = (q^e, v^A, v^B) = -\frac{1}{N}\min(S(q^e; A), S(q^e; B)) \qquad \text{(Eq. 12)}$$

[Math. 13]

$$S(q^e; A) = \sum_{i=1}^{N}\sum_{j=1}^{M} q_{ij}^e \cdot v_{ij}^A \qquad \text{(Eq. 13)}$$

[Math. 14]

$$S(q^e; B) = \sum_{i=1}^{N}\sum_{j=1}^{M} q_{ij}^{eT} \cdot v_{ij}^B \qquad \text{(Eq. 14)}$$

In an S function, a sum of the desired levels in the matching result is calculated. Thus, according to the loss function $\lambda_f$, a gap between the sum of the desired levels of one party and the sum of the desired levels of the other party in the matching result can be suppressed, i.e., the fairness of the estimation result can be increased. Also, according to the loss function $\lambda_e$, the sum of the desired levels in the matching result can be increased, i.e., the satisfaction of the estimation result can be increased. The loss function $\lambda_b$ is the same as an average value of the loss function $\lambda_f$ and the loss function $\lambda_e$. Thus, according to the loss function $\lambda_b$, the fairness and satisfaction of the estimation result can be increased in a balanced state.

[Math. 15]

$$\lambda = w_s\lambda_s + w_c\lambda_c + w_f\lambda_f + w_e\lambda_e + w_b\lambda_b \qquad \text{(Eq. 15)}$$

Therefore, the loss function $\lambda$ defined by Eq. 15 may be used for the machine learning of the estimation module 5. $w_s$, $w_c$, $w_f$, $w_e$, and $w_b$ in Eq. 15 are weights for determining priority levels of the loss functions ($\lambda_s$, $\lambda_c$, $\lambda_f$, $\lambda_e$, and $\lambda_b$). Values of $w_s$, $w_c$, $w_f$, $w_e$, and $w_b$ may be designated as appropriate. In machine learning, an error is calculated by substituting the estimation result into the loss function $\lambda$, a gradient of the calculated error is backpropagated, and the value of the parameter of the estimation module 5 may be adjusted in a direction in which the value of the loss function $\lambda$ is reduced (for example, a direction in which the value of the loss function $\lambda$ approaches a lower limit, a direction in which the value of the loss function $\lambda$ simply decreases, or the like).

In the first specific example, the directed bipartite graph 70A is treated as an input graph during the machine learning of the model generation device 1 and during an estimation process of the estimation device 2A. The first feature weaving layer 5001 of the feature weaving network 50 is configured to receive the first input tensor 601A and the second input tensor 602A from the directed bipartite graph 70A. The first input tensor 601A indicates a feature quantity related to a directed edge extending from a vertex belonging to one subset of two subsets (71A and 72A) to a vertex belonging to the other subset. The second input tensor 602A indicates a feature quantity extending from the vertex belonging to the other subset to the vertex belonging to the one subset. When the feature quantity is one-dimensional, each input tensor (601A or 602A) may be represented in an (N×M) or (M×N) matrix. Except for these differences, the configuration of the first specific example may be similar to that of the above-described embodiment.

(Model Generation Device)

In the first specific example, the model generation device 1 can generate a trained estimation module 5 that has acquired the ability to estimate the solution for the task for the directed bipartite graph 70A in a processing procedure similar to that of the above-described embodiment.

That is, in step S101, the control part 11 acquires a plurality of training graphs 30A. Each training graph 30A includes a directed bipartite graph 70A. The settings of vertices and edges in each training graph 30A may be appropriately given to appropriately represent a condition of the training target. In step S102, the control part 11 performs machine learning of the estimation module 5 using the plurality of training graphs 30A that has been acquired. In this machine learning, it is possible to generate a trained estimation module 5 that has acquired the ability to estimate the solution for the task for the directed bipartite graph 70A. When the estimation module 5 is allowed to acquire the ability to perform a matching task as a task, the loss function λ may be used in machine learning. In the machine learning, the control part 11 may calculate an error by substituting the estimation result into the loss function λ, perform a backpropagation process for the calculated error gradient, and adjust the value of the parameter of the estimation module 5 in a direction in which the value of the loss function λ is reduced. In step S103, the control part 11 generates learning result data 125 indicating the generated trained estimation module 5 and stores the generated learning result data 125 in a prescribed storage area. The learning result data 125 may be provided to the estimation device 2A at any timing.

(Estimation Device)

A hardware configuration and a software configuration of the estimation device 2A may be similar to those of the estimation device 2 according to the above-described embodiment. In the first specific example, the estimation device 2A can estimate the solution for the task for the directed bipartite graph 70A in a processing procedure similar to that of the above-described estimation device 2.

That is, in step S201, the control part of the estimation device 2A operates as an acquisition part and acquires the target graph 221A. The target graph 221A includes a directed bipartite graph 70A. The settings of vertices and edges in the target graph 221A may be appropriately given to appropriately represent estimation target conditions. In step S202, the control part operates as an estimation part and estimates the solution for the task for the acquired target graph 221A using the trained estimation module 5. Specifically, the control part inputs the target graph 221A to the trained estimation module 5 and executes a forward arithmetic process of the trained estimation module 5. As a result of executing this arithmetic process, the control part can acquire a result of estimating the solution for the task for the target graph 221A from the estimator 55. When the trained estimation module 5 has acquired the ability to perform the matching task, the control part can obtain an estimation result of matching. In this case, in the process of the estimator 55, after performing the arithmetic operations of Eqs. 1 to 4, the control part may obtain the estimation result of matching by executing an arithmetic operation of argmax (argument of the maximum) with respect to the obtained $$q_{ij}^{e}.$$

In step S203, the control part operates as an output part and outputs information about the estimation result. As an example, when the control part obtains the estimation result of the matching described above, the control part may output the obtained estimation result to the output device as it is. Thereby, the estimation device 2A may prompt the operator to determine whether or not to adopt the estimation result. As another example, when the estimation result of the matching described above is obtained, the control part may cause the matching of at least a part of the estimation result to be valid (definite). In this case, matching targets (vertices) may be added at any timing and the estimation device 2A may iteratively execute matching between free targets (vertices). The target (vertex) for which the matching is valid according to the execution of the matching task may be excluded from the target of the next and subsequent matching tasks. Also, the valid matching may be resolved at any timing and the target (vertex) for which the matching has been resolved may be added to the target of subsequent matching tasks. Thereby, the estimation device 2A may be configured to perform matching online in real time.

Features

According to the first specific example, in a situation where a given task (for example, the above-described matching task) is represented in a directed bipartite graph 70A, the accuracy of estimation of the estimation module 5 can be improved. In the model generation device 1, it is possible to expect the generation of the trained estimation module 5 capable of accurately estimating the solution for the task represented in the directed bipartite graph 70A. In the estimation device 2A, it is possible to expect highly accurate estimation of the solution for the task represented in the directed bipartite graph 70A using such a trained estimation module 5.

(B) Situation where Undirected Bipartite Graph is Adopted

Figure 12:
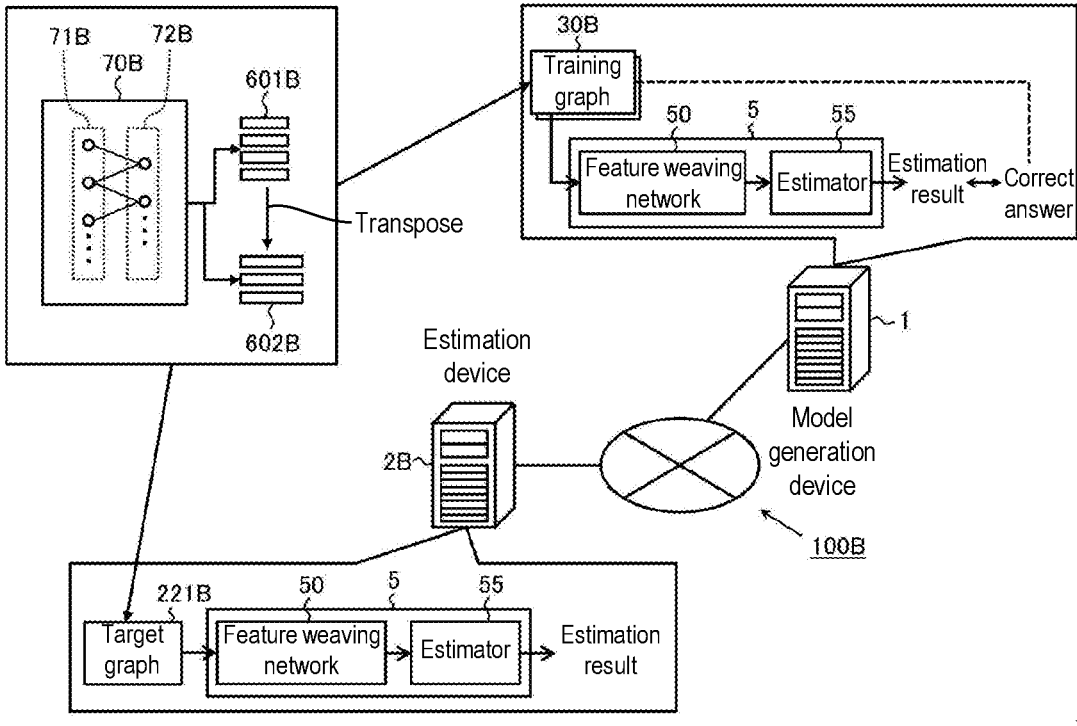
FIG. 12 schematically shows an example of another situation where the present invention is applied (a situation where a task is represented in an undirected bipartite graph).

FIG. 12 schematically shows an example of a situation where an estimation system 100B is applied according to a second specific example. The second specific example is an example in which the above-described embodiment is applied to a situation where an undirected bipartite graph is adopted as a graph representing a given condition (a target for accomplishing a task). The estimation system 100B according to the second specific example includes a model generation device 1 and an estimation device 2B. The estimation device 2B is an example of the above-described estimation device 2.

In the second specific example, each training graph 30B and a target graph 221B (input graph) are undirected bipartite graphs 70B. A plurality of vertices constituting the undirected bipartite graph 70B is divided so that each vertex belongs to one of two subsets (71B and 72B) and there are no edges between the vertices in each subset (71B or 72B). A first set of the input graph corresponds to one of the two subsets (71B and 72B) of the undirected bipartite graph 70B and a second set of the input graph corresponds to the other of the two subsets (71B and 72B) of the undirected bipartite graph 70B. Each training graph 30B and the target graph 221B are examples of each training graph 30 and the target graph 221 in the above-described embodiment. Also, the number of vertices in the undirected bipartite graph 70B and the presence or absence of edges between the vertices may be appropriately determined so that the target for accomplishing the task is appropriately represented.

As long as the task can be represented by an undirected bipartite graph, its content may not be particularly limited and may be appropriately selected in accordance with the embodiment. As an example, the task may be one-sided matching. Specifically, the task may be a matching task between two parties and may determine optimal pairing between targets belonging to each party. In this case, the two subsets (71B and 72B) of the undirected bipartite graph 70B correspond to two parties in the matching task. The vertices belonging to each subset (71B or 72B) of the undirected bipartite graph 70B correspond to targets belonging to each party. Both a feature quantity related to an edge outgoing from the first vertex to the second vertex and a feature quantity related to an edge outgoing from the second vertex to the first vertex may correspond to costs or rewards of pairing between a target belonging to one party of the two parties and a target belonging to the other party.

The matching target may be appropriately selected in accordance with the embodiment. The matching target may be, for example, a transport robot/load, a room/customer (automatic check-in of accommodation facilities), a seat/customer (for example, seat assignment at public transportation, amusement facilities, etc.), and the like. As another example, matching may be performed to track a plurality of physical objects between two or more images (e.g., consecutive frames in a video). In this case, a first image may correspond to one party, a second image may correspond to the other party, and the matching target (vertex) may be a physical object (or a physical object area) detected in each image. By matching the same physical object between the images, the physical object can be tracked.

The cost indicates a degree to which matching is blocked. The reward indicates a degree to which matching is promoted. As an example, in a situation where a transport robot and a load are matched, a distance from a target transport robot to a target load may be set as the cost. As another example, in a situation where a seat and a customer are matched, the preference of a target customer (for example, a preferred position of a window side, an aisle side, or the like) may be set as the reward for the target seat. The numerical representation of the cost or reward may be appropriately determined in accordance with the embodiment. In correspondence with the task being matching, the estimation device 2B may be read as a matching device.

As another example, a feature map obtained in a convolutional neural network can be understood as a third-order tensor of height×width×feature quantity. In accordance with this, the feature map can be understood as an undirected bipartite graph having h height vertices belonging to one subset and w width vertices belonging to the other subset. Thus, the undirected bipartite graph 70B may include such a feature map and the task may be a prescribed inference for the image. The inference for the image may be, for example, dividing an area, detecting a physical object, or the like. These prescribed inferences may be executed in various situations, such as, for example, a situation where a physical object shown in a captured image obtained by a vehicle camera is extracted and a situation where a person shown in a captured image obtained by a camera disposed on a street is detected. Also, the structure of the convolutional neural network may not be particularly limited and may be appropriately determined in accordance with the embodiment. Also, the feature map may be obtained as an output of the convolutional neural network or as a result of an arithmetic operation in the middle of the convolutional neural network.

The estimator 55 may be appropriately configured to derive a result of estimating the solution for the task for the undirected bipartite graph 70B such as the above-described matching or a prescribed inference for the image from the feature information. The correct answer in machine learning may be appropriately given in accordance with the content of the task for the undirected bipartite graph 70B. When the task is the matching task, the correct answer in machine learning may be appropriately given so that a matching result satisfying a desired criterion can be obtained as in the first specific example. When the task is the prescribed inference for the above-described image, for example, a correct answer label indicating the correct answer of the inference such as a true value of the area division and a true value of the physical object detection result may be associated with each training graph 30B. In machine learning, this correct answer label may be used to calculate an error.

In the second specific example, during machine learning of the model generation device 1 and during an estimation process of the estimation device 2B, the undirected bipartite graph 70B is treated as an input graph. The first feature weaving layer 5001 of the feature weaving network 50 is configured to receive a first input tensor 601B and a second input tensor 602B from the undirected bipartite graph 70B. In the undirected bipartite graph 70B, because each edge has no direction, a feature quantity related to an edge outgoing from the first vertex to the second vertex and a feature quantity related to an edge outgoing from the second vertex to the first vertex are the same as each other. Thus, the second input tensor 602B from the input graph received by the first feature weaving layer 5001 may be generated by transposing the first and second axes of the first input tensor 601B from the input graph. When the feature quantity is one-dimensional, each input tensor (601B or 602B) may be represented in an (N×M) or (M×N) matrix. Except for these differences, the configuration of the second specific example may be similar to that of the above-described embodiment.
(Model Generation Device)

In the second specific example, the model generation device 1 can generate a trained estimation module 5 that has acquired the ability to estimate the solution for the task for the undirected bipartite graph 70B in a processing procedure similar to that of the above-described embodiment.

That is, in step S101, the control part 11 acquires a plurality of training graphs 30B. Each training graph 30B includes the undirected bipartite graph 70B. The settings of vertices and edges in each training graph 30B may be appropriately given to appropriately represent training target conditions. In step S102, the control part 11 performs machine learning of the estimation module 5 using the plurality of training graphs 30B that has been acquired. In this machine learning, it is possible to generate a trained estimation module 5 that has acquired the ability to estimate the solution for the task for the undirected bipartite graph 70B. In step S103, the control part 11 generates learning result data 125 indicating the generated trained estimation module 5 and stores the generated learning result data 125 in a prescribed storage area. The learning result data 125 may be provided to the estimation device 2B at any timing.
(Estimation Device)

A hardware configuration and a software configuration of the estimation device 2B may be similar to those of the estimation device 2 according to the above-described embodiment. In the second specific example, the estimation device 2B can estimate the solution for the task for the undirected bipartite graph 70B in a processing procedure similar to that of the above-described estimation device 2.

That is, in step S201, the control part of the estimation device 2B operates as an acquisition part and acquires the target graph 221B. The target graph 221B includes the undirected bipartite graph 70B. The settings of vertices and edges in the target graph 221B may be appropriately given to appropriately represent estimation target conditions.

When the trained estimation module 5 has acquired the ability to execute prescribed inferences on the image, the control part may acquire the target graph 221B (feature map) by executing an arithmetic operation of a convolutional neural network as preprocessing.

In step S202, the control part operates as an estimation part and uses the trained estimation module 5 to estimate the solution for the task for the acquired target graph 221B. Specifically, the control part inputs the target graph 221B to the trained estimation module 5 and executes a forward arithmetic process of the trained estimation module 5. As a result of executing this arithmetic process, the control part can acquire a result of estimating the solution for the task for the target graph 221B from the estimator 55. When the trained estimation module 5 has acquired the ability to perform the above-described matching task, the control part can obtain an estimation result of matching. When the trained estimation module 5 has acquired the ability to execute a prescribed inference on an image, the control part can obtain a prescribed inference result for the image from which the target graph 221B has been acquired.

In step S203, the control part operates as an output part and outputs information about the estimation result. As an example, the control part may output the obtained estimation result to the output device as it is. As another example, when the estimation result of the matching described above has been obtained, the control part may cause the matching of at least a part of the estimation result to be valid as in the above-described first specific example. In this case, as in the first specific example, the estimation device 2B may be configured to perform matching online in real time. For example, in the case of automatic check-in/seat assignment, the estimation device 2B may add a corresponding vertex to each subset as a customer comes and the room/seat is open and assign a vacant room/vacant seat through matching in response to the customer's request. Also, the estimation device 2B may delete vertices corresponding to the assigned customer and room/seat from the subsets. As yet another example, in the case of the above-described physical object tracking process, the control part may track one or more physical objects in each image on the basis of an estimation result. In this case, the estimation device 2B may be configured to add the target physical object to the matching target when the target physical object is detected in the image and exclude a target physical object from a matching target when it is no longer detected in the image (for example, when the target physical object is outside of an imaging range and is hidden by the shadow of a cover or the like). Thereby, the estimation device 2B may be configured to track a physical object in real time.

Features

According to the second specific example, the accuracy of estimation of the estimation module 5 can be improved in a situation where a given task is represented by an undirected bipartite graph 70B. In the model generation device 1, it is possible to expect the generation of a trained estimation module 5 capable of accurately estimating the solution for the task represented in the undirected bipartite graph 70B. In the estimation device 2B, it is possible to expect highly accurate estimation of the solution for the task represented in the undirected bipartite graph 70B using such a trained estimation module 5.

(C) When General Directed Graph is Adopted

Figure 13:
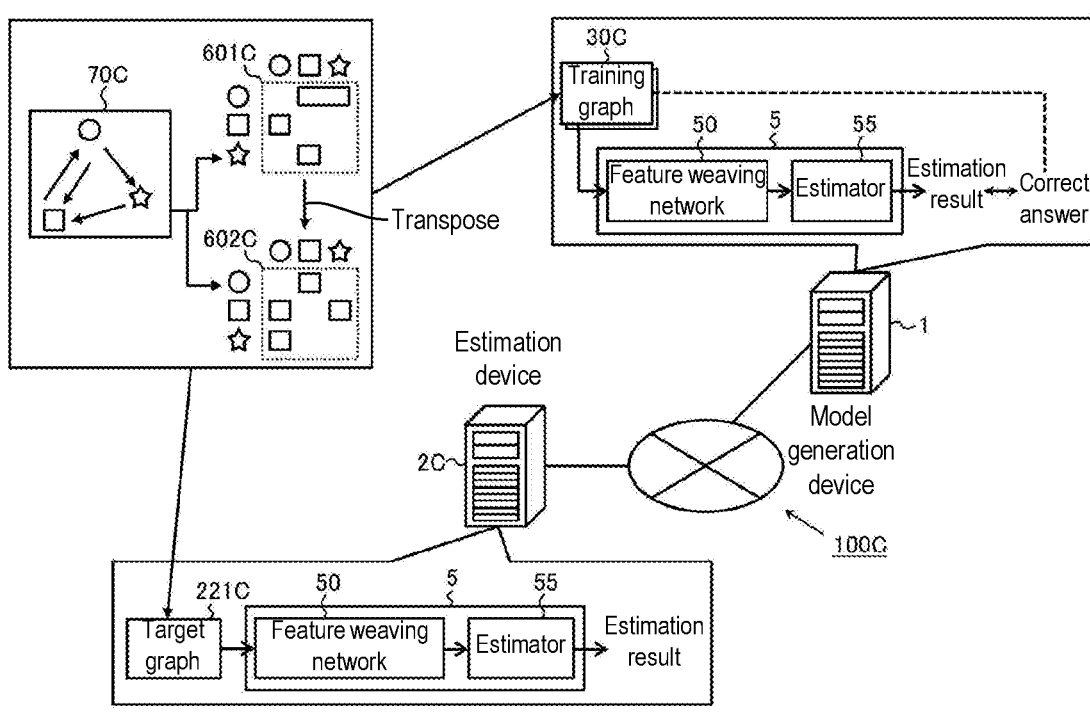
FIG. 13 schematically shows an example of another situation where the present invention is applied (a situation where a task is represented in a general directed graph).

FIG. 13 schematically shows an example of a situation where an estimation system 100C according to a third specific example is applied. The third specific example is an example in which the above-described embodiment is applied to a situation where a general directed graph (which may simply be referred to as a directed graph) is adopted as a graph representing a given condition (a target for accomplishing a task). The estimation system 100C according to the third specific example includes a model generation device 1 and an estimation device 2C. The estimation device 2C is an example of the estimation device 2.

In the third specific example, each training graph 30C and the target graph 221C (input graph) are general directed graphs 70C. Circles, squares, and stars in FIG. 13 indicate vertices. A first vertex belonging to a first set of the input graph corresponds to a start point of the directed edge constituting the general directed graph 70C and a second vertex belonging to a second set corresponds to an end point of the directed edge. Thus, as shown in FIG. 13, the number of vertices of the first set is the same as the number of vertices of the second set and the vertices belonging to each set are common (i.e., M=N). Also, the edge outgoing from the first vertex to the second vertex corresponds to a directed edge outgoing from the start point to the end point and the edge outgoing from the second vertex to the first vertex corresponds to a directed edge incoming from the start point to the end point. Each training graph 30C and the target graph 221C are examples of each training graph 30 and the target graph 221 in the above-described embodiment. Also, the number of vertices in the general directed graph 70C and the presence or absence of directed edges between the vertices may be appropriately determined to appropriately represent the target for accomplishing the task.

As long as the task can be represented by a general directed graph, its content may not be particularly limited and may be appropriately selected in accordance with the embodiment. As an example, the general directed graph 70C may be configured to represent a network. The network may correspond to a transportation network such as, for example, a road network, a railway network, a shipping route network, or an air route network. Alternatively, the network may correspond to a communication network. In correspondence with this, the task may be to estimate (including prediction) events that occur on the network. Estimating an event may include, for example, predicting a period of time required to move between two vertices, predicting the occurrence of an abnormality, searching for an optimal route, and the like.

In this case, both a feature quantity related to the edge outgoing from the first vertex to the second vertex and a feature quantity related to the edge outgoing from the second vertex to the first vertex may correspond to attributes of connections between vertices constituting the network. When the network corresponds to a transportation network, each vertex may correspond to a transportation base (e.g., an intersection, a main point, a station, a port, an airport, or the like) and the connection attribute may be, for example, a type of road (e.g., a type of road such as a general road or a high-speed road), the traffic allowance of the road, a period of time required to travel, a distance, or the like. When the network corresponds to a communication network, each vertex may correspond to a communication base (for example, a server, a router, a switch, or the like) and the connection attributes may be, for example, a type of communication, a communication allowance, a communication speed, and the like. The feature amount may include one or more attribute values. In correspondence with predicting an event, the estimation device 2C may be read as a prediction device.

As another example, the task may be to divide the general directed graph (i.e., classify the vertices constituting the general directed graph). As a specific example of the task, the general directed graph 70 may be a weighted graph indicating the similarity of motion obtained from a result of associating feature points between two consecutive images. In this case, the division of the above-described graph may be executed to detect a dense subgraph to determine the accuracy of the association. Alternatively, the general directed graph 70 may be a graph showing feature points in the image. In this case, the division of the above-described graph may be performed to classify feature points for each physical object. In each case, the feature quantity may be appropriately set to indicate a relationship between feature points.

In machine learning, the ability to divide a graph may be trained so that objectives such as determining the accuracy of the above-described association and classifying for each physical object are achieved. Furthermore, a prescribed arithmetic process (for example, some approximation algorithm) may be applied to a subgraph obtained in a division process. In this case, in the machine learning, the ability to divide the graph may be trained so that it is optimal for a prescribed arithmetic operation (e.g., so that the approximation accuracy of the approximation algorithm is high).

In yet another example, the task may be to estimate features represented in a general directed graph. As a specific example of the task, the general directed graph 70C may be, for example, a graph representing a profile of a target (e.g., a person, an object, or the like) such as a knowledge graph. In this case, the task may be to estimate a feature of a target derived from a profile represented in the graph.

The estimator 55 may be appropriately configured to derive a result of estimating the solution for the task such as the above-described event estimation, graph division, or feature estimation for the general directed graph 70C from the feature information. As an example, an output of the estimator 55 may include a one-hot vector for each vertex indicating the estimation result. The correct answer in machine learning may be appropriately given in accordance with the content of the task for the general directed graph 70C. For example, a correct answer label indicating the correct answer of estimation such as the true value of the event, the true value of the division, or the true value of the feature may be associated with each training graph 30C. In machine learning, this correct answer label may be used to calculate the error. In addition, the correct answer in machine learning may be appropriately given to obtain an estimation result satisfying a desired criterion, such as, for example, maximizing a traffic amount, minimizing a period of time of movement of each moving object, or maximizing a communication amount of the entire network.

In the third specific example, during the machine learning of the model generation device 1 and during the estimation process of the estimation device 2C, the general directed graph 70C is treated as an input graph. The first feature weaving layer 5001 of the feature weaving network 50 is configured to receive a first input tensor 601C and a second input tensor 602C from the general directed graph 70C. Here, as described above, a first vertex belonging to a first set of the input graph corresponds to a start point of the directed edge, a second vertex belonging to a second set corresponds to an end point of the directed edge, the number of vertices of the first set is the same as the number of vertices the second set, and the vertices belonging to each set are common. Therefore, the second input tensor 602C from the input graph received by the first feature weaving layer 5001 may be generated by transposing the first and second axes of the first input tensor 601C from the input graph. When the feature quantity is one-dimensional, each input tensor (601C or 602C) may be represented in an (N×N) matrix. Except for these differences, the configuration of the third specific example may be similar to that of the above-described embodiment.

(Model Generation Device)

In the third specific example, the model generation device 1 can generate a trained estimation module 5 that has acquired the ability to estimate the solution for a task for the general directed graph 70C in a processing procedure similar to that of the above-described embodiment.

That is, in step S101, the control part 11 acquires a plurality of training graphs 30C. Each training graph 30C includes the general directed graph 70C. The settings of vertices and directed edges in each training graph 30C may be appropriately given to appropriately represent training target conditions. In step S102, the control part 11 performs machine learning of the estimation module 5 using the plurality of training graphs 30C that has been acquired. In this machine learning, it is possible to generate a trained estimation module 5 that has acquired the ability to estimate the solution for a task for the general directed graph 70C. In step S103, the control part 11 generates learning result data 125 indicating the generated trained estimation module 5 and stores the generated learning result data 125 in a prescribed storage area. The learning result data 125 may be provided to the estimation device 2C at any timing.

(Estimation Device)

A hardware configuration and a software configuration of the estimation device 2C may be similar to those of the estimation device 2 according to the above-described embodiment. In the third specific example, the estimation device 2C can estimate the solution for the task for the general directed graph 70C in a processing procedure similar to that of the above-described estimation device 2.

That is, in step S201, the control part of the estimation device 2C operates as an acquisition part and acquires a target graph 221C. The target graph 221C includes the general directed graph 70C. The settings of vertices and directed edges in the target graph 221C may be appropriately given to appropriately represent estimation target conditions.

In step S202, the control part operates as an estimation part and uses the trained estimation module 5 to estimate the solution for the task for the acquired target graph 221C. Specifically, the control part inputs the target graph 221C to the trained estimation module 5 and executes a forward arithmetic process of the trained estimation module 5. As a result of executing this arithmetic process, the control part can acquire a result of estimating the solution for the task for the target graph 221C from the estimator 55.

In step S203, the control part operates as an output part and outputs information about an estimation result. As an example, the control part may output the obtained estimation result to the output device as it is. As another example, when a result of estimating an event occurring on the network has been obtained, the control part may output an alarm for notifying that the possibility of occurrence of an abnormality is greater than or equal to a threshold value when the possibility of occurrence of an abnormality is greater than or equal to the threshold value. As yet another example, when a result of estimating an optimal route in the communication network has been obtained, the control part may transmit a packet in accordance with the estimated optimal route.

Features

According to the third specific example, in a situation where a given task is represented by the general directed graph 70C, the accuracy of estimation of the estimation module 5 can be improved. In the model generation device 1, it is possible to expect the generation of a trained estimation module 5 that can accurately estimate the solution for the task represented in the general directed graph 70C. In the estimation device 2C, it is possible to expect highly accurate estimation of the solution for the task represented in the general directed graph 70C using such a trained estimation module 5.

(D) When General Undirected Graph is Adopted

Figure 14:
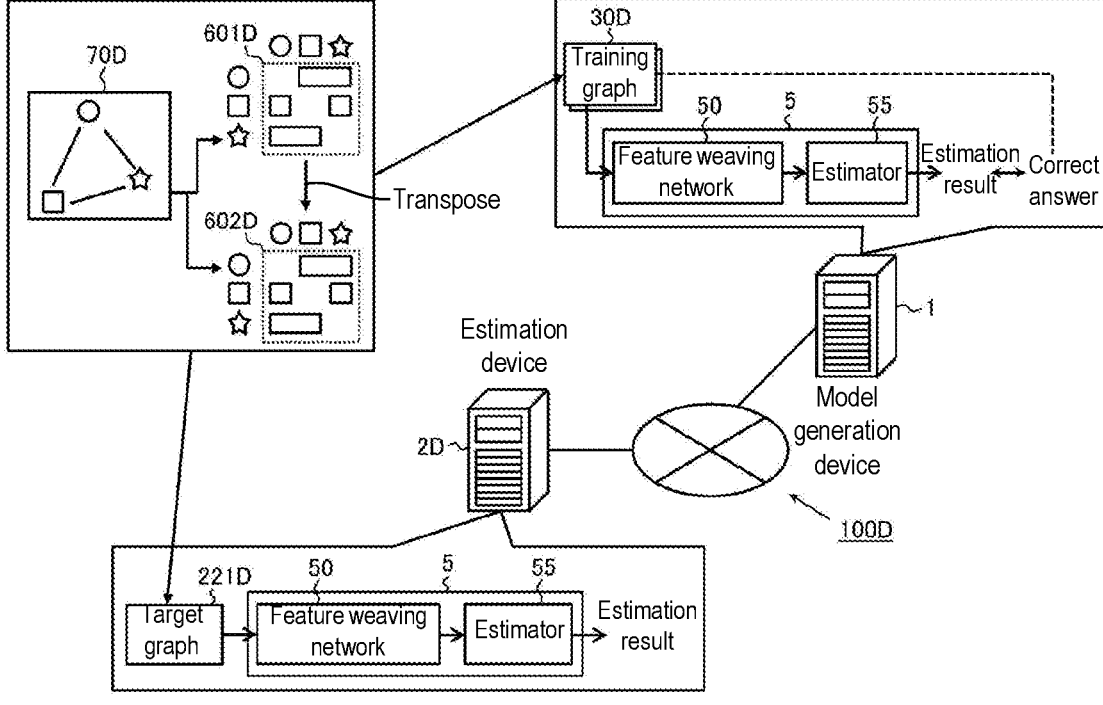
FIG. 14 schematically shows an example of another situation where the present invention is applied (a situation where a task is represented in a general undirected graph).

FIG. 14 schematically shows an example of a situation where an estimation system 100D according to the fourth specific example is applied. The fourth specific example is an example in which the above-described embodiment is applied to a situation where a general undirected graph (which may simply be referred to as an undirected graph) is adopted as a graph representing a given condition (a target for accomplishing the task). The estimation system 100D according to the fourth specific example includes a model generation device 1 and an estimation device 2D. The estimation device 2D is an example of the estimation device 2.

In the fourth specific example, each training graph 30D and a target graph 221D (input graph) are general undirected graphs 70D. Each of the first vertex belonging to the first set of the input graph and the second vertex belonging to the second set corresponds to a vertex constituting the general undirected graph 70D. As in the above-described third specific example, the number of vertices in the first set is the same as the number of vertices in the second set and the vertices belonging to each set are common (i.e., M=N). The edge outgoing from the first vertex to the second vertex and the edge outgoing from the second vertex to the first vertex correspond to undirected edges between two corresponding vertices. Each training graph 30D and the target graph 221D are examples of each training graph 30 and the target graph 221 in the above-described embodiment. Also, the number of vertices in the general undirected graph 70D and the presence or absence of edges between the vertices may be appropriately determined to appropriately represent the target for accomplishing the task.

As long as the task can be represented by a general undirected graph, its content may not be particularly limited and may be appropriately selected in accordance with the embodiment. Except that the edge has no direction, the task in the fourth specific example may be similar to that in the third specific example. That is, as an example, the general undirected graph 70D may be configured to represent a network. In accordance with this, the task may be to estimate (including prediction) events that occur on the network. In this case, both a feature quantity related to the edge outgoing from the first vertex to the second vertex and a feature quantity related to the edge outgoing from the second vertex to the first vertex may correspond to attributes of connections between vertices constituting the network. Also, in correspondence with predicting an event, the estimation device 2D may be read as a prediction device. As another example, the task may be to divide a general undirected graph. In yet another example, the task may be to estimate a feature that is represented in a general undirected graph.

The estimator 55 may be appropriately configured to derive a result of estimating the solution for the task such as the above-described event estimation, graph division, or feature estimation for the general undirected graph 70D from the feature information. As an example, an output of the estimator 55 may include a one-hot vector for each vertex indicating the estimation result. The correct answer in machine learning may be appropriately given in accordance with the content of the task for the general undirected graph 70D. For example, a correct answer label indicating the correct answer of estimation such as the true value of the event, the true value of the division, or the true value of the feature may be associated with each training graph 30D. In the machine learning, this correct answer label may be used to calculate the error. In addition, the correct answer in the machine learning may be appropriately given to obtain an estimation result satisfying a desired criterion.

In the fourth specific example, during the machine learning of the model generation device 1 and during the estimation process of the estimation device 2D, the general undirected graph 70D is treated as an input graph. The first feature weaving layer 5001 of the feature weaving network 50 is configured to receive a first input tensor 601D and a second input tensor 602D from the general undirected graph 70D. When the feature quantity is one-dimensional, each input tensor (601D or 602D) may be represented in an (N×N) matrix.

Figure 15:
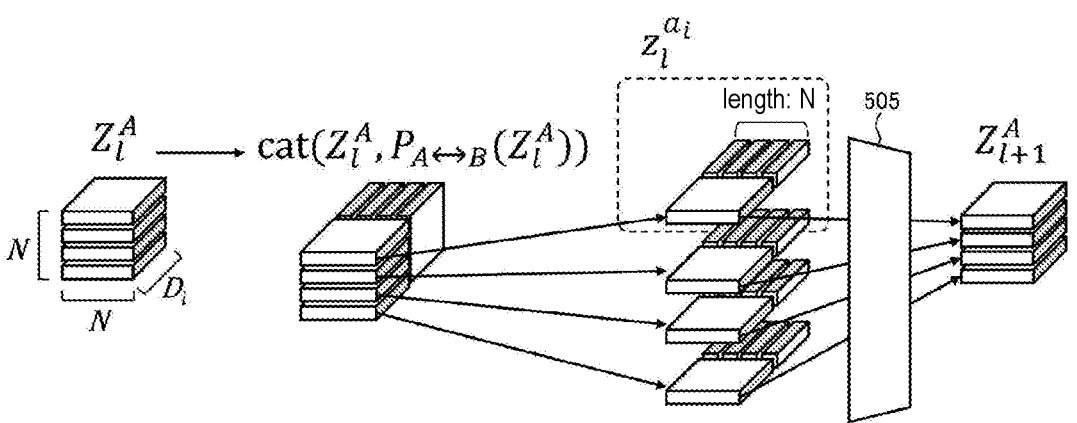
FIG. 15 schematically shows an example of an arithmetic process of the feature weaving layer in a situation where a task is represented in a general undirected graph.

FIG. 15 schematically shows an example of an arithmetic process of each feature weaving layer 500 in the fourth specific example. In the fourth specific example, because the vertices belonging to the first set are the same as the vertices belonging to the second set, the second input tensor 602D from the input graph received by the first feature weaving layer 5001 can be generated by transposing the first and second axes of the first input tensor 601D from the input graph as in the third specific example. However, because the edges have no direction in the general undirected graph 70D, the second input tensor 602D generated in the transposing process is the same as the first input tensor 601D. Thus, the first input tensor $$\left(Z_i^A\right)$$

and the second input tensor $$\left(Z_i^B\right)$$

input to each feature weaving layer 500 are the same as each other and the first output tensor $$\left(Z_{i+1}^A\right)$$

and the second output tensor $$\left(Z_{i+1}^B\right)$$

generated by each feature weaving layer 500 are also the same as each other.

Therefore, as shown in FIG. 15, the process of generating the first output tensor and the process of generating the second output tensor may be commonly executed in the feature weaving layers 500. That is, a series of processing steps of generating the first output tensor from the first input tensor and a series of processing steps of generating the second output tensor from the second input tensor may be configured as a single series or one of the two series of processing steps may be omitted. In other words, the series of processing steps of generating the first output tensor and the series of processing steps of generating the second output tensor may be treated so that both series are executed when one series is executed. FIG. 15 shows an example of a situation where the series of processing steps of generating the second input tensor are omitted. Except for these differences, the configuration of the fourth specific example may be similar to that of the above-described embodiment. (Model Generation Device)

Returning to FIG. 14, in the fourth specific example, the model generation device 1 can generate a trained estimation module 5 that has acquired the ability to estimate the solution for the task for the general undirected graph 70D in a processing procedure similar to that of the above-described embodiment.

That is, in step S101, the control part 11 acquires a plurality of training graphs 30D. Each training graph 30D includes the general undirected graph 70D. The settings of vertices and edges in each training graph 30D may be appropriately given to appropriately represent training target conditions. In step S102, the control part 11 performs machine learning of the estimation module 5 using the plurality of training graphs 30D that has been acquired. In this machine learning, it is possible to generate a trained estimation module 5 that has acquired the ability capable of estimating a solution for a task for the general undirected graph 70D. In step S103, the control part 11 generates learning result data 125 indicating the generated trained estimation module 5 and stores the generated learning result data 125 in a prescribed storage area. The learning result data 125 may be provided to the estimation device 2D at any timing.
(Estimation Device)

A hardware configuration and a software configuration of the estimation device 2D may be similar to those of the estimation device 2 according to the above-described embodiment. In the fourth specific example, the estimation device 2D can estimate the solution for the task for the general undirected graph 70D in a processing procedure similar to that of the above-described estimation device 2.

That is, in step S201, the control part of the estimation device 2D operates as an acquisition part and acquires the target graph 221D. The target graph 221D includes the general undirected graph 70D. The settings of vertices and edges in the target graph 221D may be appropriately given to appropriately represent estimation target conditions.

In step S202, the control part operates as an estimation part and estimates the solution for the task for the acquired target graph 221D using the trained estimation module 5. Specifically, the control part inputs the target graph 221D to the trained estimation module 5 and executes a forward arithmetic process of the trained estimation module 5. As a result of executing this arithmetic process, the control part can acquire a result of estimating the solution for the task for the target graph 221D from the estimator 55.

In step S203, the control part operates as an output part and outputs information about an estimation result. As in the third specific example, as an example, the control part may output the obtained estimation result to the output device as it is. As another example, when a result of estimating an event occurring on the network has been obtained, the control part may output an alarm for notifying that the possibility of occurrence of an abnormality is greater than or equal to a threshold value when the possibility of occurrence of an abnormality is greater than or equal to the threshold value. As yet another example, when a result of estimating an optimal route in the communication network has been obtained, the control part may transmit a packet in accordance with the estimated optimal route.

Features

Figure 16:
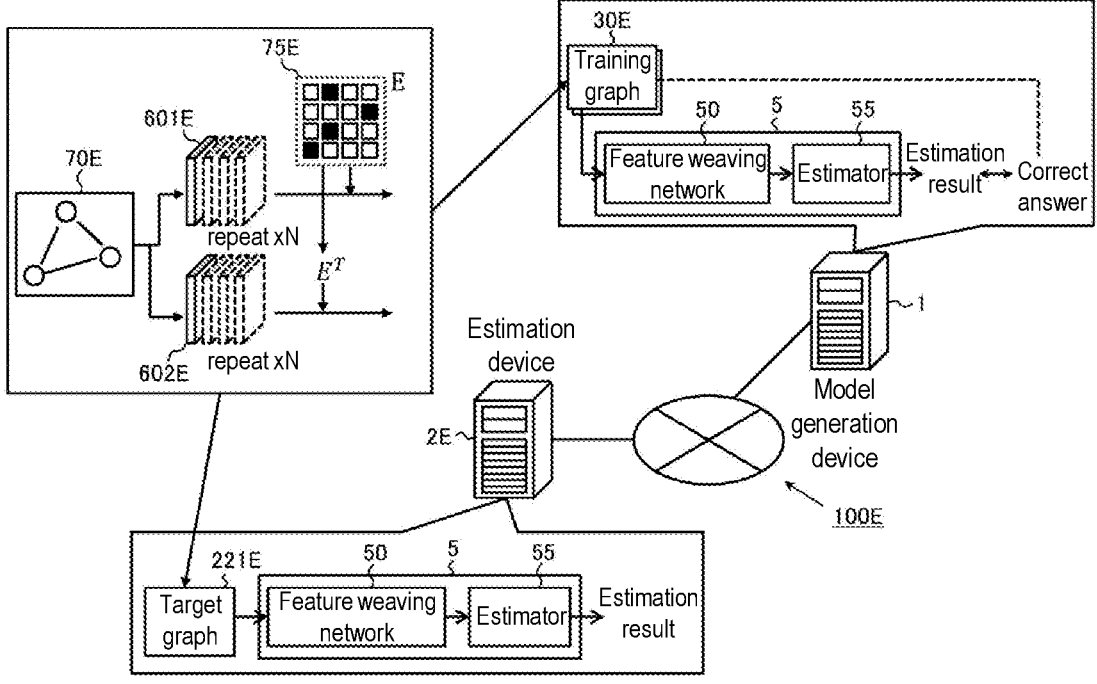
FIG. 16 schematically shows an example of another situation where the present invention is applied (a situation where a task is represented in a vertex feature graph given a relationship between vertices).

According to the fourth specific example, in a situation where a given task is represented by the general undirected graph 70D, the accuracy of estimation of the estimation module 5 can be improved. In the model generation device 1, it is possible to expect the generation of a trained estimation module 5 that can accurately estimate the solution for the task represented in the general undirected graph 70D. In the estimation device 2D, it is possible to expect highly accurate estimation of the solution for the task represented in the general undirected graph 70D using such a trained estimation module 5.
(E) When Vertex Feature Graph with Relationship Between Vertices is Adopted FIG. 16 schematically shows an example of a situation where an estimation system 100E according to a $(5\text{-}1)^{th}$ specific example is applied. The $(5\text{-}1)^{th}$ specific example is an example in which the above-described embodiment is applied to a situation where a vertex feature graph is adopted as a graph representing a given condition (a target for accomplishing the task) and a relationship between vertices constituting the vertex feature graph to be adopted is known. An estimation system 100E according to the $(5\text{-}1)^{th}$ specific example includes a model generation device 1 and an estimation device 2E. The estimation device 2E is an example of the estimation device 2.

In the $(5\text{-}1)^{th}$ specific example, each training graph 30E and a target graph 221E (input graph) are vertex feature graphs 70E including a plurality of vertices having attributes (i.e., vertex features). The types and number of attributes provided in the vertices may be appropriately determined in accordance with the embodiment. Each vertex may have one or more attribute values. The weight is an example of an attribute and the vertex-weighted graph is an example of the vertex feature graph 70E.

Each of the first vertex belonging to the first set of the input graph and the second vertex belonging to the second set corresponds to a vertex constituting the vertex feature graph 70E. Thus, the number of vertices in the first set is the same as the number of vertices in the second set and the vertices belonging to each set are common. The feature quantity related to the edge outgoing from the first vertex to the second vertex corresponds to a vertex attribute of the vertex feature graph 70E corresponding to the first vertex and the feature quantity related to the edge outgoing from the second vertex to the first vertex corresponds to a vertex attribute of the vertex feature graph 70E corresponding to the second vertex. That is, in the $(5\text{-}1)^{th}$ specific example, an attribute value of each vertex is understood as a feature quantity of each edge, such that the vertex feature graph 70E is treated as an edge feature graph whose edge has an attribute as in first to fourth specific examples. An edge-weighted graph in which each edge is weighted is an example of an edge feature graph. The feature quantity may include one or more attribute values.

Each training graph 30E and the target graph 221E are examples of each training graph 30 and the target graph 221 in the above-described embodiment. Also, the number of vertices, attributes, and edge relationships between vertices in the vertex feature graph 70E may be appropriately determined to appropriately represent a target for accomplishing the task. Hereinafter, for convenience of description, it is assumed that the number of vertices is N.

As long as the task can be represented by a vertex feature graph, its content may not be particularly limited and may be appropriately selected in accordance with the embodiment. As an example, the task may be to estimate the event derived from the vertex feature graph 70E.

As a specific example of the task, the vertex feature graph 70E may be configured to show a chemical formula or physical crystal structure indicative of a composition. In this case, each vertex may correspond to an element and an attribute of each vertex may correspond to an attribute of an element such as, for example, a type of element. A relationship between vertices may correspond to a connection relationship between elements. Estimating an event may be estimating a feature related to the composition such as a property of the composition. In addition, estimating an event may be estimating a procedure for generating a substance of the composition. For the representation of the procedure, for example, a natural language, a symbol sequence, and the like may be used. When the symbol sequence is used, a corresponding relationship between the symbol sequence and the procedure may be predetermined according to a rule. Furthermore, the symbol sequence may include instructions for controlling an operation of a production device configured to generate a substance of the composition. The production device may be, for example, a computer, a controller, a robot device, or the like. The instruction may be, for example, a control command, a computer program, or the like.

As another specific example of the task, the vertex feature graph 70E may be configured to show a feature of each of a plurality of targets (e.g., people, objects, etc.). In this case, each vertex corresponds to a target and the attributes of each vertex may correspond to a feature of the target. The feature of each target may be extracted from a graph representing a profile according to the above-described third or fourth specific example. Estimating an event may be optimal matching between targets. A matching target may be, for example, a customer/advertisement, a patient/doctor, a person/job, or the like.

As yet another specific example of the task, the vertex feature graph 70E may be configured to indicate a power supply network. In this case, each vertex may correspond to a power production node or a power consumption node. The vertex attributes may be configured to indicate, for example, a production volume, consumption, and the like. Each edge may correspond to an electric wire. Estimating an event may be estimating an optimal combination of a production node and a consumption node.

The estimator 55 may be appropriately configured to derive a result of estimating the solution for the task for the vertex feature graph 70E such as the above-described event estimation from the feature information. The correct answer in machine learning may be appropriately given in accordance with the content of the task for the vertex feature graph 70E. For example, a correct answer label indicating the correct answer for estimation such as the true value of an event may be associated with each training graph 30E. In the machine learning, this correct answer label may be used to calculate the error. In addition, the correct answer in machine learning may be appropriately given as so that an estimation result satisfying the desired criteria can be obtained.

In the $(5-1)^{th}$ specific example, the vertex feature graph 70E is treated as an input graph during the machine learning of the model generation device 1 and during the estimation process of the estimation device 2E. The first feature weaving layer 5001 of the feature weaving network 50 is configured to receive the first input tensor 601E and the second input tensor 602E from the vertex feature graph 70E. It is possible to obtain input tensors (601E and 602E) by replicating elements of a tensor ($\in^{N \times 1 \times D0}$) obtained by arranging vertices on the first axis and arranging feature quantities indicating vertex attributes on the third axis along the second axis N times ("repeat×N" of FIG. 16). However, in this state, a relationship between vertices is not reflected in each input tensor (601E or 602E).

Therefore, each element of the third axis of each input tensor (601E or 602E) from the input graph received by the first feature weaving layer 5001 may be concatenated with or multiplied by information 75E (E and $E^T$) indicating a relationship between corresponding vertices of the vertex feature graph 70E. The relationship between vertices may be defined by, for example, edge attributes such as the presence or absence of edges, edge types, and feature quantities related to edges. The representation form of the relationship between vertices may not be particularly limited and may be appropriately determined in accordance with the embodiment. As an example, when the presence or absence of edges is indicated, a relationship between vertices may be represented by binary values {0, 1}. As another example, when an attribute such as an edge type is reflected, the relationship between vertices may be represented as a continuous value.

By arranging vertices on the first and second axes and arranging numerical information indicating a relationship between the vertices (an attribute of an edge between the vertices) on the third axis, the information 75E applied to the first input tensor 601E can be generated in a tensor format ($E \in^{N \times N \times DE}$). DE denotes the number of dimensions of numerical information indicating the relationship between vertices. By transposing the first axis and the second axis of this information 75E (E), the information 75E ($E^T$) to be applied to the second input tensor 602E can be generated. As an example, DE may be one-dimensional and the information 75E indicating the relationship between the vertices may be represented by a matrix.

Concatenation may be a process of combining the information 75E indicating the relationship between vertices with the third axis of each input tensor (601E or 602E) (a cat operation). In addition, the information 75E indicating the relationship between vertices may be combined with another dimension (e.g., a new fourth axis) of each input tensor (601E or 602E). Also, when the relationship between vertices is defined only by the presence or absence of edges, it is possible to reflect the relationship between vertices in each input tensor (601E or 602E) by omitting portions where there is no relationship between vertices (or where there is no edge). Except for these differences, the configuration of the $(5-1)^{th}$ specific example may be similar to that of the above-described embodiment.

(Model Generation Device)

In the $(5-1)^{th}$ specific example, the model generation device 1 can generate a trained estimation module 5 that has acquired the ability to estimate the solution for the task for the vertex feature graph 70E in a processing procedure similar to that of the above-described embodiment.

That is, in step S101, the control part 11 acquires a plurality of training graphs 30E. Each training graph 30E includes the vertex feature graph 70E. The settings of vertices, attributes, and edges in each training graph 30E may be appropriately given to appropriately represent training target conditions. In step S102, the control part 11 performs machine learning of the estimation module 5 using the plurality of training graphs 30E that has been acquired. In this machine learning, it is possible to generate a trained estimation module 5 that has acquired the ability to estimate the solution for the task for the vertex feature graph 70E. In step S103, the control part 11 generates learning result data 125 indicating the generated trained estimation module 5 and stores the generated learning result data 125 in a prescribed storage area. The learning result data 125 may be provided to the estimation device 2E at any timing.

(Estimation Device)

A hardware configuration and a software configuration of the estimation device 2E may be similar to those of the estimation device 2 according to the above-described embodiment. In the $(5-1)^{th}$ specific example, the estimation device 2E can estimate the solution for the task for the vertex feature graph 70E in a processing procedure similar to that of the above-described estimation device 2.

That is, in step S201, the control part of the estimation device 2E operates as an acquisition part and acquires a target graph 221E. The target graph 221E includes the vertex feature graph 70E. The settings of vertices, attributes, and edges in the target graph 221E may be appropriately given to appropriately represent estimation target conditions.

In step S202, the control part operates as an estimation part and estimates the solution for the task for the acquired target graph 221E using the trained estimation module 5. Specifically, the control part inputs the target graph 221E to the trained estimation module 5 and executes a forward arithmetic process of the trained estimation module 5. As a result of executing this arithmetic process, the control part can acquire a result of estimating the solution for the task for the target graph 221E from the estimator 55.

In step S203, the control part operates as an output part and outputs information about the estimation result. As an example, the control part may output the obtained estimation result to the output device as it is. As another example, when the target graph 221E is configured to indicate a target composition (a chemical formula or a physical crystal structure) and a procedure for generating a substance of the target composition is estimated, the control part may control an operation of the production device in accordance with a procedure indicated by an obtained estimation result. As another example, when matching between targets or a combination of a production node and a consumption node is estimated, the control part may cause the matching or combination to be valid (definite).

Features

According to the $(5-1)^{th}$ specific example, the accuracy of estimation of the estimation module 5 can be improved in a situation where the task is represented by the vertex feature graph 70E in which the relationship between the vertices is known. In the model generation device 1, it is possible to expect the generation of a trained estimation module 5 that can accurately estimate the solution for the task represented in the vertex feature graph 70E. In the estimation device 2E, it is possible to expect highly accurate estimation of the solution for the task represented in the vertex feature graph 70E using such a trained estimation module 5.

Figure 17:
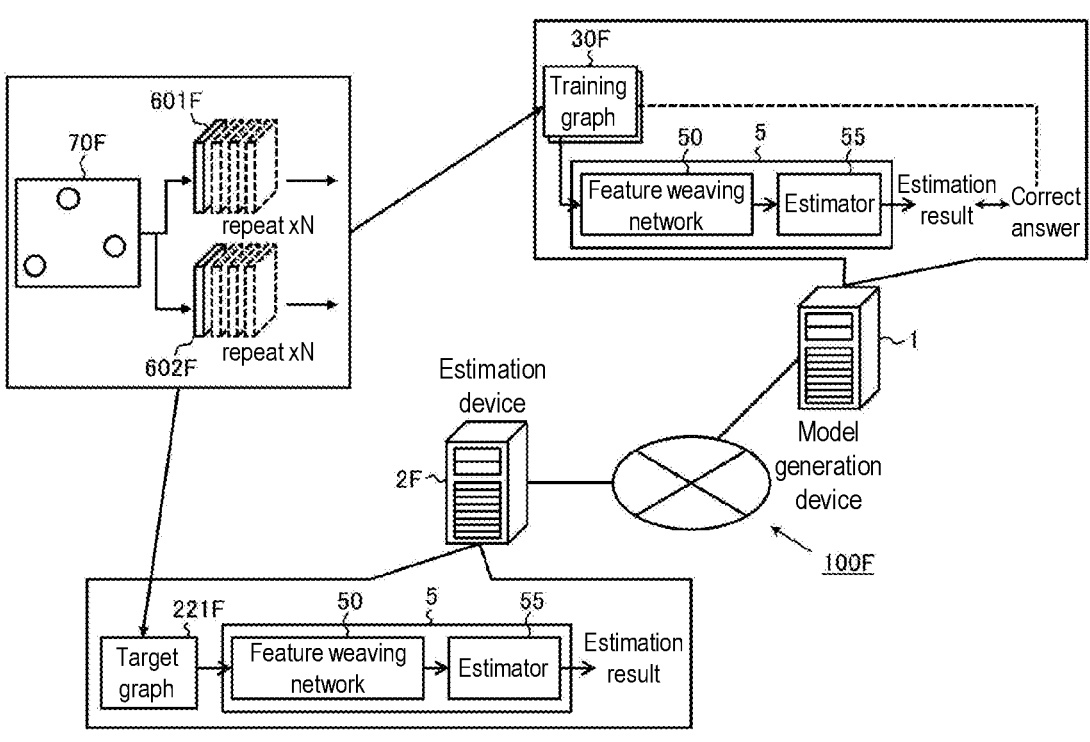
FIG. 17 schematically shows an example of another situation where the present invention is applied (a situation where the task of estimating the relationship between targets is represented in a vertex feature graph).

(F) When Vertex Feature Graph in which Relationship Between Vertices is Unknown is Adopted FIG. 17 schematically shows an example of a situation where an estimation system 100F according to a $(5-2)^{th}$ specific example is applied. The $(5-2)^{th}$ specific example is an example in which the above-described embodiment is applied to a situation where the vertex feature graph is adopted as a graph representing a given condition (a target for accomplishing the task) and the relationship between the vertices constituting the adopted vertex feature graph is unknown. The estimation system 100F according to the $(5-2)^{th}$ specific example includes a model generation device 1 and an estimation device 2F. The estimation device 2F is an example of the above-described estimation device 2.

Basically, the $(5-2)^{th}$ specific example is similar to the $(5-1)^{th}$ specific example, except that a relationship between vertices (i.e., edge information) is not given. That is, each training graph 30F and a target graph 221F (input graph) are vertex feature graphs 70F including a plurality of vertices having attributes. The first vertex belonging to the first set of the input graph and the second vertex belonging to the second set correspond to vertices constituting the vertex feature graph 70F. The feature quantity related to the edge outgoing from the first vertex to the second vertex corresponds to a vertex attribute corresponding to the first vertex in the vertex feature graph 70F and the feature quantity related to the edge outgoing from the second vertex to the first vertex corresponds to a vertex attribute corresponding to the second vertex in the vertex feature graph 70F. Each training graph 30F and the target graph 221F are examples of each training graph 30 and the target graph 221 in the above-described embodiment. The number and attributes of vertices in the vertex feature graph 70F may be appropriately determined to appropriately represent a target for accomplishing the task.

As long as the task can be represented by a vertex feature graph in which the relationship between vertices is unknown, its content may not be particularly limited and may be appropriately selected in accordance with the embodiment. As an example, the task may be to estimate the relationship between vertices constituting the vertex feature graph 70F.

As a specific example of the task, the vertex feature graph 70F may be configured to correspond to an image in which a physical object has been detected (e.g., a case graph). In this case, each vertex corresponds to the detected physical object and the attribute of each vertex may correspond to the attribute of the detected physical object. Estimating the relationship between vertices may be estimating a feature shown in the image (image recognition). The specific example may be adopted in various situations where image recognition is performed.

As another specific example of the task, the vertex feature graph 70F may be configured to correspond to an image in which one or more people are shown and feature points of the person are detected (e.g., a case graph or a skeletal model). In this case, each vertex corresponds to a feature point (for example, a joint or the like) of the detected person and an attribute of each vertex corresponds to the attribute of the detected feature point (for example, a type of joint, a position, an inclination, or the like). Estimating the relationship between vertices may be estimating a type of human behavior (motion analysis). The specific example may be adopted in various situations where motion analysis such as video analysis of sports (particularly, team competitions) is performed.

As yet another specific example of the task, the vertex feature graph 70F may be configured to indicate the properties of the composition. The nature of the composition may be defined by, for example, a type of influence on the human body (drug effect, side effect, residue, reaction upon skin contact, or the like), degrees of various types of properties (efficiency of photoelectric effect, efficiency of thermoelectric effect, absorption/reflection efficiency of infrared rays, a friction coefficient, and the like), and the like. In this case, each vertex may correspond to a specific property and the attribute of each vertex may be configured to indicate a degree of a particular property. Estimating the relationship between vertices may be estimating (generating) a structure (e.g., a chemical formula or a physical crystal structure) of the composition satisfying the properties indicated by the vertex feature graph 70F.

The estimator 55 may be appropriately configured to derive a result of estimating the solution for the task for the vertex feature graph 70F, such as image recognition, motion analysis, or structure generation, from the feature information. The correct answer in the machine learning may be appropriately given in accordance with the content of the task for the vertex feature graph 70F. For example, a correct answer label indicating the correct answer of estimation such as the true value of image recognition, the true value of motion analysis, and the true value of structure generation may be associated with each training graph 30F. In the machine learning, this correct answer label may be used to calculate the error.

In the $(5\text{-}2)^{th}$ specific example, the vertex feature graph 70F is treated as an input graph during the machine learning of the model generation device 1 and during the estimation process of the estimation device 2F. The first feature weaving layer 5001 of the feature weaving network 50 is configured to receive a first input tensor 601F and a second input tensor 602F from the vertex feature graph 70F. Each input tensor (601F or 602F) may be obtained in a method similar to that of each input tensor (601E or 602E) of the $(5\text{-}1)^{th}$ specific example. Except for these differences, the configuration of the $(5\text{-}2)^{th}$ specific example may be similar to that of the above-described embodiment.

(Model Generation Device)

In the $(5\text{-}2)^{th}$ specific example, the model generation device 1 can generate a trained estimation module 5 that has acquired the ability to estimate the solution for the task for the vertex feature graph 70F in a processing procedure similar to that of the above-described embodiment.

That is, in step S101, the control part 11 acquires a plurality of training graphs 30F. Each training graph 30F includes the vertex feature graph 70F. The settings of vertices and attributes in each training graph 30F may be appropriately given to appropriately represent training target conditions. In step S102, the control part 11 performs machine learning of the estimation module 5 using the plurality of training graphs 30F that has been acquired. In this machine learning, it is possible to generate a trained estimation module 5 that has acquired the ability to estimate the solution for the task for the vertex feature graph 70F. In step S103, the control part 11 generates learning result data 125 indicating the generated trained estimation module 5 and stores the generated learning result data 125 in a prescribed storage area. The learning result data 125 may be provided to the estimation device 2F at any timing.

(Estimation Device)

A hardware configuration and a software configuration of the estimation device 2F may be similar to those of the estimation device 2 according to the above-described embodiment. In the $(5\text{-}2)^{th}$ specific example, the estimation device 2F can estimate the solution for the task for the vertex feature graph 70F in a processing procedure similar to that of the above-described estimation device 2.

That is, in step S201, the control part of the estimation device 2F operates as an acquisition part and acquires a target graph 221F. The target graph 221F includes the vertex feature graph 70F. The settings of vertices and attributes in the target graph 221F may be appropriately given to appropriately represent estimation target conditions. In the case of structure generation, a value of each property (i.e., an attribute value of each vertex) may be given as a random number or may be given in a designation process of the operator.

In step S202, the control part operates as an estimation part and estimates a solution for a task for the acquired target graph 221F using the trained estimation module 5. Specifically, the control part inputs the target graph 221F to the trained estimation module 5 and executes a forward arithmetic process of the trained estimation module 5. As a result of executing this arithmetic process, the control part can acquire a result of estimating the solution for the task for the target graph 221F from the estimator 55.

In step S203, the control part operates as an output part and outputs information about an estimation result. As an example, the control part may output the obtained estimation result to the output device as it is. As another example, the control part may perform information processing according to the obtained estimation result. For example, when the target graph 221F is configured to correspond to an image in which a physical object has been detected, the control part may execute information processing according to an image recognition result. As a specific application situation, the $(5\text{-}2)^{th}$ specific example may be applied to the recognition of a captured image obtained by photographing a situation outside of a vehicle with a camera. In this situation, when it is determined that an obstacle is approaching the vehicle on the basis of an image recognition result, the control part may assign a command for avoiding the obstacle (for example, stopping, a lane change, or the like) to the vehicle. Also, for example, when the target graph 221F is configured to correspond to an image in which a human feature point is detected, the control part may execute information processing according to a result of operation analysis. As a specific application situation, the $(5\text{-}2)^{th}$ specific example may be applied to the analysis of motion of a person shown in a captured image obtained by a camera installed on a platform of a railway station. In this situation, on the basis of a motion analysis result, when it is determined that a person located on the platform is in danger (for example, the person is about to fall from the platform), the control part may output an alarm for notifying that the person is in danger.

Features

According to the $(5\text{-}2)^{th}$ specific example, when a task of estimating the relationship between vertices is represented by the vertex feature graph 70F, the accuracy of estimation of the estimation module 5 can be improved. In the model generation device 1, it is possible to expect the generation of a trained estimation module 5 that can estimate a solution for the task of estimating the relationship between the vertices of the vertex feature graph 70F with high accuracy. In the estimation device 2F, it is possible to expect highly accurate estimation of the solution for the task of estimating the relationship between the vertices of the vertex feature graph 70F using such a trained estimation module 5.

(G) When Hypergraph is Adopted

Figure 18:
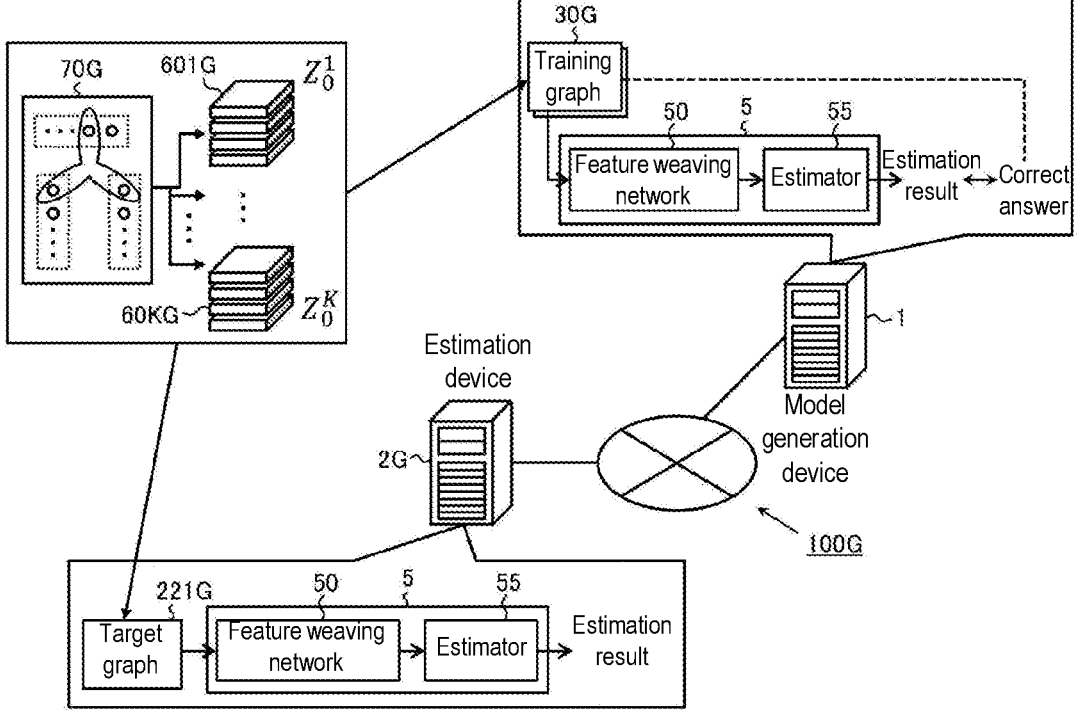
FIG. 18 schematically shows an example of another situation where the present invention applies (a situation where a task is represented in a hypergraph).

FIG. 18 schematically shows an example of a situation where an estimation system 100G according to a sixth specific example is applied. The sixth specific example is an example in which the above-described embodiment is applied to a situation where a hypergraph is adopted as a graph representing a given condition (a target for accomplishing a task). The estimation system 100G according to the sixth specific example includes a model generation device 1 and an estimation device 2G. The estimation device 2G is an example of the estimation device 2.

In the sixth specific example, each training graph 30G and a target graph 221G (input graph) are K-partite hypergraphs 70G. K is an integer greater than or equal to 3. A plurality of vertices constituting the hypergraph 70G is divided so that there are no edges between vertices in each subset and each vertex belongs to one of K subsets. Each training graph 30G and the target graph 221G correspond to each training graph 30 and the target graph 221 in the above-described embodiment. Also, the number of vertices, the presence or absence of edges between vertices, and a value of K in the hypergraph 70G may be appropriately determined to appropriately represent a target for accomplishing a task.

As in the above-described embodiment, in the sixth specific example, the estimation module 5 includes a feature weaving network 50 and an estimator 55. The feature weaving network 50 includes a plurality of feature weaving layers 500 and is configured to receive an input of an input graph and output feature information about the input graph. The estimator 55 is configured to estimate the solution for the task for the input graph from the feature information output from the feature weaving network. Each feature weaving layer 500 includes an encoder 505. The encoder 505 is configured to derive a relative feature quantity of each element from all input feature quantities of elements. On the other hand, in the sixth specific example, each feature weaving layer 500 of the estimation module 5 and various types of information (an input tensor and the like) are extended from the above-described embodiment to process the hypergraph 70G.

Figures 19, 20, 21, 22:
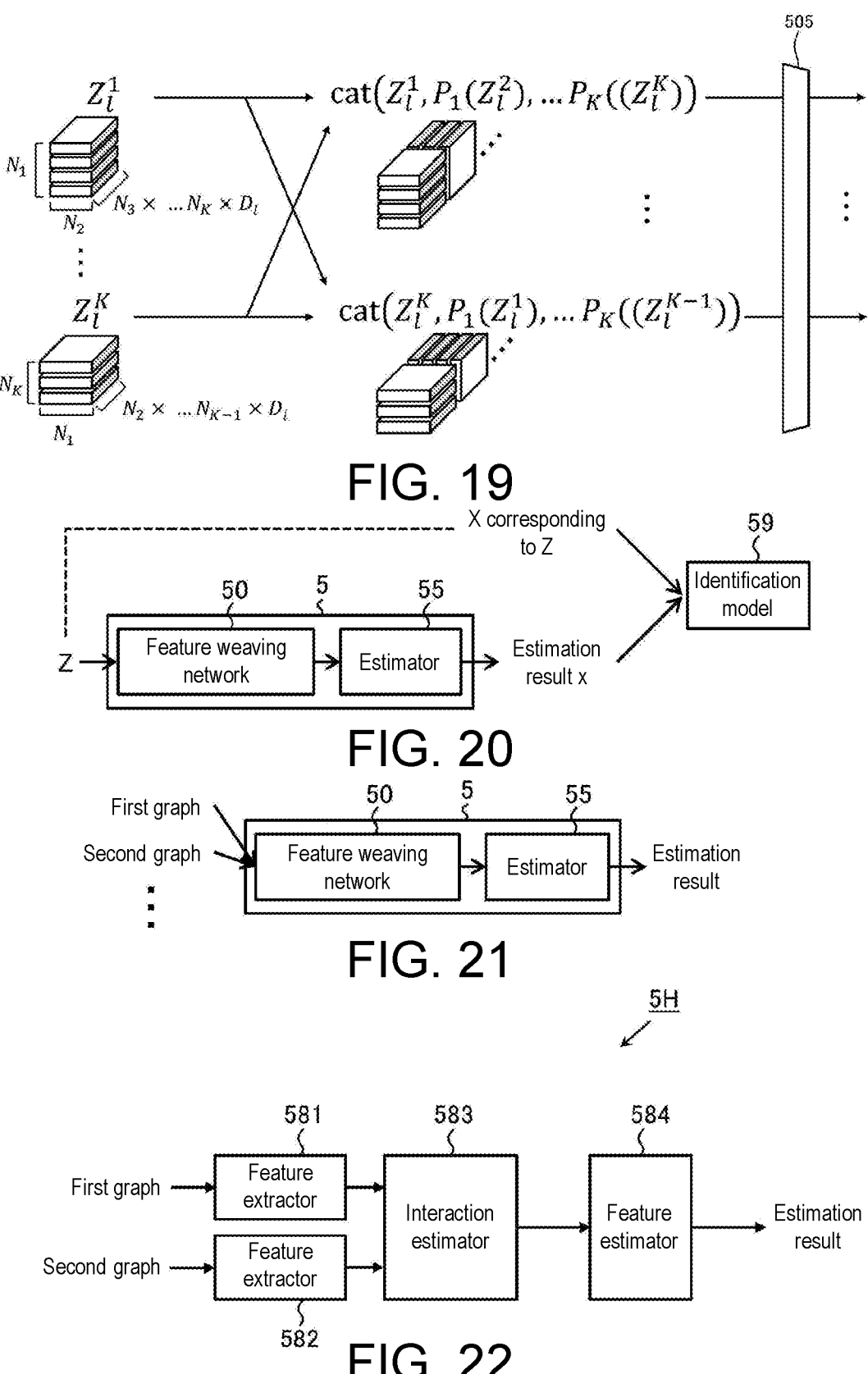
FIG. 19 schematically shows an example of an arithmetic process of a feature weaving layer in a situation where a task is represented in a hypergraph.
FIG. 20 schematically shows an example of a machine learning processing process according to a modified example.
FIG. 21 schematically shows an example of an input form of the estimation module according to a modified example.
FIG. 22 schematically shows an example of a configuration of an estimation module according to a modified example.

FIG. 19 schematically shows an example of an arithmetic process of each feature weaving layer 500 in the sixth specific example. In FIG. 19, $N_i$ denotes the number of $i^{th}$ vertices (i is an integer between 1 and K). Each feature weaving layer 500 is configured to an input of K $(K+1)^{th}$-order input tensors $$(Z_i^1, \ldots, Z_i^K).$$

An $i^{th}$ input tensor $$(Z_i^i)$$

among the K input tensors is configured so that an $i^{th}$ vertex belonging to an $i^{th}$ subset of the input graph is arranged as an element on a first axis, a vertex belonging to a $(j-1)^{th}$ subset is arranged as an element on a $j^{th}$ axis between a second axis and a $K^{th}$ axis by performing a circulation process using the $i^{th}$ subset as a start point, and a feature quantity related to an edge outgoing from the $i^{th}$ vertex belonging to the $i^{th}$ subset to a combination of vertices belonging to each of $(K-1)$ other subsets (subsets other than the $i^{th}$ subset) is arranged as an element on a $(K+1)^{th}$ axis. For example, the elements of each axis of the first input tensor $$(Z_i^1)$$

are represented by $N_1 \times N_2 \times \ldots \times N_K \times D_l$. The elements of each axis of the second input tensor are represented as $N_2 \times N_3 \times \ldots \times N_K \times N_1 \times D_l$. The elements of each axis of the $K^{th}$ input tensor are represented as $N_K \times N_1 \times \ldots \times N_{K-1} \times D_l$.

Each feature weaving layer 500 is configured to perform the following arithmetic operations. That is, each feature weaving layer 500 fixes the $(K+1)^{th}$ axis of each of $(K-1)$ input tensors other than the $i^{th}$ input tensor with respect to the $i^{th}$ input tensor $$(Z_i^i)$$

between a first input tensor and a $K^{th}$ input tensor and circulates an axis other than the $(K+1)^{th}$ axis of each of the other input tensors in alignment with each axis of the $i^{th}$ input tensor. For example, in the processing route of the first input tensor, an axis other than the $(K+1)^{th}$ axis of the second to $K^{th}$ input tensors other than the first input tensor is circulated in alignment with each axis of the first input tensor. Specifically, in the second input tensor, the $K^{th}$ axis corresponds to the first axis of the first input tensor. Thus, the first to $K^{th}$ axes of the second input tensor are circulated one by one in the right direction in a representation of the above-described axis element $$(N_2 \times N_3 \times \ldots \times N_K \times N_1 \times D_l)(P_1(Z_i^2)).$$

Likewise, the first to $K^{th}$ axes of the third input tensor are circulated two by two in the right direction. The first to $K^{th}$ axes of the $K^{th}$ input tensor are circulated K by K in the right direction $$(P_K(Z_i^K)).$$

Also, for example, in the processing route of the $K^{th}$ input tensor, an axis other than the $(K+1)^{th}$ axis of the first to $(K-1)^{th}$ input tensors other than the $K^{th}$ input tensor is circulated in alignment with each axis of the $K^{th}$ input tensor. Specifically, the first to $K^{th}$ axes of the first input tensor are circulated one by one in the right direction $$(P_1(Z_i^1)).$$

Likewise, the first to $K^{th}$ axes of the $(K-1)^{th}$ input tensor are circulated K by K in the right direction $$(P_K(Z_i^{K-1})).$$

In the processing route of the second to $(K-1)^{th}$ input tensors, the axes of each input tensor are circulated in a similar method.

Subsequently, each feature weaving layer 500 concatenates feature quantities of elements of an $i^{th}$ input tensor and another input tensor obtained by circulating the axis. Thereby, each feature weaving layer 500 generates K $(K+1)$ $^{th}$-order concatenated tensors. For example, in the processing route of the first input tensor, each feature weaving layer 500 generates a first concatenated tensor $$\left(cat\!\left(Z_i^1, P_1\!\left(Z_i^2\right), \ldots, P_K\!\left(Z_i^K\right)\right)\right)$$

by concatenating feature quantities of elements of the first input tensor $$\left(Z_i^1\right)$$

and the second to $K^{th}$ input tensors $$\left(P_1\!\left(Z_i^2\right) \text{ to } P_K\!\left(Z_i^K\right)\right)$$

obtained by circulating the axis. Also, for example, in the processing route of the $K^{th}$ input tensor, each feature weaving layer 500 generates a $K^{th}$ concatenated tensor $$\left(cat\!\left(Z_i^K, P_1\!\left(Z_i^1\right), \ldots, P_K\!\left(Z_i^{K-1}\right)\right)\right)$$

by concatenating feature quantities of elements of the $K^{th}$ input tensor $$\left(Z_i^K\right)$$

and the first to $(K-1)^{th}$ input tensors $$P_1\!\left(Z_i^2\right) \text{ to } P_K\!\left(Z_i^{K-1}\right)$$

obtained by circulating the axis. In the processing route of the second to $(K-1)^{th}$ input tensors, concatenated tensors are generated in a similar method.

Also, each feature weaving layer 500 divides K generated concatenated tensors for each element of the first axis, inputs the divided concatenated tensors to the encoder 505, and executes an arithmetic operation of the encoder 505. Each feature weaving layer 500 generates K $(K+1)^{th}$-order output tensors respectively corresponding to the K input tensors by obtaining the arithmetic operation result of the encoder 505 for each element. Each feature weaving layer 500 is configured to execute each of the above-described arithmetic operations. The other configuration of each feature weaving layer 500 may be similar to that of the above-described embodiment.

As in the above-described embodiment, as an example, the encoder 505 may include a single encoder commonly used between elements of the first axis of each concatenated tensor. As another example, the encoder 505 may include K encoders separately used for concatenated tensors. In yet another example, the encoder 505 may be separately provided for each element of the concatenated tensors.

Returning to FIG. 18, as long as the task can be represented by a hypergraph, its content may not be particularly limited and may be appropriately selected in accordance with the embodiment. As an example, the task may be a matching task between K parties and determine an optimal combination of targets belonging to each party. In this case, each subset of the hypergraph 70G corresponds to each party in the matching task. Vertices belonging to each subset of the hypergraph 70G correspond to targets belonging to each party. A feature quantity related to an edge outgoing from the $i^{th}$ vertex belonging to the $i^{th}$ subset to a combination of vertices belonging to $(K-1)$ other subsets (subsets other than the $i^{th}$ subset) may correspond to the cost or reward for matching between a target corresponding to the $i^{th}$ vertex and a combination of targets corresponding to vertices belonging to subsets other than the $i^{th}$ subset. Alternatively, the feature quantity may correspond to a desired level from the target corresponding to the $i^{th}$ vertex and a combination of targets corresponding to vertices belonging to subsets other than the $i^{th}$ subset.

The matching target may be appropriately selected in accordance with the embodiment. Matching tasks may be performed, for example, for the purposes of identifying an optimal combination of three or more parts, identifying an optimal combination of three or more people, identifying a combination of three terms optimal for learning for calculating triplet loss in distance learning, identifying a combination of feature points belonging to the same person when postures of a plurality of people in an image are simultaneously estimated, and identifying an optimal combination of a delivery truck, a load, and a route, and the like. In accordance with this, the matching target may be, for example, a part, a person, data to be calculated for triplet loss, a feature point of a person detected in the image, a delivery truck/load/route, and the like. Identifying the optimal combination of people may be performed for team building, such as, for example, managers/programmers/sales, web front-end programmers/back-end programmers/data scientists, etc.

The estimator 55 may be appropriately configured to derive a result of estimating a solution for a task for the hypergraph 70G such as a matching task from the feature information. The correct answer in machine learning may be appropriately given in accordance with content of the task for the hypergraph 70G. As an example, when the task is the matching task, the correct answer in the machine learning may be appropriately given so that a matching result satisfying a desired criterion can be obtained as in the above-described first specific example. As another example, a correct answer label indicating the correct answer of the estimation such as the true value of matching may be associated with each training graph 30G. In the machine learning, this correct answer label may be used to calculate the error. In addition, the correct answer in the machine learning may be appropriately given so that an estimation result satisfying a desired criterion can be obtained. As an example, in the case of the team building described above, prescribed criteria may be defined to evaluate, for example, achievements achieved in the real world such as financial benefits, a reduced employee turnover rate, the reduced number of development processes, an increased amount of progress reporting, an improvement in psychological indices (e.g., questionnaires, sleep time, blood pressure, etc.) and the correct answer may be given in accordance with this evaluation value.

In the sixth specific example, the hypergraph 70G is treated as an input graph during the machine learning of the model generation device 1 and during an estimation process of the estimation device 2G. The first feature weaving layer

5001 among the plurality of feature weaving layers 500 is configured to receive K input tensors 601G to 60KG

$$(Z_0^1, \ldots, Z_0^K)$$

from the hypergraph 70G (input graph). As in the above-described embodiment, as an example, the input tensors 601G to 60KG may be obtained directly from the input graph. As another example, the input tensors 601G to 60KG may be obtained from a result of a prescribed arithmetic process performed for the input graph. In yet another example, the input graph may be given in the form of the input tensors 601G to 60KG.

As an example, the feature weaving layers 500 may be arranged continuously in series. In this case, a feature weaving layer 500 other than the first feature weaving layer 5001 is configured to receive each output tensor generated by the feature weaving layer 500 arranged in an immediately previous stage as an input tensor. That is, the feature weaving layer 500 arranged as an $(l+1)^{th}$ feature weaving layer 500 is configured to receive each output tensor generated by an $l^{th}$ feature weaving layer as an input tensor. However, as in the above-described embodiment, in the sixth specific example, the arrangement of each feature weaving layer 500 may not be limited to this example. For example, other types of layers (e.g., a convolution layer, a fully-connected layer, etc.) may be inserted between adjacent feature weaving layers 500.

The feature information includes K output tensors output from the last feature weaving layer 500L among the plurality of feature weaving layers 500. The estimator 55 may be appropriately configured to derive the above-described estimation result from these K output tensors. Except for these differences, the configuration of the sixth specific example may be similar to that of the above-described embodiment.

(Model Generation Device)

In the sixth specific example, the model generation device 1 can generate a trained estimation module 5 that has acquired the ability to estimate a solution for a task for the hypergraph 70G in a processing procedure similar to that of the above-described embodiment.

That is, in step S101, the control part 11 acquires a plurality of training graphs 30G. Each training graph 30G includes a hypergraph 70G. The settings of vertices and edges in each training graph 30G may be appropriately given to appropriately represent training target conditions. In step S102, the control part 11 performs the machine learning of the estimation module 5 using the plurality of training graphs 30G that has been acquired. As in the above-described embodiment, the machine learning includes training the estimation module 5 so that an estimation result obtained by the estimator 55 is suitable for a correct answer (true value) of the task for each training graph 30G by inputting each training graph 30G as the input graph to the feature weaving network 50. According to this machine learning, it is possible to generate a trained estimation module 5 that has acquired the ability to estimate the solution for the task for the hypergraph 70G. In step S103, the control part 11 generates learning result data 125 indicating the generated trained estimation module 5 and stores the generated learning result data 125 in a prescribed storage area. The learning result data 125 may be provided to the estimation device 2G at any timing.

(Estimation Device)

A hardware configuration and a software configuration of the estimation device 2G may be similar to those of the estimation device 2 according to the above-described embodiment. In the sixth specific example, the estimation device 2G can estimate a solution for a task for the hypergraph 70G in a processing procedure similar to that of the above-described estimation device 2.

That is, in step S201, the control part of the estimation device 2G operates as an acquisition part and acquires a target graph 221G. The target graph 221G includes the hypergraph 70G. The settings of vertices and edges in the target graph 221G may be appropriately given to appropriately represent estimation target conditions.

In step S202, the control part operates as an estimation part and estimates the solution for the task for the acquired target graph 221G using a trained estimation module 5. As in the above-described embodiment, estimating the solution for the task for the target graph 221G using the trained estimation module 5 includes obtaining a result of estimating the solution for the task from the estimator 55 by inputting the target graph 221G as the input graph to the feature weaving network 50. Specifically, the control part inputs the target graph 221G to the trained estimation module 5 and executes a forward arithmetic process of the trained estimation module 5. As a result of executing this arithmetic process, the control part can acquire a result of estimating the solution for the task for the target graph 221G from the estimator 55.

In step S203, the control part operates as an output part and outputs information about the estimation result. As an example, the control part may output the obtained estimation result to the output device as it is. As another example, when the estimation result of the matching described above has been obtained, the control part may cause a matching of at least a part of the estimation result to be valid as in the first specific example and the like. In this case, furthermore, as in the first specific example, the estimation device 2G may be configured to perform matching online in real time.

Features

According to the sixth specific example, the accuracy of estimation of the estimation module 5 can be improved in a situation where the task is represented by the hypergraph 70G. In the model generation device 1, it is possible to expect the generation of a trained estimation module 5 capable of accurately estimating the solution for the task represented in the hypergraph 70G. In the estimation device 2G, it is possible to expect highly accurate estimation of the solution for the task represented in the hypergraph 70G using such a trained estimation module 5.

<4.2>

The machine learning method may not be limited to the above-described example of the training process and a process may be omitted, changed, replaced, and added as appropriate in accordance with the embodiment. As another example, a machine learning target may further include an identification model in addition to the estimation module 5. In accordance with this, machine learning may further include performing adversarial learning between the estimation module 5 (in particular, the estimator 55) and the identification model in addition to the above-described training process.

FIG. 20 schematically shows an example of a machine learning process according to the present modified example. As in the above-described embodiment, the estimation module 5 is configured to receive an input of an input graph Z and output an estimation result x of a solution for a task for the input graph Z. On the other hand, the identification model 59 is configured to receive an input of a correct answer (true value) X of the task corresponding to the input graph Z or the estimation result x of the estimation module 5 and identify a source of input data (i.e., whether the input data is the correct answer X or the estimation result x). The type of machine learning model constituting the identification model 59 may not be particularly limited and may be appropriately selected in accordance with the embodiment. The identification model 59 may include, for example, a neural network or the like.

In an example of adversarial learning, the identification model 59 is trained so that an error of a result of identifying the source of the input data is reduced using the correct answer X for each training graph 30 (input graph Z) and the estimation result x of the estimation module 5 for each training graph 30 as input data. In the training step of the identification model 59, the value of the parameter of the identification model 59 is adjusted, while the value of the parameter of the estimation module 5 is fixed. Also, the estimation module 5 is trained to output the estimation result x that causes misidentification of the identification model 59. In the training step of the estimation module 5, the value of the parameter of the identification model 59 is fixed, while the value of the parameter of at least a part of the estimation module 5 (e.g., the estimator 55) is adjusted.

As the training method, a known method such as an error backpropagation method may be adopted. Each training step may be performed alternately and repeatedly. Alternatively, by inserting a gradient reversal layer between the estimation module 5 and the identification model 59, the above-described two training steps may be executed simultaneously. Each gradient inversion layer may be appropriately configured to pass a value as it is during an arithmetic operation of forward propagation and invert the value during reverse propagation.

According to the present modified example, the identification model 59 acquires the ability to identify the source of the input data in accordance with the estimation ability of the estimation module 5. On the other hand, the estimation module 5 acquires the ability to generate an estimation result approximated to the correct answer in accordance with the identification ability of the identification model 59. As each training step is repeatedly executed, the ability of the estimation module 5 and the identification model 59 are mutually enhanced. Thereby, the estimation module 5 can acquire the ability to generate an estimation result very close to the correct answer. As an example, the present modified example may be adopted in the case of structure generation of the above-described $(5\text{-}2)^{th}$ specific example. Thereby, it is possible to expect the generation of a trained estimation module 5 capable of more accurately estimating a structure of a composition satisfying designated properties.

<4.3>

FIG. 21 schematically shows another example of an input form of the estimation module 5. As shown in FIG. 21, in the above-described embodiment, the number of graphs input to the estimation module 5 at one time when a task is accomplished may not be limited to one and a plurality of input graphs (a first graph and a second graph of FIG. 21 and the like) may be input to the estimation module 5 simultaneously. In this case, the structure of the estimation module 5 may be appropriately changed with the number of graphs to be input.

FIG. 22 schematically shows an example of a configuration of an estimation module 5H according to the present modified example. The estimation module 5H is configured to receive inputs of two graphs and perform the task of searching for the other input graph (query) in one input graph (pattern). The estimation module 5H is an example of the estimation module 5 according to the above-described embodiment. For convenience of description, it is assumed that the first graph is a query and the second graph is a pattern. The roles of the first graph and the second graph may be swapped.

In the example of FIG. 22, the estimation module 5H includes a first feature extractor 581, a second feature extractor 582, an interaction estimator 583, and a feature estimator 584. The first feature extractor 581 is configured to receive an input of a first graph and extract a feature of the input first graph. The second feature extractor 582 is configured to receive an input of a second graph and extract a feature of the input second graph. The first feature extractor 581 and the second feature extractor 582 are arranged in parallel on an input side. As an example, the first feature extractor 581 and the second feature extractor 582 may be configured as a commonly used single feature extractor (i.e., one feature extractor may also have both roles of the first feature extractor 581 and the second feature extractor 582). As another example, the first feature extractor 581 and the second feature extractor 582 may be provided separately.

The interaction estimator 583 is configured to receive a result of extracting a feature of each graph from each feature extractor (581 or 582) and estimate an interrelationship of features between graphs. The feature estimator 584 is configured to receive an interrelationship estimation result from the interaction estimator 583 and output a result of searching for the first graph in the second graph. A format of a search result may be appropriately determined in accordance with the embodiment. The search may include, for example, determining whether or not a query is included in the pattern using a binary value, estimating the number of queries included in the pattern, searching for (matching) all locations where queries are included in the pattern, searching for a largest subgraph common between two graphs, and the like.

As an example, each feature extractor (581 or 582) may be the above-described feature weaving network 50. In accordance with this, the interaction estimator 583 and the feature estimator 584 may correspond to the above-described estimator 55. In this case, each feature extractor (581 or 582) may receive an input for each graph in any format. As an example, each feature extractor (581 or 582) may receive an input of each graph in the format of the above-described third specific example or the above-described fourth specific example. That is, each graph may be a general directed graph or a general undirected graph.

As another example, the interaction estimator 583 may be the above-described feature weaving network 50. In accordance with this, the feature estimator 584 may correspond to the estimator 55. In this case, each feature extractor (581 or 582) may not be particularly limited as long as the feature of each graph can be extracted and may be appropriately determined in accordance with the embodiment. Each feature extractor (581 or 582) may be configured in any model. The interaction estimator 583 may receive a feature extraction result from each feature extractor (581 or 582) in the graph format of the $(5\text{-}2)^{th}$ specific example.

In the present modified example, each training graph and a target graph include two graphs. One of the two graphs is a pattern and the other is a query. Except for these differences, the present modified example may be configured as in the above-described embodiment. The model generation device 1 may be configured to perform machine learning of the estimation module 5H. The estimation device 2 may be configured to perform a graph search using the trained estimation module 5H. The machine learning and estimation processing methods may be similar to those of the above-described embodiment.

According to the present modified example, it is possible to improve the search accuracy of the estimation module 5H configured to receive inputs of two graphs and search for the other graph in one graph. In the model generation device 1, it is possible to expect the generation of the trained estimation module 5H capable of accurately estimating a graph search. In the estimation device 2, it is possible to expect a graph search with high accuracy using such a trained estimation module 5H.

<4.4>

In the above-described embodiment, machine learning may include reinforcement learning. In this case, the correct answer may be given according to a prescribed rule as in the above-described embodiment. The reward is calculated according to the correct answer given by this prescribed rule and the estimation module 5 may be trained to maximize a calculated sum of rewards. The prescribed rule may be given in the real world and the rewards may be obtained in the real world. Training the estimation module 5 so that the estimation results obtained by the estimator 55 is suitable for the correct answer may include training based on such reinforcement learning. In this case, the training of the estimation module 5 may be iterated while the estimation module 5 is operating in the estimation device 2. The estimation device 2 may include a learning processing part 112 and the target graph 221 may be used as the training graph 30.

<4.5>

In the above-described embodiment, the encoder 505 may include a single encoder. However, if the first input tensor and the second input tensor belong to different distributions (i.e., the distributions of feature quantities for the first set and the second set are different from each other), there may be two types of input domains for a single encoder. The bias due to this distribution difference is amplified every time an encoder is stacked. Thereby, a single encoder is likely to accomplish two different tasks instead of a common task. As a result, the inventors have found a problem that there is a possibility that the accuracy of the encoder 505 will deteriorate and the accuracy of the entire estimation module 5 will deteriorate.

Simply, as described above, this problem can be solved by providing an encoder separately for each concatenated tensor. However, the method of solving the problem may not be limited to this example. When the encoder 505 includes a single encoder, the problem may be eliminated by adopting at least one of the following two methods.

(First Method)

Figure 23:
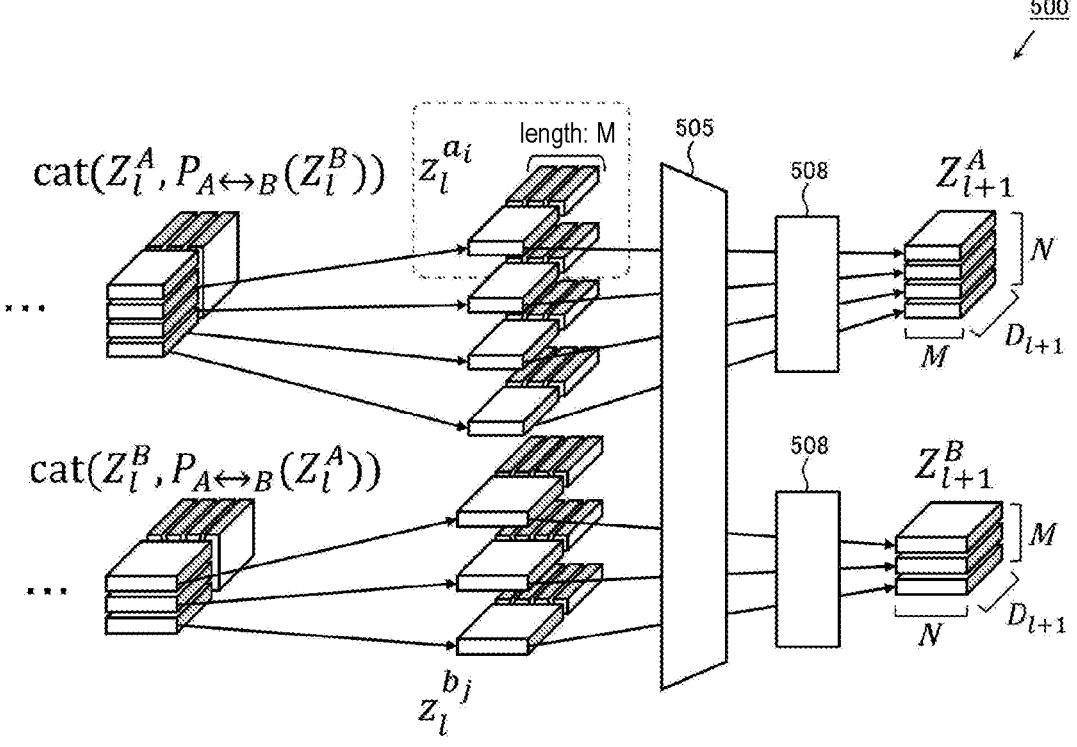
FIG. 23 schematically shows an example of a configuration of a feature weaving layer according to a modified example.

FIG. 23 schematically shows an example of a configuration of the feature weaving layer 500 according to the modified example. The first method is a method of eliminating a distribution difference using a normalizer 508. In the present modified example, the encoder 505 of each feature weaving layer 500 may include a single encoder and each feature weaving layer 500 may further include the normalizer 508 configured to normalize an operation result of the encoder 505 for each concatenated tensor. That is, in the above-described embodiment, each feature weaving layer 500 may include two normalizers 508 corresponding to each concatenated tensor (2L normalizers 508 for L feature weaving layers 500). The method of normalization may be appropriately determined in accordance with the embodiment. As the normalization method, for example, a known method such as batch normalization may be adopted. As an example, each normalizer 508 may be configured to normalize the arithmetic operation result of the encoder 505 according to an arithmetic operation shown in the following Eq. 16.

[Math. 16]

$$\frac{x - u}{\sqrt{v}} \qquad \text{(Eq. 16)}$$

x denotes an arithmetic operation result of the encoder 505 for each concatenated tensor, u denotes an average value of the arithmetic operation result, and v denotes a variance value of the arithmetic operation result. Because the normalizer 508 is provided for each concatenated tensor, the average value u and the variance value v are calculated for each concatenated tensor (i.e., separately for the first concatenated tensor and the second concatenated tensor). According to the calculation of the normalizer 508, arithmetic operation result of the encoder 505 for each concatenated tensor can be normalized to follow a distribution of the average value 0 and the variance value 1. Thereby, the distribution difference between the first input tensor and the second input tensor for the next feature weaving layer 500 can be eliminated.

Therefore, according to the present modified example, even if the encoder 505 is shared between the concatenated tensors (i.e., even if the encoder 505 includes a single encoder), the function of the normalizer 508 can suppress the amplification of a bias due to a difference between distributions to which the first input tensor and the second input tensor belong. As a result, the above-described problems can be eliminated and the deterioration of the accuracy of the estimation module 5 can be prevented.

Also, in each specific example described above, each feature weaving layer 500 may further include the normalizer 508 for each concatenated tensor. In the sixth specific example (hypergraph case), each feature weaving layer 500 may include K normalizers 508 corresponding to each concatenated tensor.

(Second Method)

In the above-described embodiment, the encoder 505 of each feature weaving layer 500 may include a single encoder and each feature weaving layer 500 may be further configured to assign a condition code to the third axis of each of the first input tensor and the second input tensor before the arithmetic operation of the encoder 505 is executed. That is, the second method is a method in which the input of the encoder 505 is conditional. The second method may be adopted in place of/together with the first method.

The condition code may be assigned at any timing from the acquisition of each input tensor to the execution of the arithmetic operation of the encoder 505. Also, the configuration of the condition code may be appropriately determined in accordance with the embodiment. As an example, the condition code may include a prescribed value corresponding to each input tensor. Each prescribed value may be appropriately selected so that each input tensor can be identified. As a specific example, the condition code assigned to the first input tensor may be a first value (for example, 1) and the condition code assigned to the second input tensor may be a second value (for example, 0). An assignment location may be arbitrarily determined. As an example, each condition code may be uniformly added to a rearmost end of the third axis with respect to elements of the first and second axes of each input tensor.

In the present modified example, the encoder 505 of each feature weaving layer 500 can identify the source of the data on the basis of the condition code when a feature quantity is encoded. Thus, even if the first input tensor and the second input tensor belong to different distributions, the encoder 505 can be trained to eliminate a bias due to a distribution difference according to the function of the condition code in a process of machine learning. Therefore, according to the present modified example, it is possible to prevent deterioration of the accuracy of the estimation module 5 due to a difference in a distribution to which each input tensor belongs.

Also, in each of the above-described specific examples, each feature weaving layer 500 may be further configured to assign a condition code to the third axis of each of the first input tensor and the second input tensor before the arithmetic operation of the encoder 505 is executed. In the sixth specific example (hypergraph case), the condition code for each input tensor may be appropriately determined so that at least one input tensor can be identified. As an example, the condition code assigned to the first input tensor may be a first value (for example, 1), and the condition code assigned to each of the second to $K^{th}$ input tensors (i.e., input tensors other than the first input tensor) may be a second value (for example, 0). In this case, a condition code may be assigned to the $(K+1)^{th}$ axis of each input tensor before the arithmetic operation in the circulation process. Thereby, in the condition code portion of each concatenated tensor, the number of circulations of the first input tensor can be identified according to a position of the first value. As a result, during the operation of the encoder 505, an input tensor (an $i^{th}$ input tensor) that is not circulated in each concatenated tensor can be identified. Therefore, by assigning a condition code in the above-described method, the source of the data can be identified on the basis of the condition code when the arithmetic operation of the encoder 505 is executed for each of the K concatenated tensors. Also, when this method is adopted, it is possible to identify the source of the data on the basis of the condition code (the position of the first value) as described above by assigning a first value to any one of the first to $K^{th}$ input tensors and assigning a second value to the remaining (K−1) input tensors. Thus, a target to which the first value is assigned may not be limited to the first input tensor.

§ 5 EMBODIMENT EXAMPLES

In order to verify the effectiveness of feature extraction by the feature weaving network 50, estimation modules related to embodiment examples and comparative examples were generated in the following four experiments. However, the present invention is not limited to the following embodiment examples.

Sample Generation Method

First, as a graph representing a given condition, a directed bipartite graph of the above first specific example was assumed. For the task, the stable marriage problem was adopted as an example of the above matching task. It was assumed that the number of matching targets (agents) for each party was the same (M=N). Under this assumption, a list of desired levels for each target (vertex) partner was created from the following distribution using a method proposed in Reference Literature 1 "Nikolaos Tziavelis, Ioannis Giannakopoulos, Katerina Doka, Nectarios Koziris, and Panagiotis Karras, 'Equitable stable matchings in quadratic time,' In Proceedings of Advances in Neural Information Processing Systems, pages 457 to 467, 2019." Thereby, samples used for machine learning and evaluation were generated.

First Distribution: Uniform Distribution (U)

A desired level of each agent for the matching candidate (partner) is random and is defined by the uniform distribution U(0,1) (the larger the value, the higher the desired level).

Second Distribution: Discrete Distribution (D)

Each agent has a desired level defined by U(0.5,1) for some matching candidates (candidates for a largest integer of 0.4N or less) and a desired level defined by U(0, 0.5) for the remaining candidates.

Third Distribution: Gaussian Distribution (G)

The desired level of each agent for the $i^{th}$ matching candidate is defined by the Gaussian distribution N(i/N, 0.4).

Fourth Distribution: LibimSeTi (Lib)

On the basis of the two-dimensional distribution of the frequency of each probability pair estimated from the data (matching activity) obtained by the Czech web service "LibimSeTi," the desired level of each agent of each party is defined (Reference Literature 2, "Lukas Brozovsky and Vaclav Petricek, 'Recommender system for online dating service,' In Proceedings of Conference Znalosti 2007, Ostrava, 2007").

By selecting one of the above-described four distributions for each of the first party (first subset) and the second party (second subset), five different settings (i.e., UU, DD, GG, UD, and Lib) were created. For example, "UU" denotes that both parties have defined the desired level of each agent in the uniform distribution (U). "UD" denotes that the desired level of each agent belonging to one party has been defined by the uniform distribution (U) and the desired level of each agent belonging to the other party has been defined by the discrete distribution (D). Also, 1,000 training samples (training data) and 1,000 verification samples (verification data) were randomly generated for each of the five distribution settings and the size (N×N) designated in each of the following experiments.

Experiment I: Comparison Between Embodiment Example and Other Machine Learning Models In Experiment I, the effectiveness of the present invention was verified by comparing a success rate of matching between a solver according to each of the following embodiment examples and a solver including a trained machine learning model according to the following comparative example.

EMBODIMENT EXAMPLES

By adopting the configuration of the above-described embodiment, estimation modules according to a first embodiment example (WN-6), a second embodiment example (WN-18), a third embodiment example (WN-18f), and a fourth embodiment example (WN-18b) were created.

In the first embodiment example, the number of feature weaving layers was 6. In the second and fourth embodiment examples, the number of feature weaving layers was 18. In each feature weaving layer of the first to fourth embodiment examples, a single encoder commonly used between elements of the first axis of each concatenated tensor was adopted. For the encoder configurations of the first to fourth embodiment examples, the configuration of FIG. 6B was adopted. For the estimator configurations in the first to fourth embodiment examples, the configuration (including preprocessing) of the above-described first specific example was adopted (Eqs. 1 to 4). In the first and fourth embodiment examples, an argmax operation was adopted as the arithmetic operation of obtaining the final estimation result at the matching estimation stage (estimation device). In the feature weaving network of the first embodiment example, the residual structure was omitted (i.e., a shortcut path was not provided). On the other hand, in the feature weaving network of the second to fourth embodiment examples, a shortcut path was provided to be connected to the input of each even number of feature weaving layers.

In the first embodiment example and the second embodiment example, as a loss function in machine learning, a loss function $\lambda_s$ for suppressing a blocking pair and a loss function $\lambda_c$ for causing the estimation result to converge on a symmetric double probability matrix were adopted and a loss function for causing the estimation results to converge to satisfy other criteria was not adopted. On the other hand, in the third embodiment example, in addition to the loss functions ($\lambda_s$ and $\lambda_c$), a loss function $\lambda_f$ for promoting fairness was further adopted. In the fourth embodiment example, in addition to the loss functions ($\lambda_s$ and $\lambda_c$), a loss function $\lambda_b$ for promoting a balance of fairness and satisfaction was adopted. Specifically, in the first to fourth embodiment examples, in the loss function $\lambda$ of Eq. 15, 0.7 was assigned to $w_s$ and 1 was assigned to $w_c$. In the first and second embodiment examples, 0 was assigned to the weights of the other loss functions. In the third embodiment example, 0.01 was assigned to $w_f$ and 0 was assigned to the weights ($w_c$ and $w_b$) of other loss functions. In the fourth embodiment example, 0.01 was assigned to $w_b$ and 0 was assigned to the weights ($w_f$ and $w_e$) of other loss functions.

COMPARATIVE EXAMPLES

In a first comparative example (MLP-O), the model proposed in Non-Patent Literature 2 was adopted as the estimation module. Specifically, a feature extractor that extracted features from a graph was configured in three intermediate layers and an estimator that estimates matching results from the features obtained by the feature extractor was configured in one output layer. The method proposed in Non-Patent Literature 2 was also adopted as the method of machine learning of the estimation module. In a second comparative example (MLP), a model configuration identical to that of the first comparative example was adopted for the estimation module. On the other hand, in the second comparative example, $\lambda_c$ of the following Eqs 8 and 9 was adopted instead of a term corresponding to the following Eq. 17 among terms of the loss function proposed in Non-Patent Literature 2.

[Math. 17]

$$\lambda_c(q^{eA}, q^{eB}) = \sum_{(i,j) \in A \times B} |q_{ij}^{eA} - q_{ji}^{eB}| \qquad \text{(Eq. 17)}$$

In a third comparative example (GIN), a model proposed in Reference Literature 3, "Keyulu Xu, Weihua Hu, Jure Leskovec, and Stefanie Jegelka, 'How powerful are graph neural networks?' In Proceedings of International Conference on Learning Representations, 2019" was adopted for the estimation module. Specifically, in the third comparative example, the estimation module according to the third comparative example was configured to include a feature extractor, a feature connector, and an estimator. The feature extractor was configured to output a feature quantity for each vertex according to the two-layer model proposed in Reference Literature 3. The feature connector was configured to connect all vertex features output from the feature extractor with one flat vector. Furthermore, the estimator was configured to obtain a matching estimation result with (N×M) (M=N in this example) flat vectors through one output layer as in the first comparative example. By deeming the flat vector obtained from this estimator as an (N×M) size matrix, the third comparative example was configured so that an output having the same structure as an estimation result of matching in each embodiment example could be obtained. The method proposed in Reference Literature 3 was adopted as the method of machine learning of the estimation module. A loss function identical to that of the first embodiment example was adopted as the loss function.

In a fourth comparative example (DBM-6), a model proposed in Reference Literature 4, "Daniel Gibbons, Cheng-Chew Lim, and Peng Shi, 'Deep learning for bipartite assignment problems,' In Proceedings of IEEE International Conference on Systems, Man and Cybernetics, pages 2318 to 2325, 2019" was adopted for the estimation module. In the fourth comparative example, the number of layers constituting the feature extractor in the estimation module was 6. The method proposed in Reference Literature 4 was adopted as the method of machine learning of the estimation module. A loss function identical to that of the first embodiment example was adopted as the loss function. In a fifth comparative example (SSWN-6), a model similar to that of the fourth comparative example was adopted for the estimation module. However, in the fifth comparative example, the encoder provided in each layer constituting the feature extractor was changed to the configuration of FIG. 6B. A configuration and a method similar to those of the fourth comparative example were adopted for the other configuration and a machine learning method of the fifth comparative example.

<Machine Learning and Evaluation Method>

Four types of different sizes of 3×3, 5×5, 7×7, and 9×9 were adopted for sizes of verification samples. Because the models of the first and second comparative examples could not receive inputs of different sizes, training samples of the sizes were used for training processes of the first and second comparative examples. On the other hand, 10×10 training samples were used for training of the first to fourth embodiment examples and the third to fifth comparative examples. The number of training iterations was set to 200,000 and a batch size was 8. On the basis of each of the above-described distributions, a training sample was randomly generated at each iteration, and the generated training sample was used for training. Adam was used as an optimization algorithm (Reference Literature 5, "Diederik P. Kingma and Jimmy Ba, 'Adam: A method for stochastic optimization,' In Proceedings of International Conference on Learning Representations, 2015"). The learning rate was 0.0001. Under these conditions, trained estimation modules (solvers) were generated for the first to fourth embodiment examples and the first to fifth comparative examples.

Subsequently, each trained estimation module that had been generated was used to obtain a matching estimation result for a verification sample of each size. The success of the matching was defined as obtaining a matching without blocking pairs and a probability of obtaining a matching without blocking pairs was calculated as the success rate of the matching on the basis of the obtained estimation result. In addition, the degree (cost) of fairness (Sex equality, SEq(m;I)) and the balance of the fairness and satisfaction (Balance, Bal(m;I)) of each matching result were calculated according to the following Eqs. 18 to 21. Also, the probability of obtaining the best matching result for each index was calculated as the success rate of matching satisfying each index. Furthermore, for the second embodiment example and the third embodiment example, the average value of the fairness costs of the matching results for all obtained verification samples was calculated. For the second embodiment example and the fourth embodiment example, the average value of the balance costs of the matching results for all obtained verification samples was calculated.

[Math. 18]

$$SEq(m; I) = |P(m; A) - P(m : B)| \qquad (Eq. 18)$$

[Math. 19]

$$Bal(m; I) = \max (P(m; A), P(m; B)) \qquad (Eq. 19)$$

[Math. 20]

$$P(m; A) = \sum_{\{a_i, b_j\} \in m} v_{ij}^A \qquad (Eq. 20)$$

[Math. 21]

$$P(m; B) = \sum_{\{a_i, b_j\} \in m} v_{ji}^B \qquad (Eq. 21)$$

m denotes matching that is made valid on the basis of the estimation result.

Results

Figure 24A:
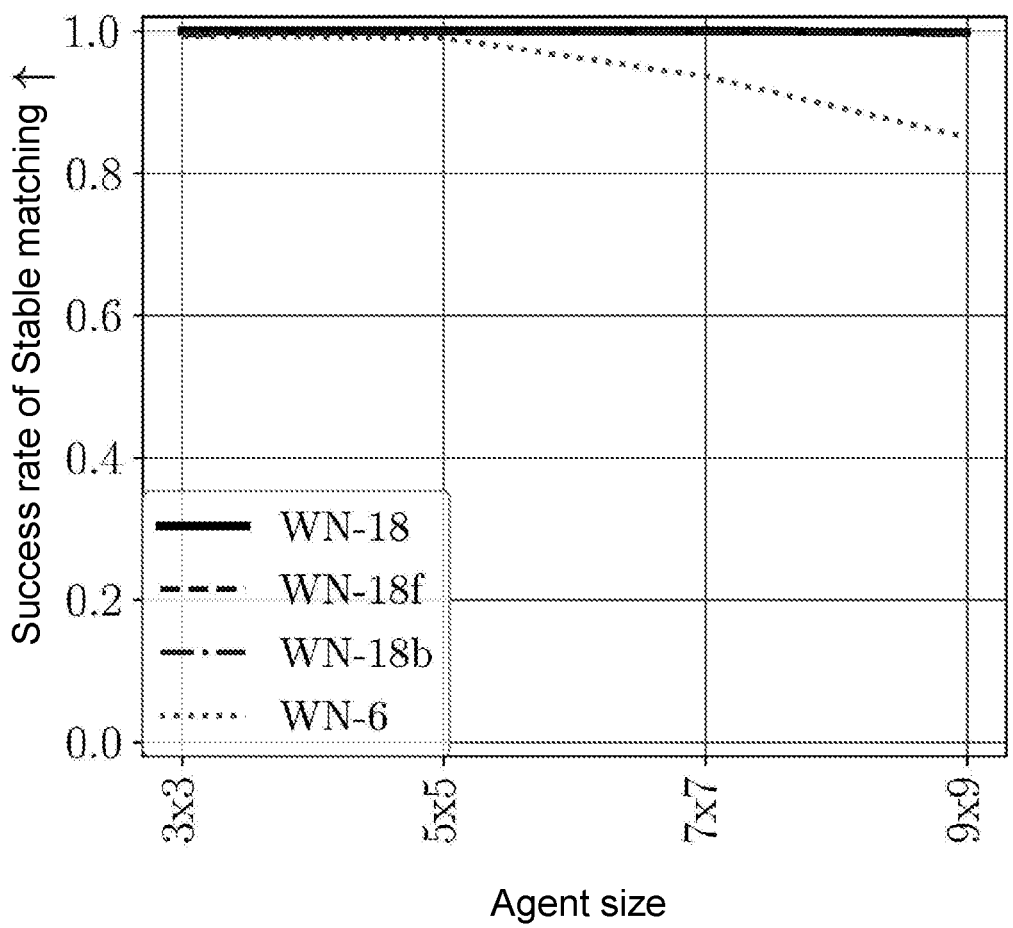
FIG. 24A shows a result of calculating a success rate of matching for each size verification sample according to an embodiment example.
Figure 24B:
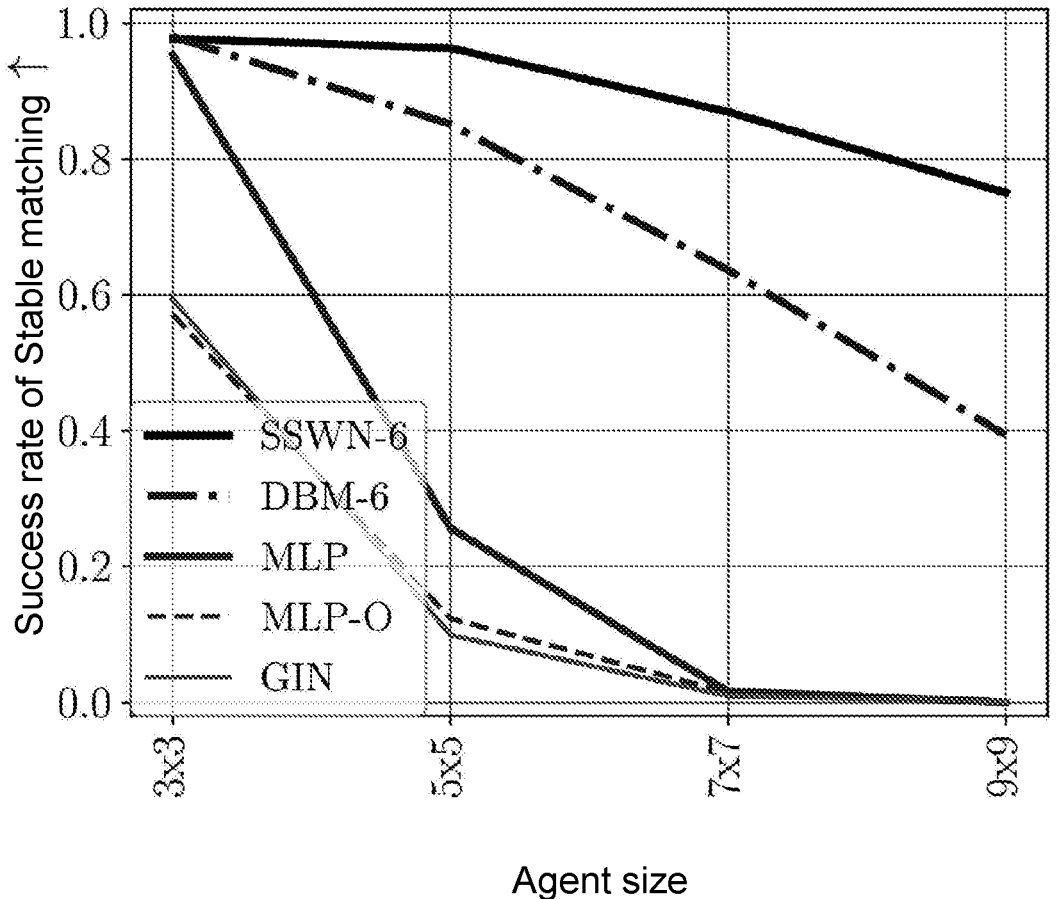
FIG. 24B shows a result of calculating a success rate of matching for each size verification sample according to a comparative example.
Figure 25A:
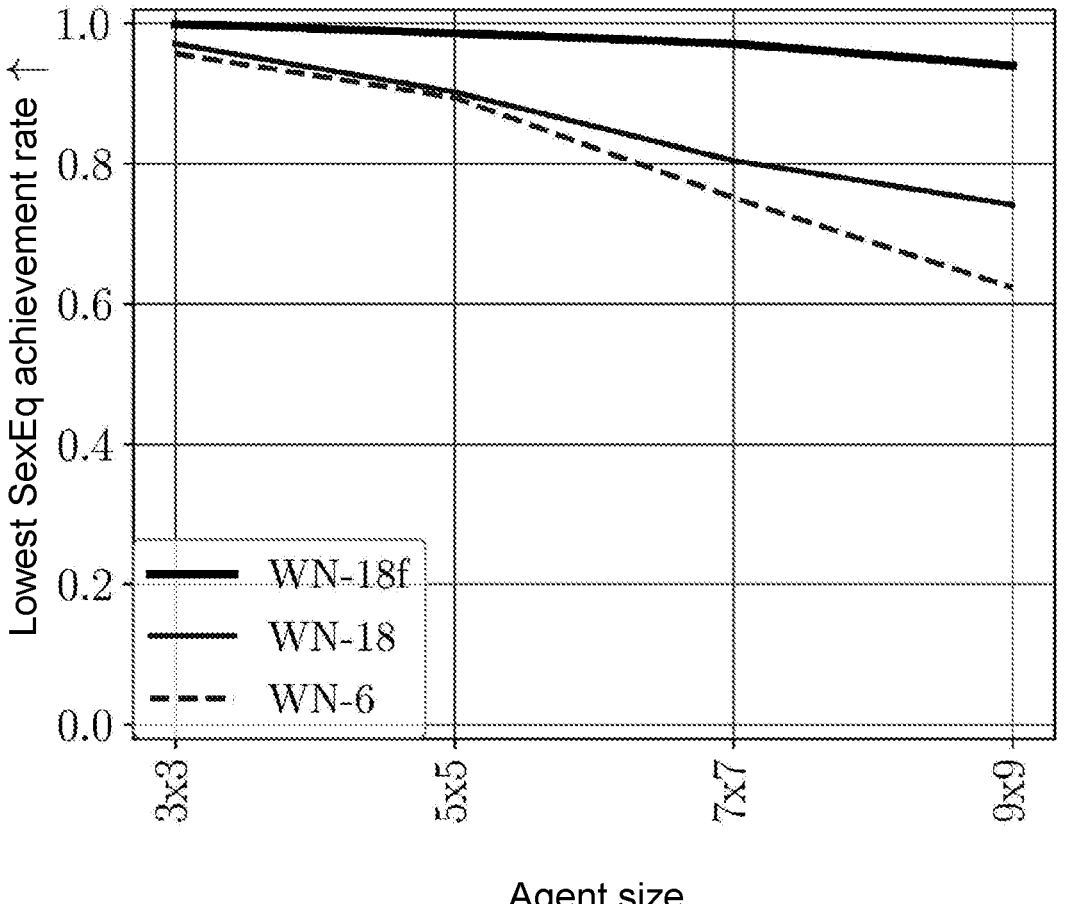
FIG. 25A shows a result of calculating a success rate of fairness matching for each size verification sample according to an embodiment example.
Figure 25B:
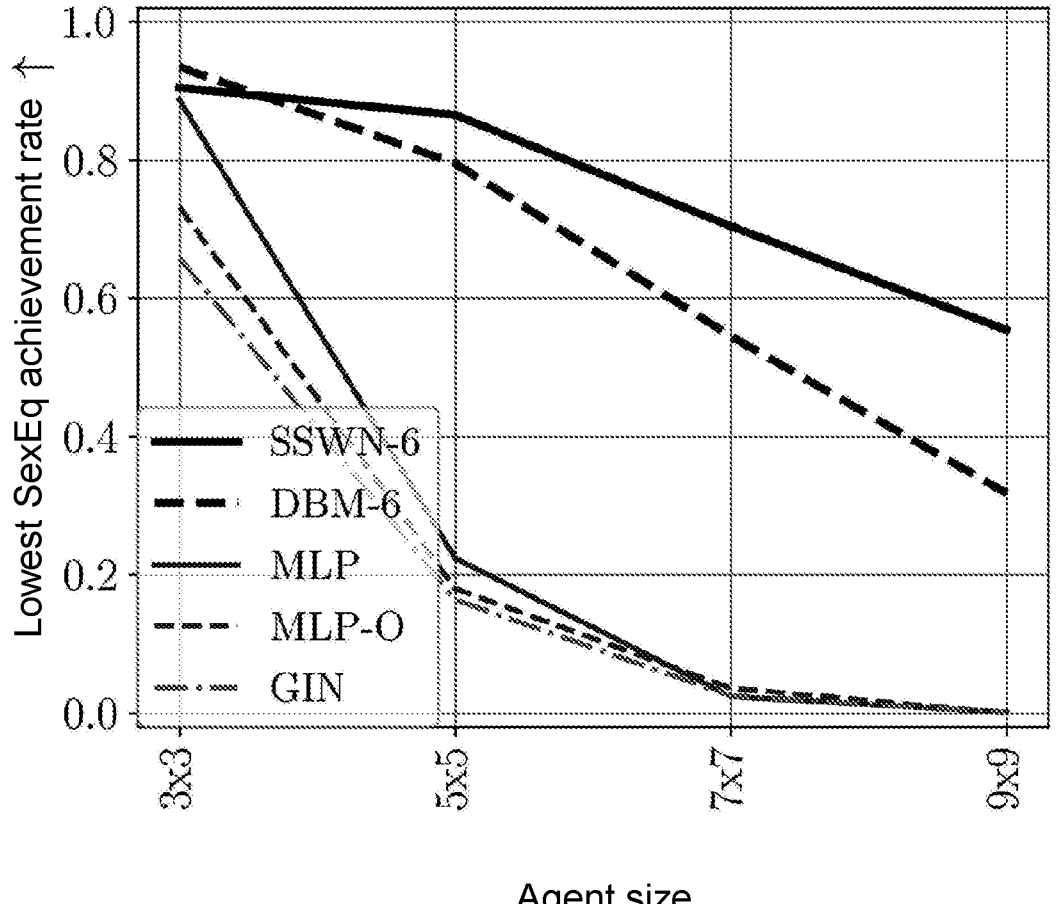
FIG. 25B shows a result of calculating a success rate of fairness matching for each size verification sample according to a comparative example.
Figure 25C:
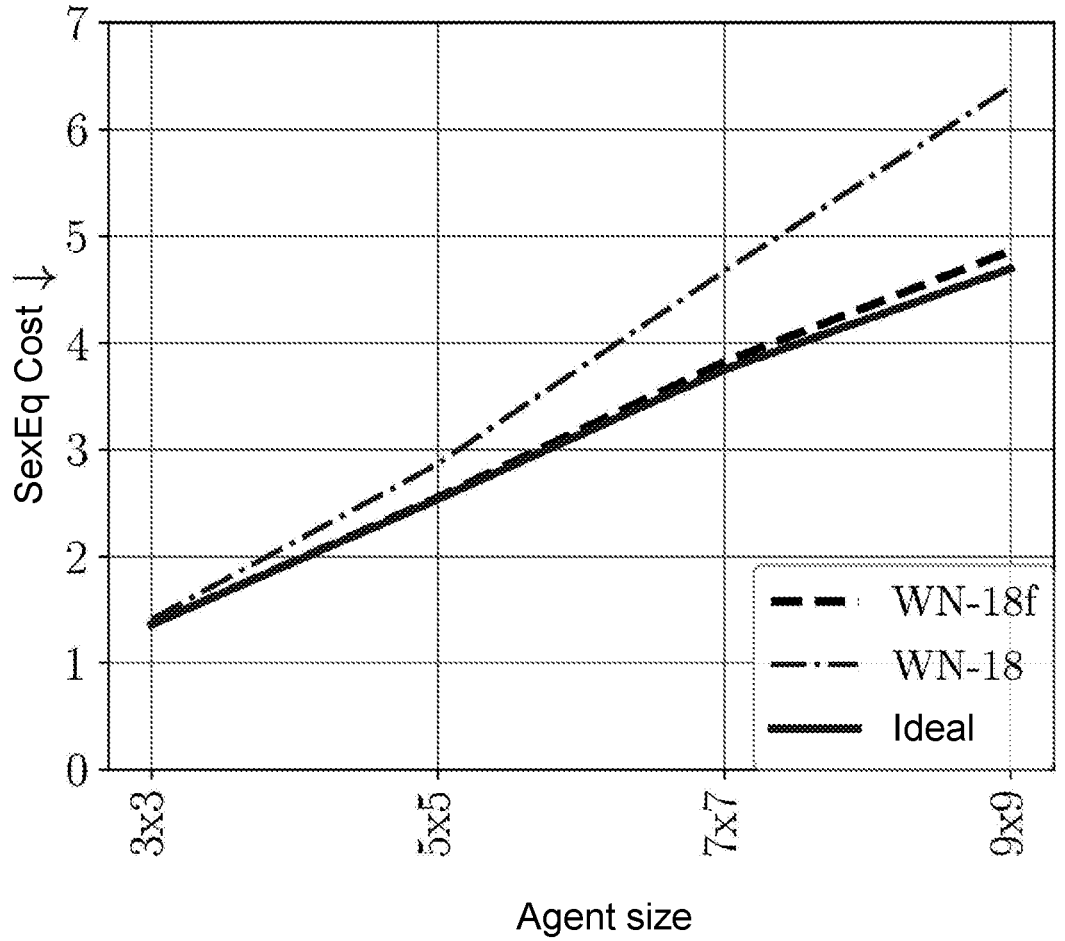
FIG. 25C shows a result of calculating an average fairness cost of all matching results according to a second embodiment example and a third embodiment example.
Figure 26A:
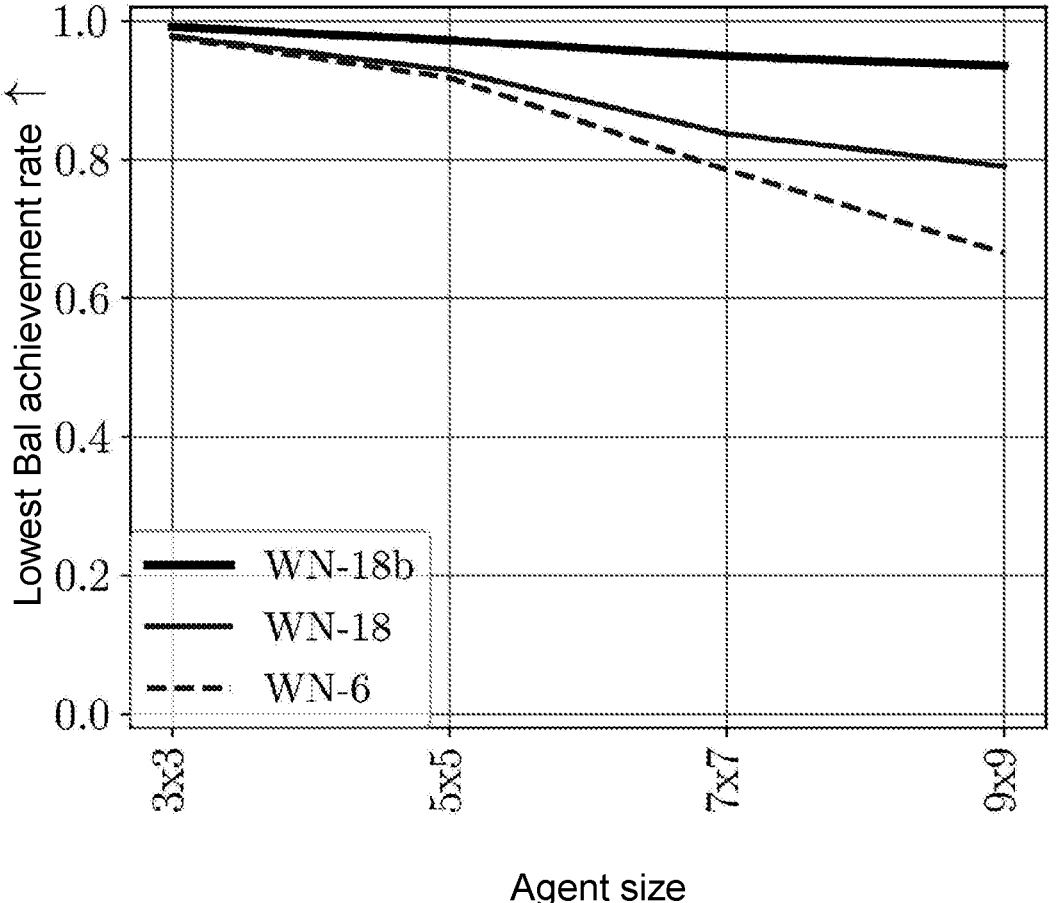
FIG. 26A shows a result of calculating a success rate of balance matching for each size verification sample according to an embodiment example.
Figure 26B:
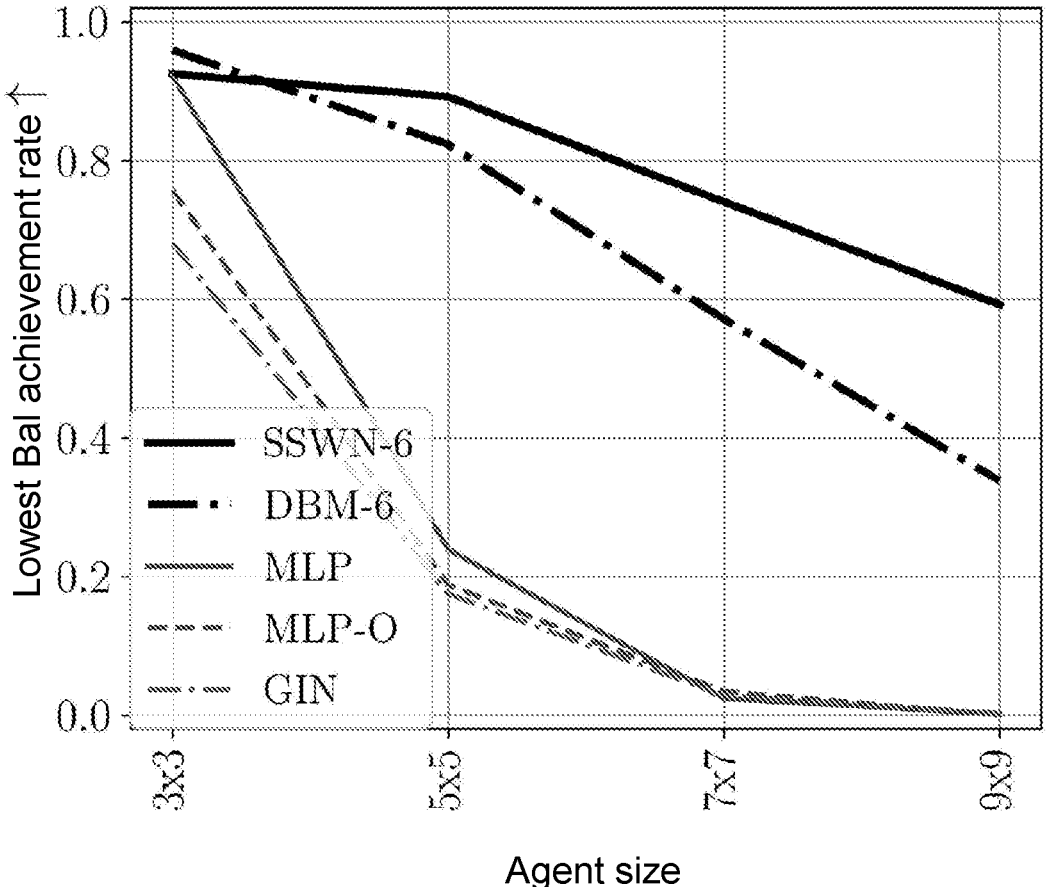
FIG. 26B shows a result of calculating a success rate of balance matching for each size verification sample according to a comparative example.
Figure 26C:
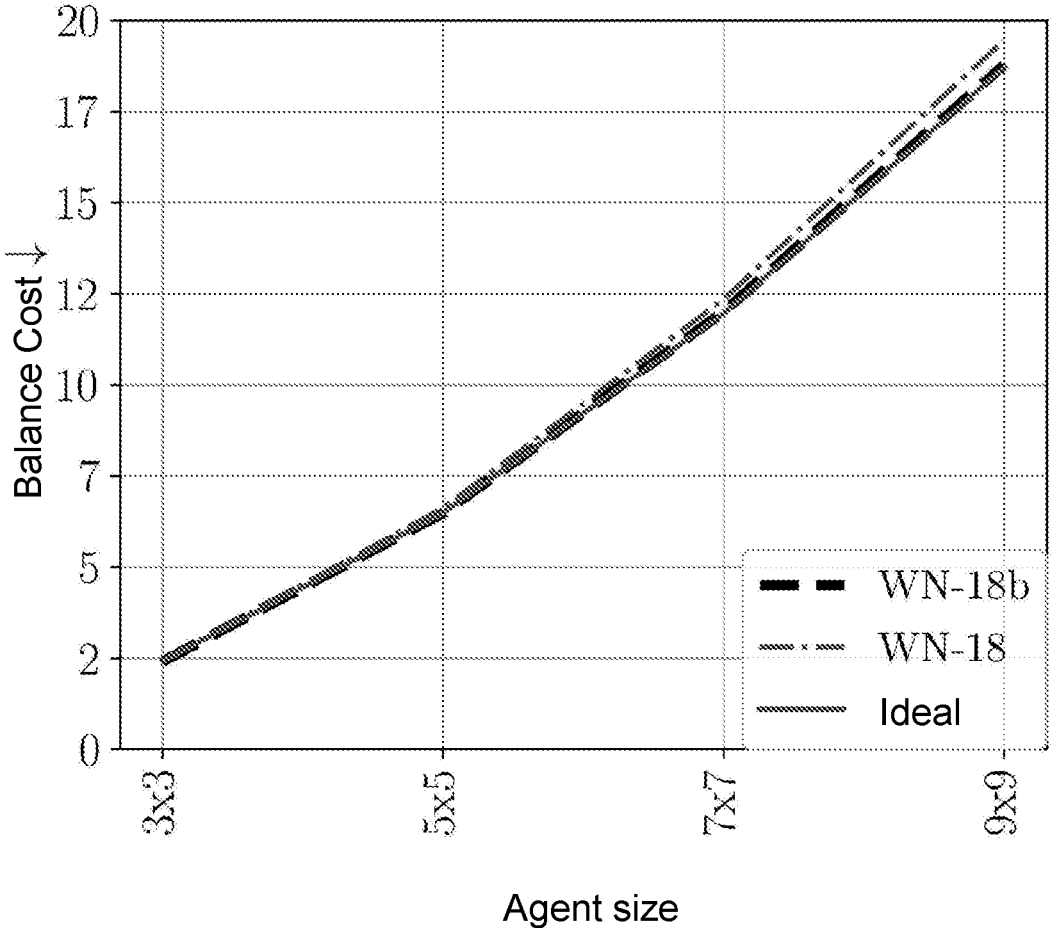
FIG. 26C shows a result of calculating an average balance cost of all matching results according to the second embodiment example and a fourth embodiment example.

FIGS. 24A and 24B show results of calculating success rates of matching for size verification samples with respect to the first to fourth embodiment examples (FIG. 24A) and the first to fifth comparative examples (FIG. 24B). FIGS. 25A and 25B show results of calculating success rates of fairness matching for size verification samples for the first to fourth embodiment examples (FIG. 25A) and the first to fifth comparative examples (FIG. 25B). FIG. 25C shows a result of calculating an average value of the fairness costs of the matching results for all verification samples with respect to the second and third embodiment examples. FIGS. 26A and 26B show results of calculating success rates of balance matching for size verification samples for the first to fourth embodiment examples (FIG. 26A) and the first to fifth comparative examples (FIG. 26B). FIG. 26C shows a result of calculating the average value of the balance costs of the matching results for all verification samples for the second embodiment example and the fourth embodiment example. FIGS. 25C and 26C further show ideal values (Ideal) of the average value of each index.

As shown in FIGS. 24A and 24B, it was possible to estimate a stable matching with higher accuracy in each embodiment example than in any of the comparative examples. In the first to third comparative examples, when the number of agents was 5 or more, it was difficult to estimate stable matching. Conventionally, as a method for accomplishing tasks for graphs, network models in the first to third comparative examples were considered to be suitable. However, from the results shown in FIGS. 24A and 24B, it was found that these network models were not suitable for accomplishing a task of two-sided matching represented in a directed bipartite graph. On the other hand, stable matching results according to the embodiment examples could be obtained with higher accuracy than those according to the comparative examples. In particular, while the number of parameters in the first embodiment example was about 25,000, the number of parameters in the first comparative example and the second comparative example was about 28,000, the number of parameters in the third and fourth comparative examples was about 29,000, and the number of parameters in the fifth comparative example was about 25,000. From this result, it has been found that according to the present invention, the success rate of stable matching can be increased even if the number of parameters is the same.

Also, as shown in FIGS. 25A, 25B, 26A, and 26B, each embodiment example had a higher success rate of stable matching than any of the comparative examples in each index of fairness and balance. From this result, it has been found that according to the present invention, the success rate of stable matching satisfying a prescribed criterion can also be increased. Furthermore, as shown in FIGS. 25C and 26C, it was found that the average value of the costs of indices is made close to the ideal value by adding the fairness and balance indices to the loss function. From this result, it was found that in the present invention, the ability to be acquired by the estimation module can be changed by changing the loss function. That is, it was found that the present invention can be applied not only to stable marriage problems but also to various other tasks for graphs by appropriately changing the loss function. For example, it was suggested that even if the graph type is changed, a trained estimation module with the ability to accomplish the corresponding task can be generated by setting a loss function according to the task.

Experiment II: Comparison Between Embodiment Examples and Existing Algorithms In Experiment II, the effectiveness of the present invention was verified by comparing matching results between the solver according to each of the following embodiment examples and the solvers of the existing algorithms according to the following comparative examples.

EMBODIMENT EXAMPLES

By changing the number of feature weaving layers in the third embodiment example to 60, an estimation module according to a fifth embodiment example (WN-60f) was created. For the other configuration of the fifth embodiment example, a configuration similar to that of the third embodiment example was adopted. Also, by changing the number of feature weaving layers in the fourth embodiment example to 60, an estimation module according to the sixth embodiment example (WN-60b) was created. For the other configuration of the sixth embodiment example, a configuration similar to that of the fourth embodiment example was adopted. For the training of the fifth and sixth embodiment examples, 30×30 training samples were used. For other conditions of machine learning, conditions similar to those of the above Experiment I were adopted.

COMPARATIVE EXAMPLES

In a sixth comparative example (GS), a GS algorithm proposed in Non-Patent Literature 1 was adopted as the solver. In a seventh comparative example (PolyMin), an algorithm disclosed in Reference Literature 6, "Dan Gusfield and Robert W Irving, 'The stable marriage problem: structure and algorithms,' MIT press, 1989" was adopted for the solver. Specifically, in the seventh comparative example, instead of the costs of fairness (SEq(m;I)) and balance (Bal(m;I)), an algorithm for minimizing the costs (Reg(m;I) and Egal(m;I)) of the following Eqs. 22 and 23 was adopted in the solver.

[Math. 22]

$$Reg(m; I) = \max_{\{a_i, b_j\} \in m} \left( \max\left( v_{ij}^A, v_{ji}^B \right) \right) \qquad \text{(Eq. 22)}$$

[Math. 23]

$$Egal(m; I) = P(m; A) + P(m; B) \qquad \text{(Eq. 23)}$$

In an eighth comparative example (DACC), an algorithm proposed in Reference Literature 7, "Piotr Dworczak, 'Deferred acceptance with compensation chains,' In Proceedings of the 2016 ACM Conference on Economics and Computation, pages 65 to 66, 2016" was adopted for the solver. In a ninth comparative example (PowerBalance), the algorithm proposed in the above Reference Literature 1 was adopted for the solver. Also, a calculation amount of the algorithm in the eighth comparative example was $O(n^4)$ and a calculation amount of the algorithm in the ninth comparative example was $O(n^2)$.

<Evaluation Method>

Two different types of sizes of 20×20 and 30×30 were adopted for sizes of verification samples. Using the trained estimation module of each embodiment example and the solver of each comparative example, a matching result for each size of the verification sample was obtained. In a method similar to that of Experiment I, an average value of the fairness costs of the matching results for all obtained verification samples was calculated for the fifth embodiment example and each comparative example. Likewise, for the sixth embodiment example and each comparative example, an average value of the balance costs of the matching results for all obtained verification samples was calculated. Also, for each embodiment example, a machine learning model was adopted in the estimation module, and the success rate of matching was calculated in a method similar to that of Experiment I because it was not necessarily possible to derive a correct answer reliably. Furthermore, in each embodiment example, an average value of the costs of indices was considered to be worsened by including the estimation result of the failed matching. Thus, the cost of each index of the matching result for each verification sample was compared between the comparative example with the best average value of each cost (the sixth comparative example for UD and the ninth comparative example for others) and each embodiment example and probabilities of a case (win) where each embodiment example was better than the comparative example, a case (tie) of the same level, and a case (loss+unstable) where each embodiment example was worse were calculated.

Results

TABLE 1

| Datasets (Distribution Type) | Agents (N × M) | | | | | | | | | |
|---|---|---|---|---|---|---|---|---|---|---|
| | 20 × 20 | | | | | 30 × 30 | | | | |
| | UU | DD | GG | UD | Lib | UU | DD | GG | UD | Lib |
| GS | 41.89 | 18.81 | 19.52 | 70.97 | 19.66 | 94.03 | 43.46 | 36.56 | 163.77 | 39.78 |
| PolyMin | 19.93 | 11.83 | 20.57 | 87.08 | 18.47 | 35.52 | 21.21 | 37.37 | 209.62 | 31.85 |
| DACC | 24.34 | 20.13 | 23.07 | 101.75 | 20.40 | 40.87 | 34.35 | 40.59 | 240.48 | 33.88 |
| Power Balance | 16.28 | 8.93 | 17.07 | 71.09 | 15.40 | 18.45 | 11.05 | 27.22 | 163.90 | 21.57 |
| WN-60f (Ours) | 11.44 | 6.32 | 15.34 | 71.18 | 14.44 | 16.07 | 9.64 | 26.46 | 162.61 | 21.29 |
| Stable Match (%) | 99.10 | 99.40 | 99.40 | 99.50 | 99.80 | 98.10 | 99.00 | 98.00 | 93.90 | 98.60 |
| Win (%) | 25.90 | 29.70 | 12.20 | 0.00 | 9.50 | 14.60 | 25.30 | 9.30 | 0.10 | 8.00 |
| Tie (%) | 67.30 | 60.60 | 83.20 | 96.70 | 86.20 | 72.30 | 54.70 | 78.10 | 89.20 | 80.80 |
| Loss + Unstable (%) | 6.80 | 9.70 | 4.60 | 3.30 | 4.30 | 13.10 | 20.00 | 12.60 | 10.70 | 11.20 |

TABLE 2

| Datasets (Distribution Type) | Agents (N × M) | | | | | | | | | |
|---|---|---|---|---|---|---|---|---|---|---|
| | 20 × 20 | | | | | 30 × 30 | | | | |
| | UU | DD | GG | UD | Lib | UU | DD | GG | UD | Lib |
| GS | 89.14 | 146.16 | 108.36 | 140.53 | 68.62 | 184.05 | 322.05 | 225.49 | 312.12 | 137.59 |
| PolyMin | 74.19 | 140.99 | 108.04 | 145.28 | 66.94 | 144.48 | 306.28 | 224.13 | 324.54 | 130.79 |
| DACC | 78.49 | 146.71 | 110.06 | 151.34 | 68.75 | 150.71 | 316.38 | 227.52 | 337.43 | 333.59 |
| Power Balance | 73.28 | 140.12 | 106.92 | 140.55 | 65.89 | 138.04 | 302.30 | 220.26 | 312.12 | 126.96 |
| WN-60b (Ours) | 71.29 | 138.57 | 106.50 | 140.72 | 65.63 | 137.70 | 301.08 | 221.12 | 313.11 | 127.12 |
| Stable Match (%) | 98.00 | 99.10 | 98.60 | 99.80 | 99.10 | 97.00 | 98.60 | 93.70 | 98.80 | 98.00 |
| Win (%) | 20.60 | 29.80 | 9.40 | 0.00 | 6.60 | 10.40 | 25.70 | 6.20 | 0.10 | 5.60 |
| Tie (%) | 69.50 | 63.70 | 81.90 | 95.00 | 86.60 | 71.60 | 63.20 | 69.50 | 83.90 | 81.50 |
| Loss + Unstable (%) | 9.90 | 6.50 | 8.70 | 5.00 | 6.80 | 18.00 | 11.10 | 24.30 | 16.00 | 12.90 |

Table 1 shows results of calculating the above-described evaluation indices for the fifth embodiment example and each comparative example. Table 2 shows results of calculating the above evaluation indices for the sixth embodiment example and each comparative example. As shown in Tables 1 and 2, for the UD verification sample, a best result was obtained for the cost of each index in the sixth comparative example. For the other verification samples, in the ninth comparative example, the best result was obtained for the cost of each index. However, in each embodiment example, a result equivalent to that of each comparative example was obtained. According to comparison results of costs of indices in individual matching with the best comparative example, in each embodiment example, the good (win) or same (tie) matching in the cost of each index was obtained at a probability of 75.7 to 95%. Furthermore, according to each embodiment, a stable matching could be estimated with high accuracy for 20×20 and 30×30 verification samples. From these results, it was found that according to the present invention, it is possible to generate a trained estimation module comparable to existing optimal algorithms and having the ability to estimate a stable matching with high accuracy.

Experiment III: Verification of Effectiveness for Large-Sized Graphs

In Experiment III, the sizes of the training sample and the verification sample were changed to 100×100, the distribution of each sample was changed to only "UU," matching results between the solver according to each of the following embodiment examples and the solver of the existing algorithm according to the comparative examples (the above-described sixth to ninth comparative examples) were compared to verify the effectiveness of the present invention using a procedure similar to that of Experiment II.

EMBODIMENT EXAMPLES

By changing the number of feature weaving layers in the third embodiment example to 80 and changing an arithmetic operation when an inference result was obtained from an argmax operation to a Hungarian algorithm, an estimation module according to a seventh embodiment example (WN-80f+Hungarian) was created. A configuration similar to that of the third embodiment example was adopted for the other configuration of the seventh embodiment example. Also, by changing the number of feature weaving layers in the fourth embodiment example to 80 and changing an arithmetic operation when an inference result was obtained from an argmax operation to the Hungarian algorithm, an estimation module according to an eighth embodiment example (WN-80b+Hungarian) was created. A configuration similar to that of the fourth embodiment example was adopted for the other configuration of the eighth embodiment example. For the training of the seventh and eighth embodiment examples, 100×100 training samples were used. The number of training iterations was 300,000. Conditions similar to those of the above-described Experiment I were adopted for the other conditions of machine learning.

<Evaluation Method>

As in the above-described Experiment II, the trained estimation module of each embodiment example and the solver of each comparative example were used to obtain matching results for verification samples of sizes. Also, for the seventh embodiment example and each comparative example, an average value of the fairness costs of the matching results for all obtained verification samples was calculated. For the eighth embodiment example and each comparative example, an average value of the balance costs of matching results for all obtained verification samples was calculated. Furthermore, for each embodiment example, the success rate of matching was calculated.

Results

TABLE 3

| 100 × 100, UU | SEq | Bal |
|---|---|---|
| GS | 1259.39 | 1709.53 |
| PolyMin | 153.35 | 952.83 |
| DACC | 194.65 | 988.02 |
| Power Balance | 49.41 | 909.73 |
| WN-80f/b + Hungarian | 68.36 | 919.75 |
| Stable Match (%) | 89.4 | 80.8 |

Table 3 shows results of calculating the above-described evaluation indices for the embodiment examples and the comparative examples. From the results shown in Table 3, the success rate of stable matching deteriorated for the size of 100×100, but stable matching could be estimated with relatively high accuracy in each embodiment example. Also, as in Experiment II, in relation to the cost of each index, in each example, a result equivalent to the comparative example with the best results could be obtained. Therefore, according to the present invention, in relation to a problem of a large size (100×100), it was found that it is possible to generate a trained estimation module comparable to existing optimal algorithms and having the ability to estimate a stable matching with relatively high accuracy.

Experiment IV: Verification of Effectiveness of Each Variation

In Experiment IV, the effectiveness of a form in which the encoder 505 is provided separately for each concatenated tensor, a form in which the normalizer is provided, and a form in which a condition code is assigned was verified by comparing the success rates of matching between each of the following embodiment examples and the comparative example using a sample having a size similar to that of Experiment II.

EMBODIMENT EXAMPLES

In a stage subsequent to the encoder of each feature weaving layer in the fifth embodiment example, a normalizer configured to normalize the arithmetic operation result of the encoder was provided to be shared by concatenated tensors, such that the estimation module according to a ninth embodiment example (WN-60f-sym) was created. In the stage subsequent to the encoder of each feature weaving layer in the fifth embodiment example, the normalizer configured to normalize the arithmetic operation result of the encoder was provided for each concatenated tensor and an arithmetic operation for assigning a condition code to each input tensor was added, such that the estimation module according to a tenth embodiment example (WN-60f-asym) was created. By changing the encoder of each feature weaving layer in the fifth embodiment example from a single encoder to an encoder used separately for each concatenated tensor, an estimation module according to an eleventh embodiment example (WN-60f-dual) was created. An estimation module for a twelfth embodiment example (WN-60f(20)) having the same configuration as the estimation module according to the fifth embodiment example was created. An estimation module according to a thirteenth embodiment example (WN-60f+Hung) was created by changing the arithmetic operation result of obtaining the estimation result in the fifth embodiment example from an argmax operation to a Hungarian algorithm. A configuration similar to that of the fifth embodiment example was adopted for the other configurations of the ninth to eleventh embodiment examples and the twelfth embodiment example.

Likewise, in a stage subsequent to the encoder of each feature weaving layer in the sixth embodiment example, a normalizer configured to normalize the arithmetic operation result of the encoder was provided to be shared by concatenated tensors, such that the estimation module according to a fourteenth embodiment example (WN-60b-sym) was created. In the stage subsequent to the encoder of each feature weaving layer in the sixth embodiment example, the normalizer configured to normalize the arithmetic operation result of the encoder was provided for each concatenated tensor and an arithmetic operation for assigning a condition code to each input tensor was added, such that the estimation module according to a fifteenth embodiment example (WN-60b-asym) was created. By changing the encoder of each feature weaving layer in the sixth embodiment example from a single encoder to an encoder used separately for each concatenated tensor, an estimation module according to a sixteenth embodiment example (WN-60b-dual) was created. An estimation module for a seventeenth embodiment example (WN-60b(20)) having the same configuration as the estimation module according to the sixth embodiment example was created. An estimation module according to the eighteenth embodiment example (WN-60b+Hung) was created by changing the arithmetic operation result of obtaining the estimation result in the sixth embodiment example from an argmax operation to a Hungarian algorithm. A configuration similar to that of the sixth embodiment example was adopted for the other configurations of the fourteenth to sixteenth embodiment examples and the eighteenth embodiment example.

COMPARATIVE EXAMPLES

By changing the number of layers constituting the feature extractor in the fifth comparative example to 60 and adding the fairness index ($\lambda_f$ or a weight of 0.01) shown in Eq. 10 to the loss function, an estimation module related to a tenth comparative example (SSWN-60f was created. Also, by changing the number of layers constituting the feature extractor in the fifth comparative example to 60 and adding the fairness index (kb or a weight of 0.01) shown in Eq. 12 to the loss function, an estimation module related to an eleventh comparative example (SSWN-60b) was created. A configuration similar to that of the fifth comparative example was adopted for the other configurations of the tenth and eleventh comparative examples.

<Machine Learning and Evaluation Methods>

For the training of the twelfth and seventeenth embodiment examples, 20×20 training samples were used. For training of the other embodiment examples and comparative examples, 30×30 training samples were used. Conditions similar to those of the above-described Experiment I were adopted for other conditions of machine learning.

Two different types of sizes of 20×20 and 30×30 were adopted for sizes of verification samples. Using a trained estimation module for each embodiment example and each comparative example, matching results were obtained for sizes of verification sample. Also, in a method similar to that of Experiment I, the success rate of matching was calculated for each embodiment example and each comparative example. For the ninth to thirteenth embodiment examples and the tenth comparative example, an average value of fairness costs of matching results for all obtained verification samples was calculated. For the fourteenth to eighteenth embodiment examples and the eleventh comparative example, an average value of balance costs of matching results for all obtained verification samples was calculated. For UU, DD, and GG whose distributions were not biased, verifications of the tenth embodiment example, the eleventh embodiment example, the fifteenth embodiment example, and the sixteenth embodiment example were omitted.

Results

TABLE 4

| Datasets (Distribution Type) | Agents (N × M) | | | | | | | | | |
|---|---|---|---|---|---|---|---|---|---|---|
| | 20 × 20 | | | | | 30 × 30 | | | | |
| | UU | DD | GG | UD | Lib | UU | DD | GG | UD | Lib |
| WN-60f-sym | 11.44 | 6.32 | 15.34 | 81.21 | 14.39 | 16.07 | 9.64 | 26.46 | 194.24 | 21.16 |
| Stably Matched (%) | 99.10 | 99.40 | 99.40 | 96.00 | 99.50 | 98.10 | 99.00 | 98.00 | 81.50 | 98.80 |
| WN-60f-asym | — | — | — | 71.18 | 14.44 | — | — | — | 162.61 | 21.29 |
| Stably Matched (%) | — | — | — | 99.50 | 99.80 | — | — | — | 93.90 | 98.60 |
| WN-60f-dual | — | — | — | 71.25 | 14.58 | — | — | — | 163.71 | 22.12 |
| Stably Matched (%) | — | — | — | 98.50 | 99.60 | — | — | — | 94.80 | 97.50 |
| WN-60f(20) | 11.49 | 6.20 | 15.30 | 71.10 | 14.40 | 16.66 | 9.55 | 26.57 | 162.91 | 21.82 |
| Stably Matched (%) | 98.90 | 99.50 | 99.40 | 99.60 | 99.30 | 94.60 | 97.30 | 95.70 | 91.30 | 97.70 |

TABLE 4-continued

| | Agents (N × M) | | | | | | | | | |
| | 20 × 20 | | | | | 30 × 30 | | | | |
| Datasets (Distribution Type) | UU | DD | GG | UD | Lib | UU | DD | GG | UD | Lib |
|---|---|---|---|---|---|---|---|---|---|---|
| SSWN-60f | 12.82 | 7.41 | 16.62 | 70.94 | 15.20 | 19.13 | 12.76 | 28.33 | 160.83 | 22.45 |
| Stably Matched (%) | 95.80 | 99.20 | 96.50 | 92.40 | 97.90 | 90.00 | 97.50 | 89.00 | 69.20 | 92.30 |
| WN-60f + Hung | 11.51 | 6.35 | 15.37 | 71.18 | 14.45 | 16.14 | 9.69 | 26.58 | 162.73 | 21.32 |
| Stably Matched (%) | 99.80 | 99.90 | 100.00 | 99.60 | 100.00 | 99.70 | 99.90 | 99.90 | 95.20 | 99.20 |

TABLE 5

| | Agents (N × M) | | | | | | | | | |
| | 20 × 20 | | | | | 30 × 30 | | | | |
| Datasets (Distribution Type) | UU | DD | GG | UD | Lib | UU | DD | GG | UD | Lib |
|---|---|---|---|---|---|---|---|---|---|---|
| WN-60b-sym | 71.29 | 138.57 | 106.50 | 141.96 | 65.59 | 137.70 | 301.08 | 221.12 | 315.51 | 127.05 |
| Stably Matched (%) | 98.00 | 99.10 | 98.60 | 97.30 | 98.90 | 97.90 | 98.60 | 93.70 | 80.30 | 98.10 |
| WN-60b-asym | — | — | — | 140.72 | 65.63 | — | — | — | 313.11 | 127.12 |
| Stably Matched (%) | — | — | — | 99.80 | 99.10 | — | — | — | 98.80 | 98.00 |
| WN-60b-dual | — | — | — | 141.20 | 65.70 | — | — | — | 314.79 | 127.25 |
| Stably Matched (%) | — | — | — | 99.60 | 99.30 | — | — | — | 98.90 | 97.90 |
| WN-60b(20) | 71.05 | 138.53 | 106.13 | 140.81 | 65.53 | 137.06 | 301.21 | 220.23 | 313.68 | 127.62 |
| Stably Matched (%) | 98.50 | 98.80 | 99.50 | 99.70 | 98.80 | 96.10 | 96.70 | 95.00 | 88.90 | 93.80 |
| SSWN-60b | 76.54 | 139.29 | 107.58 | 141.37 | 66.99 | 150.88 | 302.90 | 223.62 | 314.91 | 129.52 |
| Stably Matched (%) | 92.60 | 98.50 | 98.40 | 99.60 | 98.60 | 79.80 | 96.70 | 93.90 | 94.0 | 92.80 |
| WN-60b + Hung | 71.45 | 138.60 | 106.55 | 140.73 | 65.68 | 137.92 | 301.14 | 221.42 | 313.13 | 127.22 |
| Stably Matched (%) | 99.90 | 99.90 | 99.60 | 99.90 | 100.00 | 99.00 | 99.90 | 96.90 | 99.30 | 99.20 |

Table 4 shows results of calculating average values of matching success rates and fairness costs for the ninth to thirteenth embodiment examples and the tenth comparative example. Table 5 shows results of calculating average values of matching success rates and balance costs for the fourteenth to eighteenth embodiment examples and the eleventh comparative example. Better results of both the success rate and the cost of each index were obtained in the embodiment examples than in the comparative examples. From these results, the effectiveness of the present invention could be demonstrated.

Also, when the input distribution was biased, it was found that there was a possibility that the success rate of matching and the cost of each index would deteriorate in a configuration using an encoder in common (for example, in the ninth and fourteenth embodiment examples). On the other hand, it was found that the success rate of matching and the cost of each index could be improved according to a form in which the encoder was provided separately for each concatenated tensor (the eleventh embodiment example and the sixteenth embodiment example) and a form in which the first method and the second method of the above <4.5> (the tenth embodiment example and the fifteenth embodiment example) were adopted.

Furthermore, when these forms were compared, a possibility of suitable results was higher in a form in which the first method and the second method of the above <4.5> were adopted than in a form in which the encoder was provided separately. From this result, it was found that even if the encoder is not provided separately (i.e., after the increase in the parameter is suppressed), the first method and the second method of the above <4.5> are effective as methods of suppressing the amplification of the bias due to an input distribution difference.

What is claimed is:

1. A model generation device including an acquisition part configured to acquire a plurality of training graphs and a learning processing part configured to perform machine learning of an estimation module using the plurality of training graphs that has been acquired, wherein the estimation module includes a feature weaving network and an estimator, wherein the feature weaving network includes a plurality of feature weaving layers and is configured to receive an input of an input graph and output feature information about the input graph, wherein the estimator is configured to estimate a solution for a task for the input graph from the feature information output from the feature weaving network, wherein each feature weaving layer receives inputs of third-order first and second input tensors, wherein the first input tensor is configured to have a first axis along which first vertices belonging to a first set of the input graph are arranged as elements, a second axis along which second vertices belonging to a second set of the input graph are arranged as elements, and a third axis along which feature quantities related to edges outgoing from the first vertices to the second vertices are arranged as elements, wherein the second input tensor is configured to have a first axis along which the second vertices are arranged as elements, a second axis along which the first vertices are arranged as elements, and a third axis along which feature quantities related to edges outgoing from the second vertices to the first vertices are arranged as elements, wherein each feature weaving layer includes an encoder, wherein each feature weaving layer is configured to generate a third-order first concatenated tensor by fixing the third axis of the second input tensor, circulating axes other than the third axis of the second input tensor one by one, and concatenating feature quantities of elements of the first input tensor and the circulated second input tensor, generate a third-order second concatenated tensor by fixing the third axis of the first input tensor, circulating axes other than the third axis of the first input tensor one by one, and concatenating feature quantities of elements of the second input tensor and the circulated first input tensor, generate a third-order first output tensor corresponding to the first input tensor by dividing the generated first concatenated tensor for each element of the first axis, inputting the divided first concatenated tensor to the encoder, and executing an arithmetic operation of the encoder, and generate a third-order second output tensor corresponding to the second input tensor by dividing the generated second concatenated tensor for each element of the first axis, inputting the divided second concatenated tensor to the encoder and executing the arithmetic operation of the encoder, wherein the encoder is configured to derive a relative feature quantity of each element from all input feature quantities of elements, wherein a first feature weaving layer among the plurality of feature weaving layers is configured to receive the first input tensor and the second input tensor from the input graph, wherein the feature information includes the first output tensor and the second output tensor output from a last feature weaving layer among the plurality of feature weaving layers, and wherein the machine learning includes training the estimation module so that an estimation result obtained by the estimator is suitable for a correct answer of the task for each training graph by inputting each training graph as the input graph to the feature weaving network.

2. The model generation device according to claim 1, wherein the feature weaving network has a residual structure.

3. The model generation device according to claim 1, wherein the encoder of each feature weaving layer includes a single encoder commonly used between the elements of the first axes of the first concatenated tensor and the second concatenated tensor.

4. The model generation device according to claim 3, wherein each feature weaving layer further includes a normalizer configured to normalize a result of the arithmetic operation of the encoder for each concatenated tensor.

5. The model generation device according to claim 3, wherein each feature weaving layer is further configured so that a condition code is assigned to the third axis of each of the first input tensor and the second input tensor before the arithmetic operation of the encoder is executed.

6. The model generation device according to claim 1, wherein each training graph is a directed bipartite graph, wherein a plurality of vertices constituting the directed bipartite graph is divided so that each of the plurality of vertices belongs to a first subset of two subsets, wherein the first set of the input graph corresponds to one of the two subsets of the directed bipartite graph, and wherein the second set of the input graph corresponds to a second subset of the two subsets of the directed bipartite graph.

7. The model generation device according to claim 6, wherein the task is a matching task between two parties and determines optimal pairing between targets belonging to the respective parties, wherein the two subsets of the directed bipartite graph correspond to the two parties in the matching task, wherein the vertices belonging to each subset of the directed bipartite graph correspond to the targets belonging to each party, wherein a feature quantity related to an edge outgoing from a first vertex to a second vertex corresponds to a desired level from a target belonging to a first party of the two parties to a target belonging to a second party of the two parties, and wherein a feature quantity related to an edge outgoing from the second vertex to the first vertex corresponds to a desired level from the target belonging to the second party of the two parties to the target belonging to the first party.

8. The model generation device according to claim 1, wherein each training graph is an undirected bipartite graph, wherein a plurality of vertices constituting the undirected bipartite graph is divided so that each of the plurality of vertices belongs to one of two subsets, wherein the first set of the input graph corresponds to a first subset of the two subsets of the undirected bipartite graph, and wherein the second set of the input graph corresponds to a second subset of the two subsets of the undirected bipartite graph.

9. The model generation device according to claim 8, wherein the task is a matching task between two parties and determines optimal pairing between targets belonging to the respective parties, wherein the two subsets of the undirected bipartite graph correspond to the two parties in the matching task, wherein the vertices belonging to each subset of the undirected bipartite graph correspond to the targets belonging to each party, and wherein both a feature quantity related to an edge outgoing from a first vertex to a second vertex and a feature quantity related to an edge outgoing from the second vertex to the first vertex correspond to costs or rewards of pairing between a target belonging to a first party of the two parties and a target belonging to a second party of the two parties.

10. The model generation device according to claim 1, wherein each training graph is a directed graph, wherein a first vertex belonging to the first set of the input graph corresponds to a start point of a directed edge constituting the directed graph, wherein a second vertex belonging to the second set corresponds to an end point of the directed edge, wherein an edge outgoing from the first vertex to the second vertex corresponds to a directed edge outgoing from the start point to the end point, and wherein an edge outgoing from the second vertex to the first vertex corresponds to a directed edge incoming from the start point to the end point.

11. The model generation device according to claim 10, wherein the directed graph is configured to represent a network, wherein the task is to estimate an event that occurs on the network, and wherein both a feature quantity related to an edge outgoing from the first vertex to the second vertex and a feature quantity related to an edge outgoing from the second vertex to the first vertex correspond to an attribute of a connection between vertices constituting the network.

12. The model generation device according to claim 1, wherein each training graph is an undirected graph, wherein each of first vertices belonging to the first set of the input graph and each of second vertices belonging to the second set corresponds to vertices constituting the undirected graph, wherein the first input tensor and the second input tensor input to each feature weaving layer are identical to each other, wherein the first output tensor and the second output tensor generated by each feature weaving layer are identical to each other, and wherein a process of generating the first output tensor and a process of generating the second output tensor are commonly executed.

13. The model generation device according to claim 1, wherein each training graph is a vertex feature graph including a plurality of vertices having attributes, wherein each of first vertices belonging to the first set of the input graph and each of second vertices belonging to the second set corresponds to vertices constituting the vertex feature graph, wherein a feature quantity related to an edge outgoing from the first vertices to the second vertices corresponds to an attribute of a vertex of the vertex feature graph corresponding to the first vertices, and wherein a feature quantity related to an edge outgoing from the second vertices to the first vertices corresponds to an attribute of a vertex of the vertex feature graph corresponding to the second vertices.

14. The model generation device according to claim 13, wherein each element of the third axis of each of the first input tensor and the second input tensor from the input graph is concatenated with or multiplied by information indicating a relationship between corresponding vertices of the vertex feature graph, and wherein the task is to estimate an event derived from the vertex feature graph.

15. The model generation device according to claim 13, wherein the task is to estimate a relationship between vertices constituting the vertex feature graph.

16. An estimation device including an acquisition part configured to acquire a target graph, an estimation part configured to estimate a solution for a task for the acquired target graph using an estimation module trained in machine learning, and an output part configured to output information about a result of estimating the solution for the task, wherein the estimation module includes a feature weaving network and an estimator, wherein the feature weaving network includes a plurality of feature weaving layers and is configured to receive an input of an input graph and output feature information about the input graph, wherein the estimator is configured to estimate a solution for a task for the input graph from the feature information output from the feature weaving network, wherein each feature weaving layer receives inputs of third-order first and second input tensors, wherein the first input tensor is configured to have a first axis along which first vertices belonging to a first set of the input graph are arranged as elements, a second axis along which second vertices belonging to a second set of the input graph are arranged as elements, and a third axis along which feature quantities related to edges outgoing from the first vertices to the second vertices are arranged as elements, wherein the second input tensor is configured to have a first axis along which the second vertices are arranged as elements, a second axis along which the first vertices are arranged as elements, and a third axis along which feature quantities related to edges outgoing from the second vertices to the first vertices are arranged as elements, wherein each feature weaving layer includes an encoder, wherein each feature weaving layer is configured to generate a third-order first concatenated tensor by fixing the third axis of the second input tensor, circulating axes other than the third axis of the second input tensor one by one, and concatenating feature quantities of elements of the first input tensor and the circulated second input tensor, generate a third-order second concatenated tensor by fixing the third axis of the first input tensor, circulating axes other than the third axis of the first input tensor one by one, and concatenating feature quantities of elements of the second input tensor and the circulated first input tensor, generate a third-order first output tensor corresponding to the first input tensor by dividing the generated first concatenated tensor for each element of the first axis, inputting the divided first concatenated tensor to the encoder, and executing an arithmetic operation of the encoder, and generate a third-order second output tensor corresponding to the second input tensor by dividing the generated second concatenated tensor for each element of the first axis, inputting the divided second concatenated tensor to the encoder, and executing an arithmetic operation of the encoder, wherein the encoder is configured to derive a relative feature quantity of each element from all input feature quantities of elements, wherein a first feature weaving layer among the plurality of feature weaving layers is configured to receive the first input tensor and the second input tensor from the input graph, wherein the feature information includes the first output tensor and the second output tensor output from a last feature weaving layer among the plurality of feature weaving layers, and wherein estimating the solution for the task for the target graph using the trained estimation module includes obtaining a result of estimating the solution for the task from the estimator by inputting the target graph as the input graph to the feature weaving network.

17. A model generation method including steps of acquiring, by a computer, a plurality of training graphs and executing, by the computer, machine learning of an estimation module using the plurality of training graphs that has been acquired, wherein the estimation module includes a feature weaving network and an estimator, wherein the feature weaving network includes a plurality of feature weaving layers and is configured to receive an input of an input graph and output feature information about the input graph, wherein the estimator is configured to estimate a solution for a task for the input graph from the feature information output from the feature weaving network, wherein each feature weaving layer receives inputs of third-order first and second input tensors, wherein the first input tensor is configured to have a first axis along which first vertices belonging to a first set of the input graph are arranged as elements, a second axis along which second vertices belonging to a second set of the input graph are arranged as elements, and a third axis along which feature quantities related to edges outgoing from the first vertices to the second vertices are arranged as elements, wherein the second input tensor is configured to have a first axis along which the second vertices are arranged as elements, a second axis along which the first vertices are arranged as elements, and a third axis along which feature quantities related to edges outgoing from the second vertices to the first vertices are arranged as elements, wherein each feature weaving layer includes an encoder, wherein each feature weaving layer is configured to generate a third-order first concatenated tensor by fixing the third axis of the second input tensor, circulating axes other than the third axis of the second input tensor one by one, and concatenating feature quantities of elements of the first input tensor and the circulated second input tensor, generate a third-order second concatenated tensor by fixing the third axis of the first input tensor, circulating axes other than the third axis of the first input tensor one by one, and concatenating feature quantities of elements of the second input tensor and the circulated first input tensor, generate a third-order first output tensor corresponding to the first input tensor by dividing the generated first concatenated tensor for each element of the first axis, inputting the divided first concatenated tensor to the encoder, and executing an arithmetic operation of the encoder, and generate a third-order second output tensor corresponding to the second input tensor by dividing the generated second concatenated tensor for each element of the first axis, inputting the divided second concatenated tensor to the encoder, and executing an arithmetic operation of the encoder, wherein the encoder is configured to derive a relative feature quantity of each element from all input feature quantities of elements, wherein a first feature weaving layer among the plurality of feature weaving layers is configured to receive the first input tensor and the second input tensor from the input graph, wherein the feature information includes the first output tensor and the second output tensor output from a last feature weaving layer among the plurality of feature weaving layers, and wherein the machine learning includes training the estimation module so that an estimation result obtained by the estimator is suitable for a correct answer of the task for each training graph by inputting each training graph as the input graph to the feature weaving network.

18. A non-transitory computer readable medium, storing a model generation program for causing a computer to execute steps of acquiring a plurality of training graphs and executing machine learning of an estimation module using the plurality of training graphs that has been acquired, wherein the estimation module includes a feature weaving network and an estimator, wherein the feature weaving network includes a plurality of feature weaving layers and is configured to receive an input of an input graph and output feature information about the input graph, wherein the estimator is configured to estimate a solution for a task for the input graph from the feature information output from the feature weaving network, wherein each feature weaving layer receives inputs of third-order first and second input tensors, wherein the first input tensor is configured to have a first axis along which first vertices belonging to a first set of the input graph are arranged as elements, a second axis along which second vertices belonging to a second set of the input graph are arranged as elements, and a third axis along which feature quantities related to edges outgoing from the first vertices to the second vertices are arranged as elements, wherein the second input tensor is configured to have a first axis along which the second vertices are arranged as elements, a second axis along which the first vertices are arranged as elements, and a third axis along which feature quantities related to edges outgoing from the second vertices to the first vertices are arranged as elements, wherein each feature weaving layer includes an encoder, wherein each feature weaving layer is configured to generate a third-order first concatenated tensor by fixing the third axis of the second input tensor, circulating axes other than the third axis of the second input tensor one by one, and concatenating feature quantities of elements of the first input tensor and the circulated second input tensor, generate a third-order second concatenated tensor by fixing the third axis of the first input tensor, circulating axes other than the third axis of the first input tensor one by one, and concatenating feature quantities of elements of the second input tensor and the circulated first input tensor, generate a third-order first output tensor corresponding to the first input tensor by dividing the generated first concatenated tensor for each element of the first axis, inputting the divided first concatenated tensor to the encoder, and executing an arithmetic operation of the encoder, and generate a third-order second output tensor corresponding to the second input tensor by dividing the generated second concatenated tensor for each element of the first axis, inputting the divided second concatenated tensor to the encoder, and executing an arithmetic operation of the encoder, wherein the encoder is configured to derive a relative feature quantity of each element from all input feature quantities of elements, wherein a first feature weaving layer among the plurality of feature weaving layers is configured to receive the first input tensor and the second input tensor from the input graph, wherein the feature information includes the first output tensor and the second output tensor output from a last feature weaving layer among the plurality of feature weaving layers, and wherein the machine learning includes training the estimation module so that an estimation result obtained by the estimator is suitable for a correct answer of the task for each training graph by inputting each training graph as the input graph to the feature weaving network.

19. A model generation device including an acquisition part configured to acquire a plurality of training graphs and a learning processing part configured to perform machine learning of an estimation module using the plurality of training graphs that has been acquired, wherein each training graph is a K-partite hypergraph where K is greater than or equal to 3, wherein a plurality of vertices constituting the hypergraph is divided so that each of the plurality of vertices belongs to any one of K subsets, wherein the estimation module includes a feature weaving network and an estimator, wherein the feature weaving network includes a plurality of feature weaving layers and is configured to receive an input of an input graph and output feature information about the input graph, wherein the estimator is configured to estimate a solution for a task for the input graph from the feature information output from the feature weaving network, wherein each feature weaving layer receives an input of K $(K+1)^{th}$-order input tensors, wherein an $i^{th}$ input tensor among the K input tensors is configured so that an $i^{th}$ vertex belonging to an $i^{th}$ subset of the input graph is arranged as an element on a first axis, a vertex belonging to a $(j-1)^{th}$ subset is arranged as an element on a $j^{th}$ axis between a second axis and a $K^{th}$ axis by performing a circulation process using the $i^{th}$ subset as a start point, and a feature quantity related to an edge outgoing from the $i^{th}$ vertex belonging to the $i^{th}$ subset to a combination of vertices belonging to each of $(K-1)$ other subsets is arranged as an element on a $(K+1)^{th}$ axis, wherein each feature weaving layer includes an encoder, wherein each feature weaving layer is configured to generate K $(K+1)^{th}$-order concatenated tensors by fixing the $(K+1)^{th}$ axis of each of $(K-1)$ input tensors other than the $i^{th}$ input tensor with respect to the $i^{th}$ input tensor between a first input tensor and a $K^{th}$ input tensor, circulating an axis other than the $(K+1)^{th}$ axis of each of the other input tensors in alignment with each axis of the $i^{th}$ input tensor, and concatenating feature quantities of elements of the $i^{th}$ input tensor and elements of each of the other input tensors that have been circulated, and generate K $(K+1)^{th}$-order output tensors respectively corresponding to the K input tensors by dividing the K generated concatenated tensors for each element of the first axis, inputting the divided concatenated tensors to the encoder, and executing an arithmetic operation of the encoder, wherein the encoder is configured to derive a relative feature quantity of each element from all input feature quantities of elements, wherein a first feature weaving layer among the plurality of feature weaving layers is configured to receive the K input tensors from the input graph, wherein the feature information includes K output tensors output from a last feature weaving layer among the plurality of feature weaving layers, and wherein the machine learning includes training the estimation module so that an estimation result obtained by the estimator is suitable for a correct answer of the task for each training graph by inputting each training graph as the input graph to the feature weaving network.

* * * * *